(12) United States Patent
Uchimura et al.

(10) Patent No.: US 11,006,173 B2
(45) Date of Patent: May 11, 2021

(54) INFORMATION PROCESSING DEVICE, INFORMATION RECORDING MEDIUM, AND INFORMATION PROCESSING METHOD, AND PROGRAM

(71) Applicant: SONY CORPORATION, Tokyo (JP)

(72) Inventors: Kouichi Uchimura, Kanagawa (JP); Takeshi Ohno, Saitama (JP); Shinichi Takeda, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/341,160

(22) PCT Filed: Oct. 26, 2017

(86) PCT No.: PCT/JP2017/038643
§ 371 (c)(1),
(2) Date: Apr. 11, 2019

(87) PCT Pub. No.: WO2018/088220
PCT Pub. Date: May 17, 2018

(65) Prior Publication Data
US 2020/0186870 A1    Jun. 11, 2020

(30) Foreign Application Priority Data

Nov. 10, 2016    (JP) .............................. JP2016-219364

(51) Int. Cl.
*H04N 21/433*    (2011.01)
*H04N 5/92*    (2006.01)
*H04N 21/435*    (2011.01)

(52) U.S. Cl.
CPC .......... *H04N 21/4334* (2013.01); *H04N 5/92* (2013.01); *H04N 21/435* (2013.01)

(58) Field of Classification Search
None
See application file for complete search history.

(56) References Cited

FOREIGN PATENT DOCUMENTS

| JP | 2011-023071 A | 2/2011 |
| JP | 2015-023574 A | 2/2015 |
| JP | 2016-048859 A | 4/2016 |
| WO | WO 2015/186273 A1 | 12/2015 |

*Primary Examiner* — Omar S Parra
(74) *Attorney, Agent, or Firm* — Paratus Law Group, PLLC

(57) ABSTRACT

A configuration is realized in which a packet delimiter can be discriminated from an MMTP packet string including MMT format data, and a packet can be selectively acquired and reproduced. The MMT format data is input through a broadcast wave or the like, a packet length of an MMT protocol (MMTP) packet including the MMT format data is acquired, and recording data in which an additional header storing the acquired packet length is set before the MMTP packet, is generated, and is recorded in an information recording medium. A reproducing device is capable of discriminating a delimiter of each MMTP packet, according to the packet length of the MMTP packet, read from the additional header, is capable of acquiring reproducing data, for example, image data, from the selected packet, and is capable of decoding and reproducing the acquired data.

20 Claims, 34 Drawing Sheets

FIG. 2

| | IMAGE | SOUND | CAPTION | APPLICATION | Content download, etc. |
|---|---|---|---|---|---|
| TIME INFORMATION | HEVC | AAC | TTML | HTML5 | File delivery method |
| NTP | | | MMT-SI | | |
| | | | MMT | | |
| | | | UDP/IP | | |
| | | | TLV | | |
| | | | PHY | | |

(TLV-SI spans left side)

FIG. 14
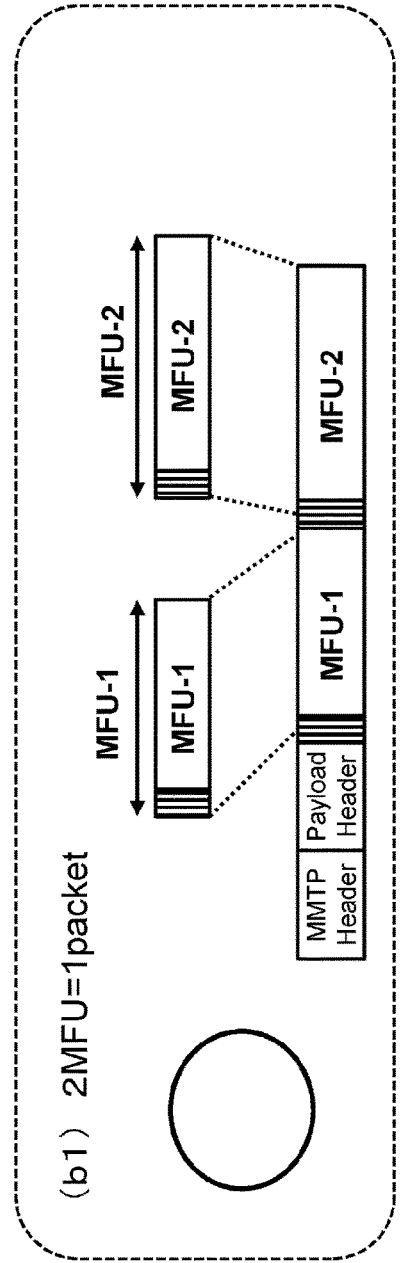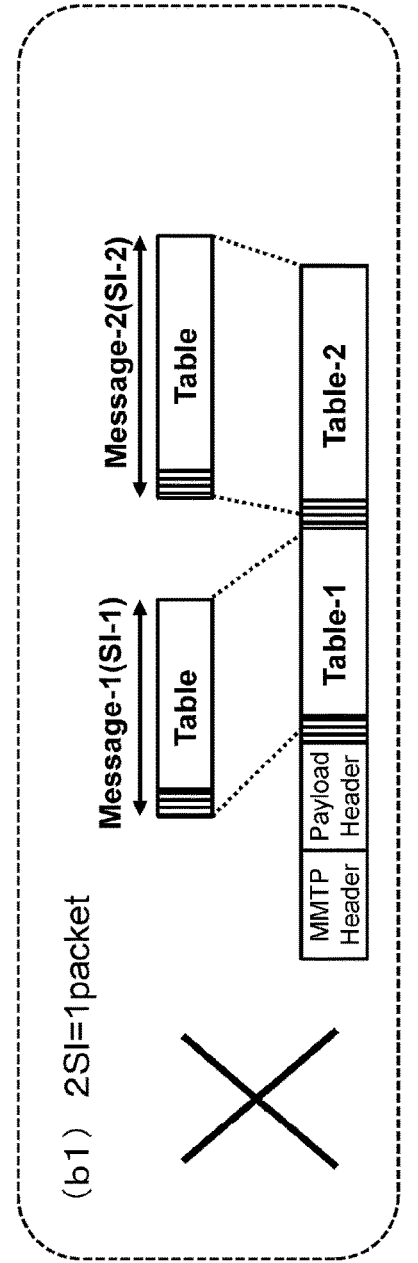

FIG. 17

FRAGMENT INDICATOR (FI: Flagment_indicator)

| FI | CONTENTS (Description) |
|----|------------------------|
| 00 | STORE ONE ENTIRE DATA UNIT IN PAYLOAD<br>[Payload contains one or more complete data units.] |
| 01 | STORE INITIAL DIVIDED DATA OF DATA UNIT IN PAYLOAD<br>[Payload contains the first fragment of data unit] |
| 10 | STORE DIVIDED DATA OTHER THAN INITIAL DIVIDED DATA OR FINAL DIVIDED DATA OF DATA UNIT IN PAYLOAD<br>[Payload contains a fragment of data unit that is neither the first nor the last part.] |
| 11 | STORE FINAL DIVIDED DATA OF DATA UNIT IN PAYLOAD<br>[Payload contains the last fragment of data unit.] |

FIG. 26

IPv6_header_wo_length ()

| DATA STRUCTURE (Syntax) | BIT DEPTH (No. of bits) | DATA NOTATION (Mnemonic) |
|---|---|---|
| IPv6_header_wo_length () { <br>   version <br>   traffic_class <br>   flow_label <br>   next_header <br>   hop_limit <br>   source_address <br>   destination_address <br> } | FIXED TO 38 BYTES (304 BITS) <br> 4 <br> 8 <br> 20 <br> 8 <br> 8 <br> 128 <br> 128 | <br> uimsbf <br> bslbf <br> bslbf <br> bslbf <br> uimsbf <br> bslbf <br> bslbf |

UDP_header_wo_length ()

| DATA STRUCTURE (Syntax) | BIT DEPTH (No. of bits) | DATA NOTATION (Mnemonic) |
|---|---|---|
| UDP_header_wo_length () { <br>   source_port <br>   destination_port <br> } | FIXED TO 4 BYTES (32 BITS) <br> 16 <br> 16 | <br> uimsbf <br> uimsbf |

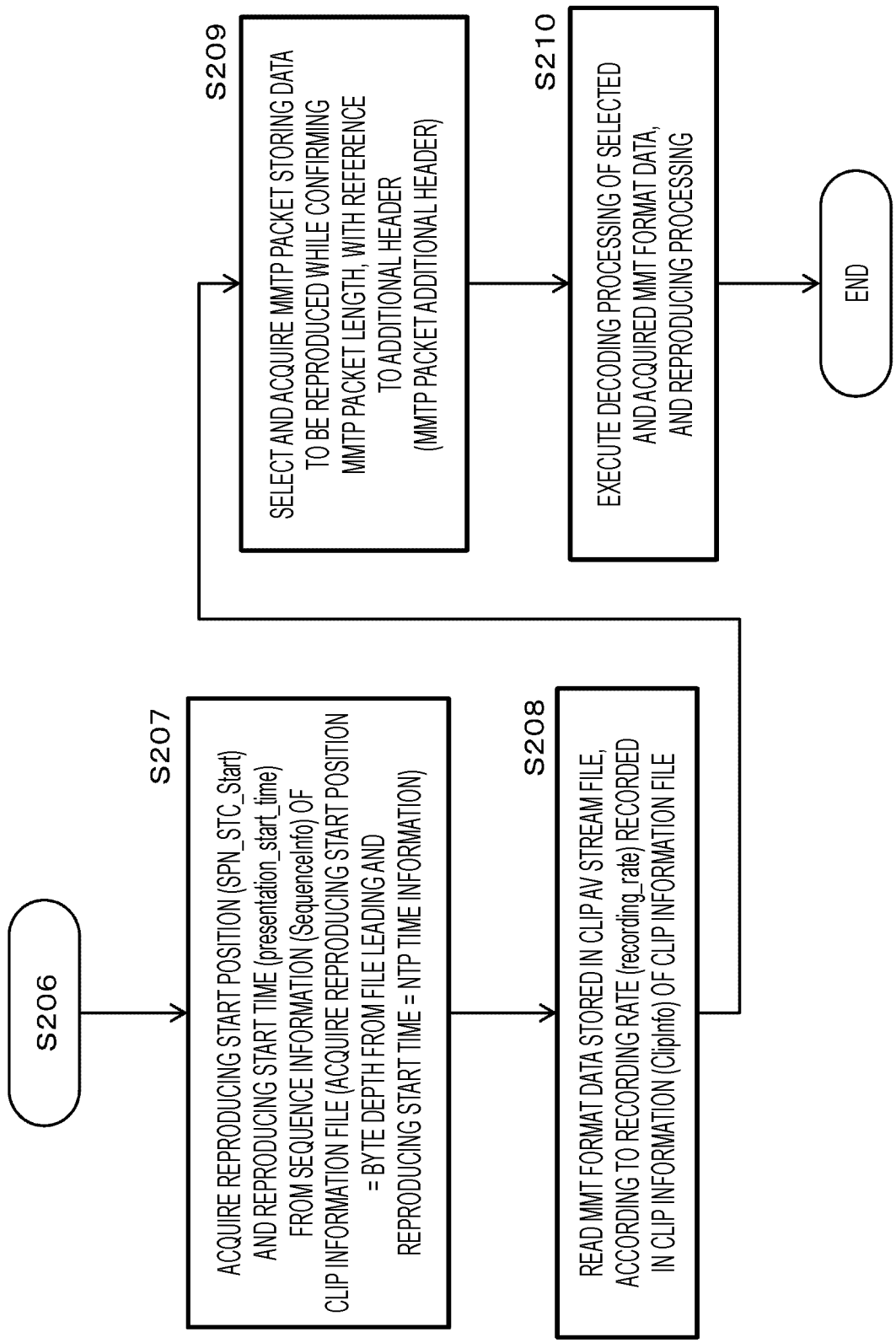

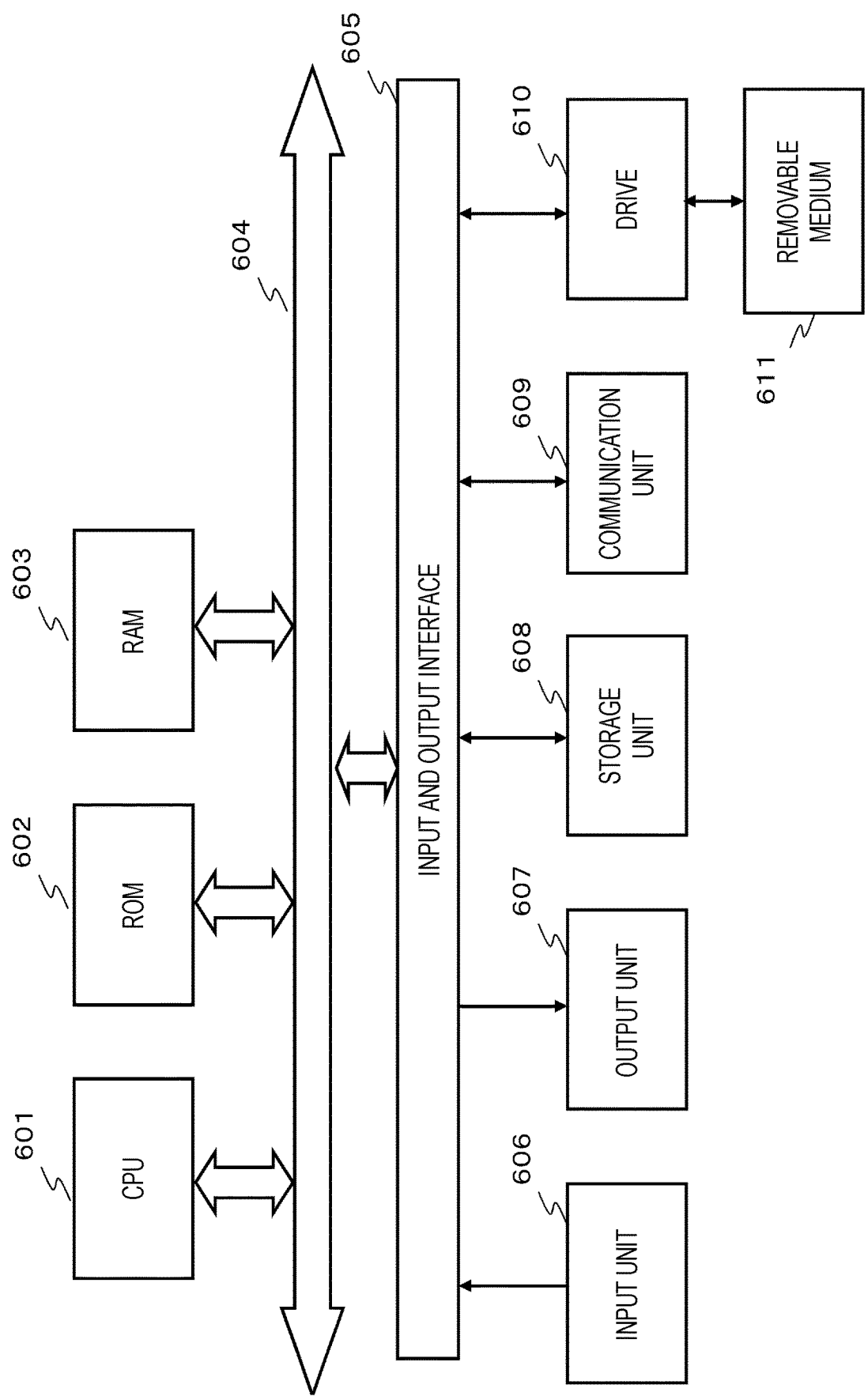

INFORMATION PROCESSING DEVICE, INFORMATION RECORDING MEDIUM, AND INFORMATION PROCESSING METHOD, AND PROGRAM

CROSS REFERENCE TO PRIOR APPLICATION

This application is a National Stage Patent Application of PCT International Patent Application No. PCT/JP2017/038643 (filed on Oct. 26, 2017) under 35 U.S.C. § 371, which claims priority to Japanese Patent Application No. 2016-219364 (filed on Nov. 10, 2016), which are all hereby incorporated by reference in their entirety.

TECHNICAL FIELD

The present disclosure relates to an information processing device, an information recording medium, and an information processing method, and a program. More specifically, the present disclosure relates to an information processing device, an information recording medium, and an information processing method, and a program, in which MPEG media transport (MMT) format data that has been standardized as a future data transmission standard in a broadcast wave or the like, is input, and is recorded in a medium, and thus, can be reproduced.

BACKGROUND ART

Currently, standardization for realizing data transmission of a high-definition image, such as broadcast of a 4K image, an 8K image, or the like, has progressed, and a data delivery system using an MPEG media transport (MMT) format has been considered, as one standardization.

The MMT format defines a data transport format for transporting coded data configuring contents such as an image (Video), a sound (Audio), a caption (Subtitle), or data such as a control message (signaling information: SI) including various management information items such as control information or attribute information, through a broadcast wave or a network.

In the MMT format, reproducing contents such as an image, a sound, and a caption, or the control message (SI) including various management information items, are stored and distributed in an MMT protocol (MMTP) packet defined by the MMT format.

The MMT format, for example, is planned to be used for broadcast of next-generation contents or the like such as a 4K image and a high dynamic range (HDR) image.

On the other hand, an MPEG-2TS format is widely used as a transmission format for the existing image (Video), sound (Audio), caption (Subtitle) and the like, or data recording format with respect to a medium.

In addition, a BDMV or BDAV standard (format) is widely used as a recording and reproducing application standard (format) corresponding to the MPEG-2TS format.

Such an application standard is mainly designated as a data recording and reproducing application standard using a Blu-ray (registered trademark) disc (BD).

Furthermore, the BDMV or the BDAV is mainly the data recording and reproducing application standard using the BD, but the standard is not limited to the BD, and can also be applied to data recording and reproducing using a medium other than the BD, such as a flash memory or an HD.

A data recording and reproducing processing configuration using the BD, for example, is described in Patent Document 1 (Japanese Patent Application Laid-Open No. 2011-023071) or the like.

The BDMV, for example, is an application standard that has been developed for a BD-ROM in which movie contents or the like are recorded in advance, and is widely used mainly in a non-rewritable BD-ROM of package contents or the like.

On the other hand, the BDAV is a standard that has been developed to be applied to data recording and reproducing processing mainly using a rewritable BD-RE type disk, a BD-R type disk in which recording is performed only once or the like. The BDAV, for example, is used for recording and reproducing a video that is taken by a user with a video camera or the like, or for recording and reproducing television broadcast.

In order to record delivery contents according to the MMT format described above, in an information recording medium (media), and to perform the contents reproducing processing by using a reproducing application corresponding to a delivery contents BDAV format, it is necessary to perform data recording according to the BDAV format.

Currently, discussion has been made with respect to a configuration in which the BDAV format extends, and MMT format data can be recorded and reproduced.

For example, in a case where delivery data according to the MMT format transmitted from a broadcast station or the like, is received by an information processing device such as a television, and the received data is recorded in a BD or a flash memory, or a hard disk (HD), discussion has been made in a direction where data such as an image, a sound, and a caption, and a data such as a control message (SI), are recorded as a packet string of a MMT protocol (MMTP) packet according to the MMT format.

In the MMTP packet, the image, the sound, and the caption that are reproducing data, the control message (signaling information: SI) including various management information items, and the like, are stored.

The MMTP packet includes a header (an MMTP header) storing attribute information or the like, and a payload (an MMPT payload) storing actual data or the like, such as the image, the sound, the caption, and the control message including various management information items.

Data type identification information indicating which type of data is stored in each of the packets, is recorded in the MMTP header.

However, the MMTP packet has a variable length, and is capable of being set in various packet sizes. That is, the packet size is not uniform.

For this reason, in a case where the MMTP packet is recorded in the medium, in a row, it is not possible to discriminate a packet delimiter position of the MMTP packet.

In the medium, an MMTP packet (V) storing the image, an MMTP packet (SI) storing the control message including various management information items, and a storage packet of other data items (the sound and the caption) are recorded as a packet string in which the packets are mixed.

In the case of performing data reproducing from the medium in which the MMTP packet string is recorded, for example, in order to decode and reproduce the image data, processing of sequentially and selectively acquiring only the MMTP packet (V) storing the image data, from the packet string, of extracting coded image data from the acquired packet, and of decoding and reproducing the extracted data, is necessary.

Similarly, in the sound, the caption, and the like, it is necessary to sequentially select a packet storing the same type of data from the MMTP packet string recorded in the medium, to extract the same type of data, and to perform decoding and reproducing according to each data type.

A data type of the payload of the MMTP packet, can be discriminated by referring to the record of the MMTP header, but as described above, the packet length of the MMTP packet is not uniform, and a packet delimiter or an MMTP header position is not capable of being detected from the MMTP packet string recorded in the medium.

In a case where the packet delimiter or the MMTP header position is not capable of being detected, it is not possible to perform the basic processing of sequentially selecting the packet storing the same type of data, of reading out data, and of decoding and reproducing the read data.

CITATION LIST

Patent Document

Patent Document 1: Japanese Patent Application Laid-Open No. 2011-023071

SUMMARY OF THE INVENTION

Problems to be Solved by the Invention

The present disclosure, for example, has been made in consideration of the problems described above, and an object thereof is to provide an information processing device, an information recording medium, and an information processing method, and a program, in which delivery data according to an MMT format can be input and recorded in a medium as an MMTP packet string, and recording contents can be reliably reproduced from the medium in which the MMTP packet string is recorded.

Solutions to Problems

A first aspect of the present disclosure, relates to an information processing device, including: a data processor configured to input MPEG media transport (MMT) format data, and to generate recording data with respect to an information recording medium, in which the data processor acquires a packet length of an MMT protocol (MMTP) packet storing the MMT format data, and generates the recording data in which an additional header storing the acquired packet length is set before the MMTP packet.

Further, a second aspect of the present disclosure relates to an information processing device, including: a data processor configured to execute reproducing processing of recording data of an information recording medium, in which the information recording medium is an information recording medium storing MPEG media transport (MMT) format data, and the data processor acquires a packet length of an MMT protocol (MMTP) packet, from an additional header recorded on a prestage of the MMTP packet storing the MMT format data, acquires data from the MMTP packet, and executes data reproducing processing.

Further, a third aspect of the present disclosure relates to an information recording medium, including: an MMT protocol (MMTP) packet storing MMT format data; and recording information in which an additional header recorded with a packet length of an MMTP packet, is set before the MMT protocol (MMTP) packet, and a reproducing device reproducing data from the information recording medium, is capable of confirming the packet length of the MMTP packet, on the basis of the recording information of the additional header.

Further, a fourth aspect of the present disclosure relates to an information processing method executed by an information processing device, in which the information processing device includes a data processor configured to input MPEG media transport (MMT) format data, and to generate recording data with respect to an information recording medium, and the data processor acquires a packet length of an MMT protocol (MMTP) packet storing the MMT format data, and generates the recording data in which an additional header recorded with the acquired packet length is set before the MMTP packet.

Further, a fifth aspect of the present disclosure relates to an information processing method executed by an information processing device, in which the information processing device includes a data processor configured to execute reproducing processing of recording data of an information recording medium, the information recording medium is an information recording medium storing MPEG media transport (MMT) format data, and the data processor acquires a packet length of an MMT protocol (MMTP) packet, from an additional header recorded on a prestage of the MMTP packet storing the MMT format data, acquires data from the MMTP packet, and executes data reproducing processing.

Further, a sixth aspect of the present disclosure relates to an program of allowing an information processing device to execute information processing, in which the information processing device includes a data processor configured to input MPEG media transport (MMT) format data, and to generate recording data with respect to an information recording medium, and the program allows the data processor to execute processing of acquiring a packet length of an MMT protocol (MMTP) packet storing the MMT format data, and of generating recording data in which an additional header recorded with the acquired packet length is set before the MMTP packet.

Further, a seventh aspect of the present disclosure relates to a program of allowing an information processing device to execute information processing, in which the information processing device includes a data processor configured to execute reproducing processing of recording data of an information recording medium, the information recording medium is an information recording medium storing MPEG media transport (MMT) format data, and the program allows the data processor to acquire a packet length of an MMT protocol (MMTP) packet, from an additional header recorded on a prestage of the MMTP packet storing the MMT format data, to acquire data from the MMTP packet, and to execute data reproducing processing.

Furthermore, the program of the present disclosure, for example, is a program that can be provided with respect to an information processing device or a computer and a system capable of executing various programs and codes, by a storage medium and a communication medium provided in a computer-readable format. Such a program is provided in the computer-readable format, and thus, processing according to the program is realized on the information processing device or the computer and the system.

Other objects, characteristics, or advantages of the present disclosure will be apparent by the detailed description based on examples of the present disclosure, or the attached drawings, as described later. Furthermore, herein, a system has a logical set configuration of a plurality of devices, and is not limited to a system in which devices of each configuration are in the same housing.

Effects of the Invention

According to a configuration of one example of the present disclosure, a configuration is realized in which a packet delimiter can be discriminated from an MMTP packet string including MMT format data, and a packet can be selectively acquired and reproduced.

Specifically, the MMT format data is input through a broadcast wave or the like, a packet length of the MMT protocol (MMTP) packet including the MMT format data is acquired, and recording data in which an additional header storing the acquired packet length is set before the MMTP packet, is generated and is recorded in an information recording medium. A reproducing device is capable of discriminating each MMTP packet delimiter according to the packet length of the MMTP packet, read from the additional header, of acquiring reproducing data, for example, image data, from the selected packet, and of decoding and reproducing the acquired data.

According to this configuration, the configuration is realized in which the packet delimiter can be discriminated from the MMTP packet string including the MMT format data, and the packet can be selectively acquired and reproduced.

Furthermore, the effects described herein are merely an example, and additional effects may be obtained.

BRIEF DESCRIPTION OF DRAWINGS

FIG. 2 is a diagram illustrating an MMT format.

FIG. 14 is a diagram illustrating a data storage example of the MMTP packet.

FIG. 17 is a diagram illustrating the fragment indicator stored in the MMTP payload header.

FIG. 26 is a diagram illustrating the recording data of the IP header of the compressed IP packet.

FIG. 33 is a diagram illustrating a flowchart of the processing sequence of the data reproducing processing from the information recording medium (media).

FIG. 34 is a diagram illustrating a hardware configuration example of the information processing device to be applied to processing of the present disclosure.

MODE FOR CARRYING OUT THE INVENTION

Hereinafter, an information processing device, an information recording medium, and an information processing method, and a program of the present disclosure will be described in detail, with reference to the drawings. Furthermore, the description will be made according to the following items.

1. Configuration Example of Communication System
2. MPEG Media Transport (MMT) Format
3. BDAV Format and SPAV Format
4. Processing in case of Recording MMT Format Data according to BDAV Format
5. Configuration Example of capable of Confirming Packet Length of MMTP Packet Recorded in Information Recording Medium
6. Configuration and Processing of Information Processing Device Executing Data Recording Processing with respect to Information Recording Medium
7. Configuration and Processing of Information Processing Device Executing Data Reproducing Processing from Information Recording Medium 8. Configuration Example of Information Processing Device 9. Conclusion of Configuration of Present Disclosure

1. Configuration Example of Communication System

First, an example of a communication system that is one use configuration example of an information processing device executing processing of the present disclosure, will be described with reference to FIG. 1.

Figure 1:
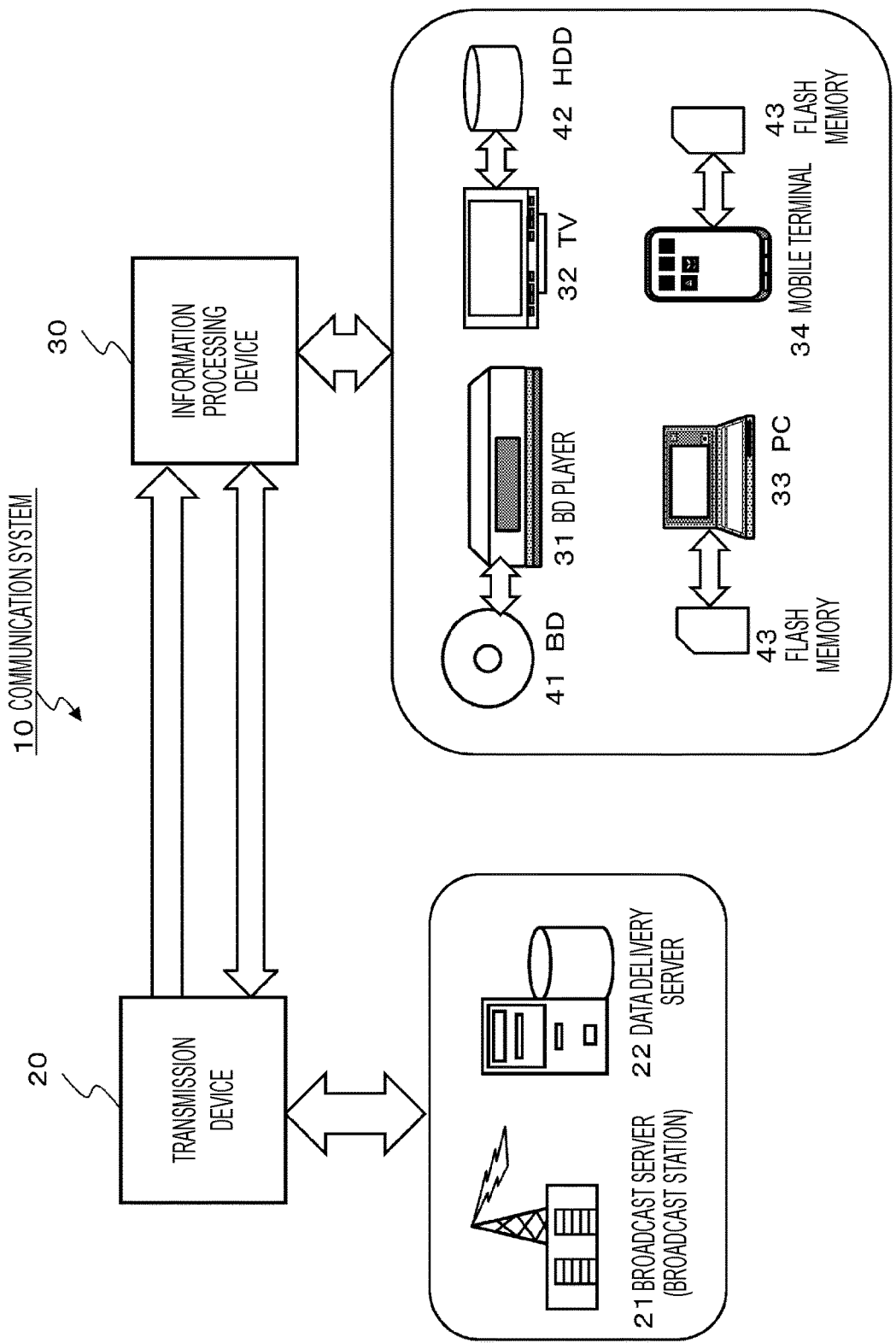
FIG. 1 is a diagram illustrating a use configuration example of an information processing device executing processing of the present disclosure.

An information processing device 30 illustrated in FIG. 1, is provided with a medium such as a Blu-ray (registered trademark) disc (BD), a flash memory, or a hard disk (HDD), and executes data recording processing with respect to the mounting medium or data reproducing processing from the mounting medium.

Data that is recorded in the medium by the information processing device 30, for example, is transmission contents provided by a transmission device 20 such as a broadcast station (a broadcast server) 21 or a data delivery server 22. Specifically, the data is a broadcast program or the like provided by a television station.

The transmission contents are transmitted to the information processing device 30 from the transmission device 20 through a broadcast wave, or a network such as the Internet.

The information processing device 30, for example, is a BD player 31, a television 32, a PC 33, a mobile terminal 34, and the like, and the information processing device, for example, is provided with various media such as a Blu-ray (registered trademark) disc (BD) 41, a hard disk (HDD) 42, and a flash memory 43, and executes the data recording processing with respect to the medium or the data reproducing processing from the medium.

Data transmission to the information processing device 30 from the transmission device 20, is executed according to an MPEG media transport (MMT) format.

The MMT format defines a data transport format at the time of transporting coded data that is contents configuration data, such as an image (Video), a sound (Audio), and a caption (Subtitle), through the broadcast wave or the network.

The transmission device 20 encodes contents data, generates a data file including the coded data and metadata of the coded data, and stores the generated coded data in an MMT protocol (MMTP) packet defined in the MMT, and transmits the stored data through the broadcast wave or the network.

The data provided to the information processing device 30 by the transmission device 20, includes a control message (signaling information: SI) including various management information items such as guide information such as program guide, notification information, and control information, in addition to data to be reproduced, such as an image, a sound, and a caption.

2. MPEG Media Transport (MMT) Format

As described above, the data transmission to the information processing device 30 from the transmission device 20, is executed according to the MPEG media transport (MMT) format.

The MPEG media transport (MMT) format will be described with reference to FIG. 2.

FIG. 2 is a diagram illustrating a stack and a model of the MMT format.

In the MMT stack and model illustrated in FIG. 2, there is a physical layer (PHY) on the least significant layer. The physical layer is divided into a broadcasting layer of performing processing of a broadcast system, and a broadband layer of performing processing of a network system.

In the MMT, processing using two communication networks of the broadcast system and the network system, can be performed.

There is a type length value (TLV) layer as a significant layer of the physical layer (PHY). The TLV is a format definition layer in which a multiplexing method of an IP packet is defined. A plurality of IP packets are multiplexed, and are transmitted as a TLV packet. TLV-SI is a transmission layer of the control message (SI) according to a TLV format.

The control message (SI) includes the control message including various management information items such as setting information necessary for receiving and reproducing contents (a program) on the information processing device 30 side, guide information such as a program guide, notification information, and control information.

The control message (SI) stored in the TLV packet in which processing is generated on a TLV layer, is the TLV-SI, and mainly includes control information associated with receiving processing.

The control message (SI) stored in the MMTP packet that is a packet generated according to an MMT protocol (MMTP), is the MMT-SI represented on the most significant layer, and mainly includes control information associated with reproducing control.

A UDP/IP layer is set on the TLV layer.

Specifically, the UDP/IP layer can be divided into an IP layer and a UDP layer, and is a layer of defining transmission in which a UDP packet is stored in a payload of the IP packet.

An MMT layer and a file delivery method layer are set on the UDP/IP layer.

A case where the MMTP packet is transmitted by being stored in the IP packet, and a method of performing data transmission as the IP packet by using the file delivery method that is a data transmission method not using the MMTP packet, can be used together.

The following layers are set on the MMT layer:

image (Video) data that is coded image data according to high efficiency video coding (HEVC) that is an image encoding standard;

sound (Audio) data that is coded sound data according to advanced audio coding (AAC) that is a sound encoding standard;

caption (Subtitle) data that is coded caption data according to timed text markup language (TTML) that is a caption encoding standard;

a control message (MMT-SI) transmitted by using the MMTP packet; and various applications described according to hyper text markup language 5 (HTML5).

Each of the data items is transmitted by being stored in the MMTP packet.

The control message (MMT-SI) is a control message (signaling information) that is transmitted by the MMTP packet, and includes various management information items such as setting information necessary for reproducing contents (a program), guide information such as a program guide, notification information, and control information, on the information processing device 30 side.

Furthermore, time information (a network time protocol: NTP) is absolute time information, and is transmitted by being directly stored in the UDP packet.

Data service, contents download, or the like (Content download, etc.), performing other data deliveries, can be delivered by using a file delivery method (File delivery method) different from the MMT.

As illustrated in FIG. 2, an image, a sound, and a caption, and the control message (MMT-SI) including various management information items such as various notification information items or control information items, or an application, are transmitted by the MMTP packet.

A specific configuration example of the MMTP packet will be described with reference to FIG. 3.

Figure 3:
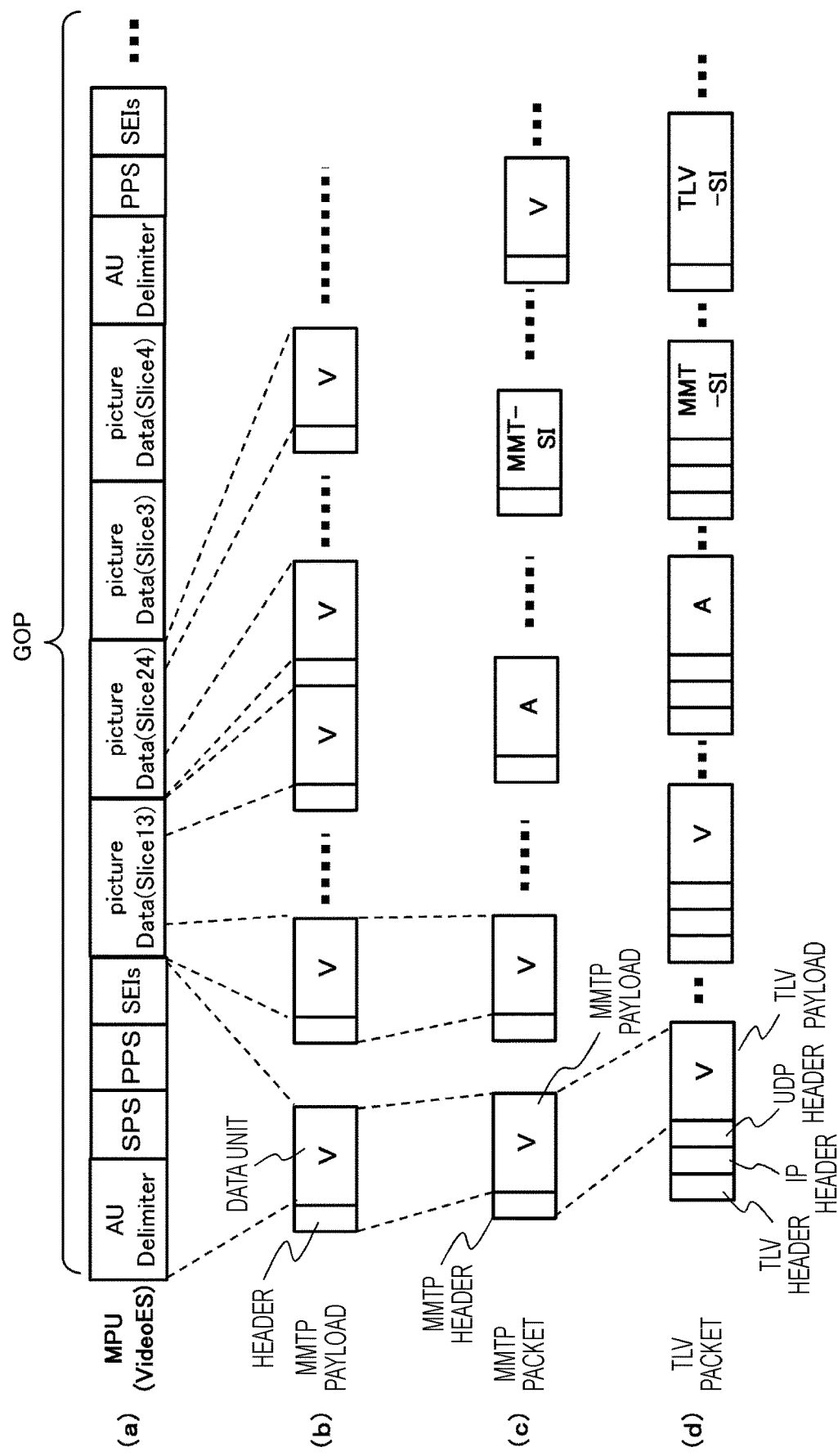
FIG. 3 is a diagram illustrating an image data storage configuration example according to the MMT format.

In FIG. 3, the following four types of data configuration examples are illustrated.

(a) Media Presentation Unit (MPU)
(b) MMTP Payload
(c) MMTP Packet
(d) TLV Packet (d) The TLV packet is a packet that is transmitted through the broadcast wave or the network, and in the TLV packet, header information of each of the UDP header, the IP header, and the TLV header is set. The TLV packet is set as an individual packet for each data type.

That is, one type of data is stored in a TLV payload of one TLV packet. Specifically, for example, an image (V), a sound (A), a caption (S), or a control message (SI) including various management information items is individually stored.

Furthermore, the control message (SI) includes a control message (MMT-SI) stored in the MMTP packet, and a control message (TLV-SI) transmitted by the TLV packet, and the control messages are respectively stored in individual TLV packets different from each other.

An example of the TLV payload that is the payload of the TLV packet, is an MMTP packet illustrated in FIG. 3(c).

The MMTP packet illustrated in FIG. 3(c), includes an MMTP header and an MMTP payload.

One type of data is stored in an MMTP payload of one MMTP packet. Specifically, for example, any one type of data of the image (V), the sound (A), the caption (S), and the control message (MMT-SI) stored in the MMTP packet, is stored in an individual MMTP packet.

FIGS. 3(a) and 3(b) illustrate the detailed configuration of image data stored in the MMTP payload of the MMTP packet illustrated in FIG. 3(c).

FIG. 3(b) illustrates that in the MMTP packets illustrated in FIG. 3(c), only an MMTP packet of which an MMTP payload is the image data (V), is selected.

The MMTP payload illustrated in FIG. 3(b), includes a header and a data unit.

As illustrated in FIG. 3(a), the image data, and the following various parameters are stored in the data unit.

Access Unit Delimiter (AU Delimiter)
Sequence Parameter Set (SPS)
Picture Parameter Set (PPS)
Supplemental Enhancement Information (SEIs)

The parameters are a parameter used for image display.

A media presentation unit (MPU) illustrated in FIG. 3(a), is one data processing unit of data to be reproduced, such as an image, a sound, and a caption in the MMT format. An example illustrated in FIG. 3(a), is an example of the MPU of the image data, and is the same unit as a group of pictures (GOP) as so-called encoding and decoding processing unit.

Thus, for example, as illustrated in FIG. 3(a), the image data is divided into a parameter and image configuration data, defined in the MMT format, is stored in the MMTP payload illustrated in FIG. 3(b), and is configured as the MMTP packet illustrated in FIG. 3(c).

Further, the MMTP packet is set as the payload of the TLV packet illustrated in FIG. 3(d), and the TLV packet is transmitted through the broadcast wave or the network.

Furthermore, in each data item such as the sound and the caption, and each data item such as the MMT-SI, the MMTP packet and the TLV packet of data type unit are set and transmitted.

The TLV-SI is not stored in the MMTP packet, but is transmitted by being stored in the TLV packet.

[3. BDAV Format and SPAV Format]

Next, a BDAV format and an SPAV format that are a recording data format in the case of recording and reproducing delivery contents according to the MMT format described above, for example, in a medium such as a Blu-ray (registered trademark) disc (BD), a flash memory, or a hard disk (HD), will be described with reference to FIG. 4 and the like.

For example, in a case where contents such as an image, a sound, and a caption, are reproduced from the medium such as a Blu-ray (registered trademark) disc (BD), a flash memory, or an HD, reproducing control information or index information for performing reproducing processing of the contents, are necessary. In general, the reproducing control information or the index information is referred to as a database file.

The reproducing control information or the index information is different according to a reproducing application of executing the reproducing processing of recording data of the medium.

As described above, there is a BDMV or BDAV standard (a data recording format) as the existing recording and reproducing application standard (=Data Recording Format). The application standard is designed as a data recording and reproducing application standard mainly using a Blu-ray (registered trademark) disc (BD).

Furthermore, the BDMV or the BDAV is a data recording and reproducing application standard mainly using a BD, and is a data recording format (standard), but the standard is not limited to the BD, and can also be applied to data recording and reproducing using a medium other than the BD, such as a flash memory.

The BDMV, for example, is an application standard that has been developed for a BD-ROM in which movie contents or the like are recorded in advance, and is widely used mainly in a non-rewritable BD-ROM of package contents or the like.

On the other hand, the BDAV is a standard that has been developed to be applied to data recording and reproducing processing mainly using a rewritable BD-RE type disk, a BD-R type disk in which recording is performed only once or the like. The BDAV, for example, is used for recording and reproducing a video that is taken by a user with a video camera or the like, or for recording and reproducing television broadcast.

In order to perform contents reproducing processing from a medium in which the delivery contents according to the MMT format described above, is recorded, by using a reproducing application corresponding to the BDAV format, it is necessary to perform the data recording according to the BDAV format.

As described above, the BDAV format defines a playlist file, a clip information file, or the like, as the recording file of the reproducing control information, and the reproducing application corresponding to the BDAV executes the data reproducing processing by using recording information of a reproducing control information file (a database file).

Figure 4:
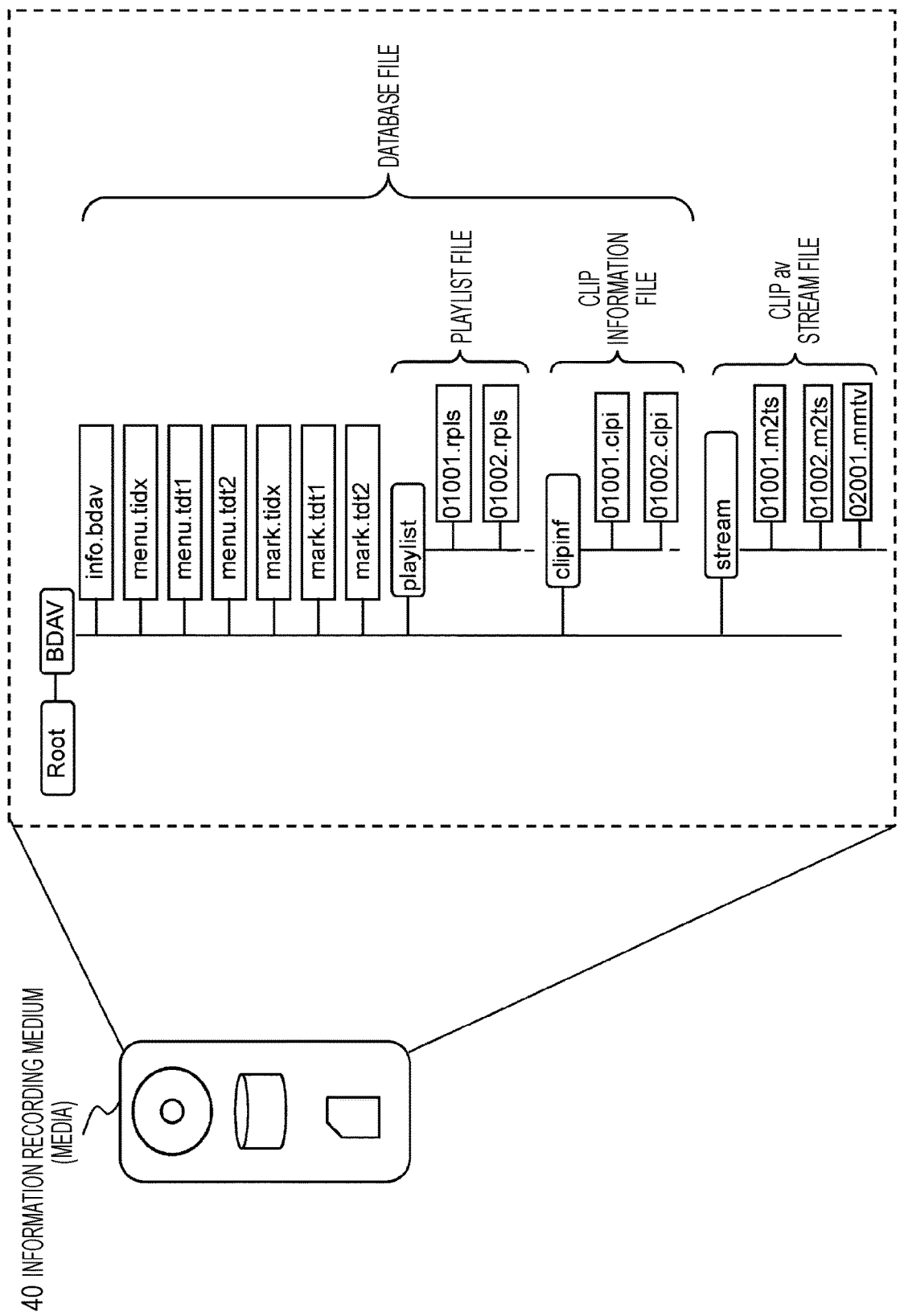
FIG. 4 is a diagram illustrating a BDAV format.

FIG. 4 is a diagram illustrating directory configuration example of data that is recorded in an information recording medium (media) 40, according to the BDAV format.

As illustrated in FIG. 4, in a directory, a storage file of various management information items, the reproducing control information, and the data to be reproduced, is set.

A management information file, for example, includes an info-file (info), a menu file (menu), a mark file (mark), or the like, illustrated in FIG. 4. The files mainly store management information of a title that is shown to the user, or the like.

In addition, for example, a playlist file (playlist) and a clip information file (clipinf) are recorded as the reproducing control information file.

Further, a clip AV stream file (stream) is recorded as a reproducing data storage file.

The playlist file is a file that defines a reproducing order or the like of the contents according to program information of a reproducing program designated by the title, and for example, includes designation information or the like of the clip information file in which reproducing position information or the like is recorded.

The clip information file is a file designated by the playlist file, and includes the reproducing position information or the like of the clip AV stream file.

The clip AV stream file is a file storing AV stream data to be reproduced or the management information. The clip AV stream file includes each data item such as the image, the sound, and the caption, to be reproduced, and a packet storing the management information.

Furthermore, for example, there is program specific information/service information (PSI/SI) as the management information that is defined in an MPEG-2TS format, and is recorded in the clip AV stream file.

Furthermore, broadcast data or network delivery data of the related art, is MPEG-2TS format data including a transport stream (TS) packet, but it is assumed that data including a high-definition image of the future or the like, such as a 4K image and an 8K image, is MMT format data including the MMTP packet described above.

FIG. 4 illustrates a two types of stream files of stream file (nnnnn.m2ts) including MPEG-2TS format data including a TS packet, and MMT format data (nnnnn.mmtv) configured by an MMTP packet, as the clip AV stream file (stream).

A directory example illustrated in FIG. 4 is a directory example in which in a case where the data received by the information processing device 30 is the MPEG-2TS format data, the data is directly recorded in the medium as the MPEG-2TS format data, and in a case where the received data is the MMT format data, the data is recorded in the medium as the MMT format data.

Furthermore, currently, the clip AV stream file in the case of being recorded in the medium as the MMT format data, has been considered to be recorded as an MMTP packet string in which MMT protocol (MMTP) packets according to the MMT format are arranged in a row.

A specific example thereof will be described below in detail.

The data file such as the management information file, the playlist file, and the clip information file, is a storage file of the management information to be applied to the reproducing processing of the image, the sound, the caption, and the like, that are the reproducing data stored in the clip AV stream file. The files are a file in which the reproducing control information, attribute information of the reproducing data, and the like, are stored, and are referred to as a database file.

A sequence of reproducing the contents recorded in the information recording medium, is as follows.

(a) First, a specific title is designated from the management information file according to the reproducing application.

(b) A playlist associated with the designated title is selected.

(c) An AV stream or a command is read out according to clip information defined in the selected playlist, as the actual contents data, and the reproducing of the AV stream or executing processing of the command is performed.

Figure 5:
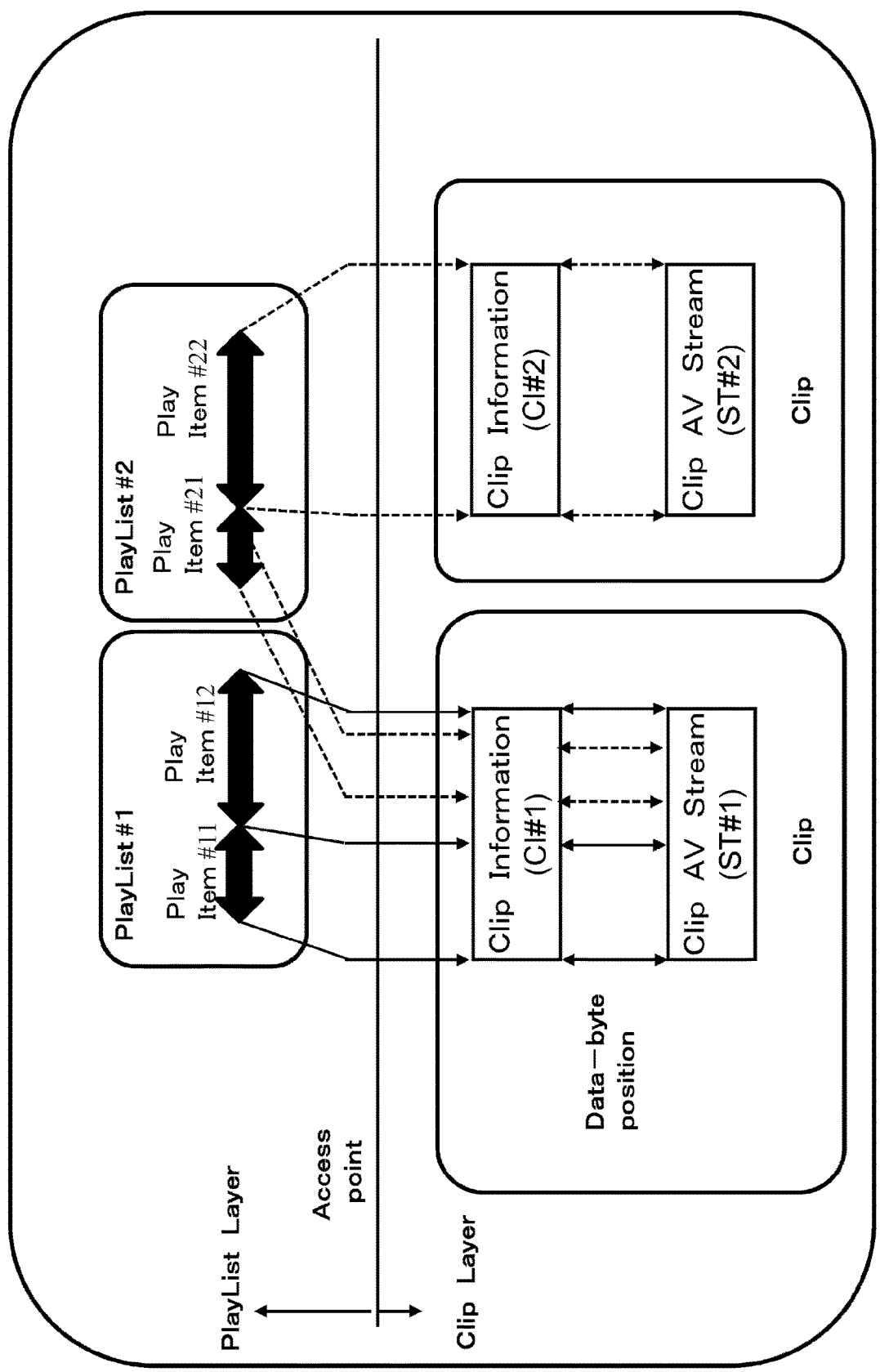
FIG. 5 is a diagram illustrating a data reproducing processing example according to the BDAV format.

FIG. 5 is a diagram illustrating a correspondence relationship of the data recorded in the information recording medium (media) 40, that is, the playlist file, the clip information file, and the clip AV stream file.

The AV stream including the data to be reproduced, such as the image, the sound, and the caption, the data being the actual data to be reproduced, is recorded as the clip AV stream file, and the playlist (PlayList) file and the clip information file are defined as the management information and the reproducing control information file of the AV stream.

As illustrated in FIG. 5, such a plurality of categories of files can be classified into two layers of a playlist layer including the playlist (PlayList) file, and a clip layer including the clip AV stream file and the clip information file.

Furthermore, one clip information file is associated with one clip AV stream file, and such a pair is considered as one object, and is collectively referred to as a clip or a clip file.

The management information such as detailed information of the data included in the clip AV stream file, for example, an EP map in which I picture position information or the like of MPEG data is recorded, is recorded in the clip information file.

Furthermore, in the case of the MPEG-2TS format data, the clip AV stream file includes the TS packet.

In addition, in the case of the MMT format data, the clip AV stream file includes the MMTP packet.

The clip information file, for example, stores management information for acquiring a reproducing start position of the stored data of the clip AV stream file, such as corresponding data of a data position of byte string data of the clip AV stream file, a reproducing time position or the like that is a reproducing start point (an entry point: EP) or the like in the case of being decompressed on a time axis, and the like.

The playlist includes information indicating an access point corresponding to a reproducing start position or a reproducing terminal position of the clip, by a time stamp that is information on the time axis.

For example, it is possible to acquire a data read position of the clip AV stream file, that is an address as the reproducing start point, on the basis of the time stamp indicating a reproducing time elapsed position from a start point of the contents, with reference to the clip information file.

The clip information file is used for finding address information for starting the decoding of a stream in the clip AV stream file, from the time stamp.

Thus, the playlist (PlayList) file includes designation information of a reproducing section with respect to reproducible data included in a clip (=Clip Information File+Clip AV Stream File) layer.

One or more play items are set in the playlist (PlayList) file, and each of the play items (PlayItem) includes the designation information of the reproducing section with respect to the reproducible data included in the clip (=Clip Information File+Clip AV Stream File) layer.

Furthermore, as described above, in the case of an MPEG-2TS format data of the related art, the clip AV stream file storing the data to be reproduced includes the TS packet.

In addition, in the case of high-definition image data that is assumed to be widely used in the future, such as a 4K image and an 8K image, and in the case of the MMT format data, the clip AV stream file storing the data to be reproduced includes the MMTP packet.

Figure 6:
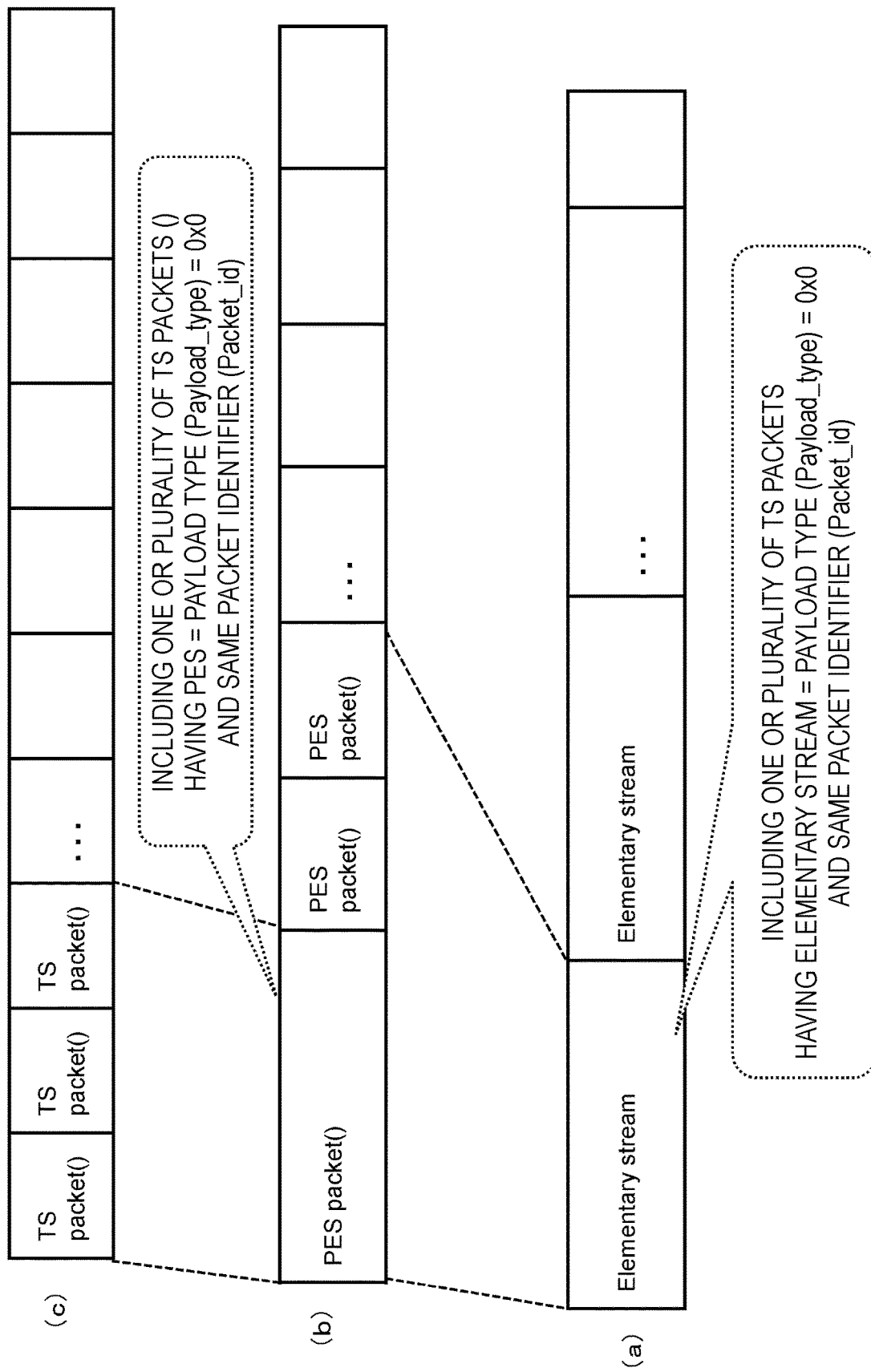
FIG. 6 is a diagram illustrating an MPEG-2TS format.

The MMT format and the MPEG-2TS format will be described with reference to FIG. 6 and FIG. 7.

First, the MPEG-2TS format will be described with reference to FIG. 6.

The MPEG-2TS format is a format for storing the coded data that is the contents configuration data such as the image (Video), the sound (Audio), and the caption (Subtitle), or the management information (PSI/SI), in the recording medium (media), or for defining a data storage format (container format) of the coded data at the time of being transmitted through the broadcast wave or the network or the like.

The MPEG-2TS format is a format standardized in ISO13818-1, and for example, is used for data recording with respect to a Blu-ray (registered trademark) disc (BD), digital broadcast, or the like.

FIGS. 6(a) to 6(c) are diagrams illustrating the configuration of the MPEG-2TS format data.

FIG. 6(a) on the bottom portion, is a diagram illustrating the overall configuration of the MPEG-2TS format data.

As illustrated in FIG. 6(a), the MPEG-2TS format data includes a plurality of elementary streams.

The elementary stream, for example, is a unit set as one unit of the image, the sound, the caption, and the like.

As illustrated in FIG. 2(b), one elementary stream includes one or a plurality of packetized elementary stream (PES) packets.

Specifically, one elementary stream includes one or a plurality of PES packets having Payload Type (Payload_type)=0x0 and the same packet identifier (Packet_id).

As illustrated in FIG. 6(c), one PES packet includes one or a plurality of TS packets.

Specifically, one PES packet includes one or a plurality of TS packets having Payload Type (Payload_type)=0x0 and the same packet identifier (Packet_id).

The TS packet is different from the MMTP packet described above, and has a fixed length, and a packet size of one TS packet is fixed to 188 bytes.

Next, the MPEG media transport (MMT) format will be described with reference to FIG. 7.

Figure 7:
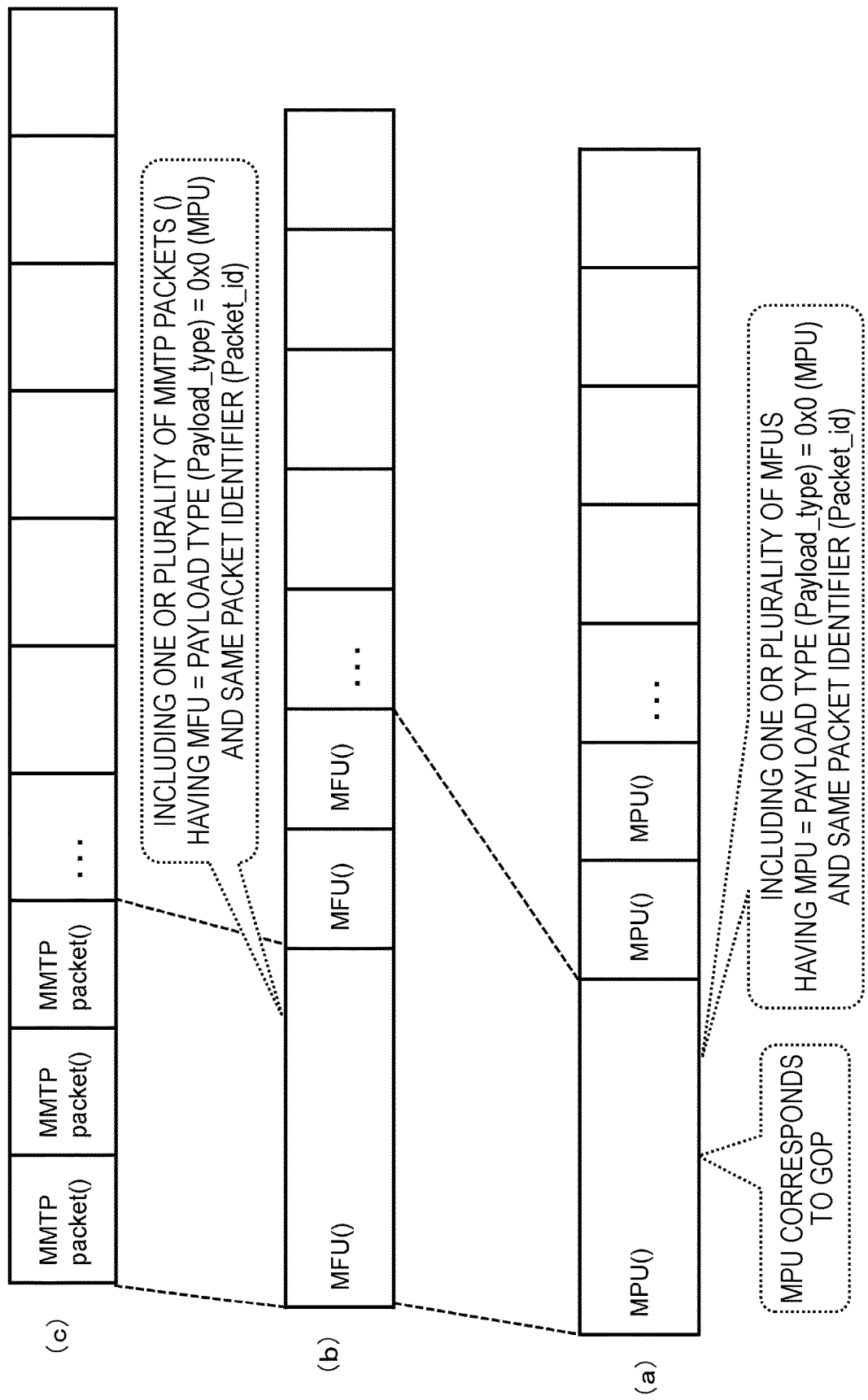
FIG. 7 is a diagram illustrating the MMT format.

The MMT format described above with reference to FIG. 3, but an explanatory diagram of the MMT format illustrated in FIG. 7, is a diagram illustrating a correspondence relationship with respect to the MPEG-2TS format described above with reference to FIG. 6, to be easily understood.

As described above, the MMT format defines the data transport format at the time of transmitting the coded data that is the contents configuration data, such as the image (Video), the sound (Audio), and caption (Subtitle), through the broadcast wave or the network.

FIG. 7 is a diagram illustrating the MMT format that is a file format defined in ISO/IEC 23008-1.

FIG. 7(a) to 7(c) illustrate the configuration of the MMT format data.

FIG. 7(a) on the bottom portion, is a diagram illustrating the overall configuration of the MMT format data.

As illustrated in FIG. 7(a), the MMT format data includes a plurality of media presentation units (MPU).

The MPU, for example, is a unit set as one unit of the image, the sound, the caption, and the like. For example, in the case of the image, one MPU corresponding to one group of picture (GOP) that is one MPEG compressed image unit.

As illustrated in FIG. 7(b), one MPU includes one or a plurality of media fragment units (MFU).

Specifically, one MPU includes one or a plurality of MFUs having Payload Type (Payload_type)=0x0(MPU) and the same packet identifier (Packet_id).

As illustrated in FIG. 7(c), one MFU includes one or a plurality of MMTP packets.

Specifically, one MFU includes one or a plurality of MMTP packets having Payload Type (Payload_type)=0x0 (MPU) and the same packet identifier (Packet_id).

The MMTP packet has a variable length, and is capable of being set in various packet sizes.

Each of the MMTP packets includes a header (the MMTP header) storing the attribute information or the like, and a payload (the MMTP payload) storing the actual data of the coded image or the like.

Furthermore, there is an SPAV format as a format similar to the BDAV format. As described above, the BDMV or the BDAV is the data recording and reproducing application standard mainly using the BD. In contrast, the SPAV format is a data recording and reproducing application standard mainly with respect to the hard disk.

However, both of the BDAV format and the SPAV format are a format that can be used for recording and reproducing using various media such as a BD, a flash memory, and an HD.

SPAV format data is capable of executing data recording and reproducing in processing similar to the data recording and reproducing processing in the BDAV format. However, in the SPAV format, file name setting is partially different from that of the BDAV format.

Figure 8:
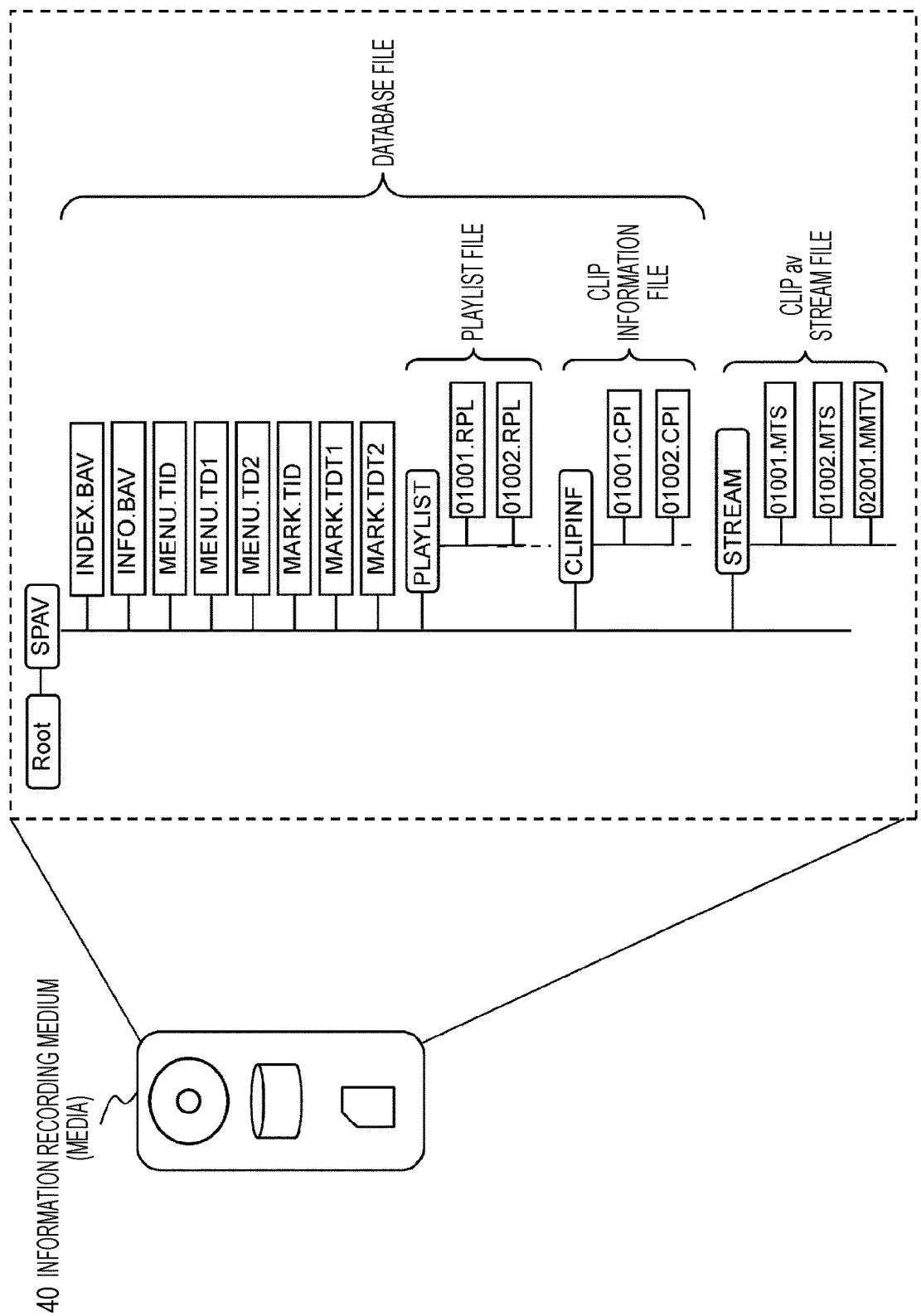
FIG. 8 is a diagram illustrating an SPAV format.

FIG. 8 illustrates a directory configuration example of the SPAV format.

In a directory of the SPAV format illustrated in FIG. 8, the storage file of various management information items, the reproducing control information, and the data to be reproduced is set, as with the BDAV format described above with reference to FIG. 4.

The management information file, for example, includes the info-file (INFO), the menu file (MENU), the mark file (MARK), or the like, illustrated in FIG. 8. The files mainly store the management information of the title that is shown to the user, or the like.

In addition, for example, the playlist file (PLAYLIST) and the clip information file (CLIPINF) are recorded as the reproducing control information file.

Further, the clip AV stream file (STREAM) is recorded as the reproducing data storage file.

As illustrated in FIG. 8, the setting of a directory name of the SPAV format or an extension of each of the files, is different from that of the BDAV format described above with reference to FIG. 4.

However, the data stored in each of the files, or the function of each of the files is similar to that of the BDAV format.

In the description of the following example, a processing example of recording and reproducing the MMT format data as the BDAV format data, will be described, but the following example can also be applied to processing of recording and reproducing the MMT format data as the SPAV format data.

4. Processing in Case of Recording MMT Format Data According to BDAV Format

Next, processing and a problem in the case of recording the MMT format data as the BDAV format, will be described.

As described above, the MMT format is the data delivery format that is used for a 4K image or the like to be delivered to a broadcast station or the like in the future, and is a format according to the protocol stack described above with reference to FIG. 3.

On the other hand, the BDAV format is the data recording format with respect to the medium, and as described with reference to FIG. 4, defines the database file including the reproducing control information file such as the playlist file or the clip information file.

Furthermore, the BDAV format is the data recording format, and also corresponds to the data recording and reproducing application standard, and in the data reproducing that is recorded in the medium according to the BDAV format, the reproducing processing is executed by using the reproducing application corresponding to the BDAV format.

Accordingly, in order to record the delivery contents according to the MMT format in the medium, and to perform the contents reproducing processing from the recorded medium by using the reproducing application corresponding to the BDAV format, it is necessary to perform the data recording according to the BDAV format.

As described above, currently, discussion has been made with respect to a definition in which the BDAV format extends, and the MMT format data can be recorded and reproduced.

For example, in a case where the delivery data according to the MMT format transmitted from the broadcast station or the like, is received by the information processing device such as a television, and the received data is recorded in a BD, a flash memory, or a hard disk (HD), discussion has been made in a direction where the data such as the image, the sound, and the caption, and the data such as the management information (SI), are recorded as the packet string of the MMT protocol (MMTP) packet according to the MMT format.

However, in a case where the MMTP packet string is recorded, it is not possible to discriminate each MMTP packet delimiter.

Hereinafter, such a problem will be described.

Figure 9:
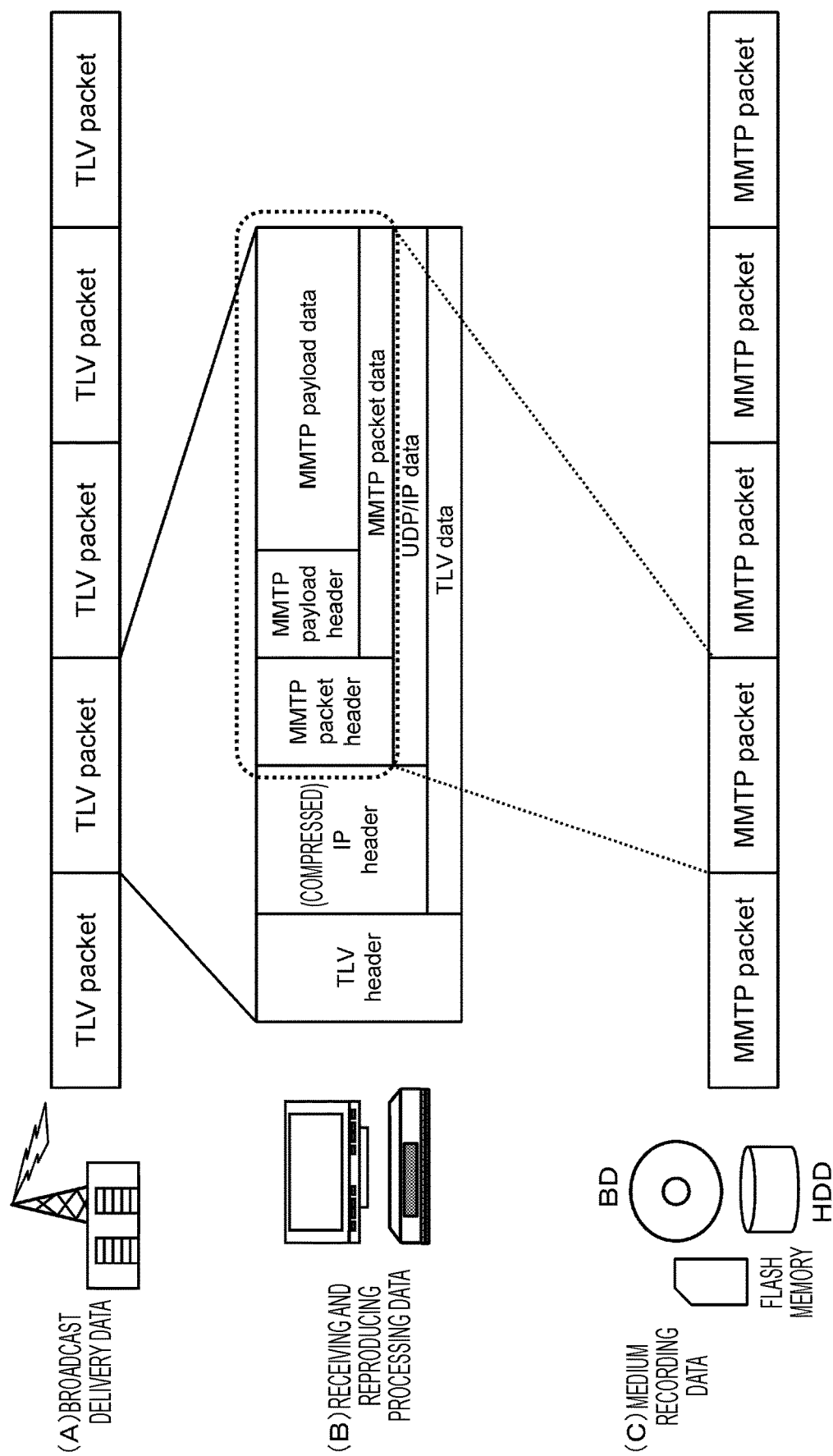
FIG. 9 is a diagram illustrating a processing example of recording received data from a broadcast station or the like in an information recording medium (media), as an MMTP packet string that is MMT format data.

FIG. 9 is a diagram illustrating a processing example of recording the MMT protocol (MMTP) packet string according to the MMT format, in the recording medium such as a BD, a flash memory, or a hard disk (HD).

FIG. 9 illustrates the following three data items:

(A) TLV Packet String that is Broadcast Delivery Data;

(B) One TLV Packet Processed as Receiving and Reproducing Data; And (C) MMTP Packet String Proposed as Configuration of Data for Medium Recording.

(A) The TLV packet string that is the broadcast delivery data, is a string (a sequence) of the TLV packets having the MPEG media transport (MMT) format described above with reference to FIG. 2.

The TLV packet string is transmitted from the transmission device 20 such as a broadcast station.

(B) One TLV packet processed as the receiving and reproducing data, is one TLV packet that is received by the information processing device 30 such as a television or a recorder, and performs the reproducing processing. The detailed configuration of one TLV packet configuring the TLV packet string illustrated in (A), is illustrated.

The TLV packet is the TLV packet having the MPEG media transport (MMT) format described above with reference to FIG. 2.

(C) The MMTP packet string represented as the configuration of the data for medium recording, is the MMTP packet string that has been currently proposed as the recording data with respect to the medium.

The MMTP packet recorded in the medium is the MMTP packet that is a part of the configuration data of the TLV packet, as understood from a dotted line illustrating a correspondence relationship with respect to FIG. 9(B), and includes the following elements:

(a) MMTP Packet Header (MMTP_packet_header); and (b) MMTP Packet Data (MMTP_packet_data) (=Payload).

Furthermore, the MMTP packet data (MMTP_packet_data) (=Payload) includes the following elements:

(b1) MMTP Payload Header (MMTP_payload_header); and (b2) MMTP Payload Data (MMTP_payload_data).

Currently, a configuration that is proposed as the recording data with respect to the information recording medium (media), is a configuration in which only the MMTP packet that is the constituent of the TLV packet, is extracted, and is recorded in a row, as illustrated in FIG. 9(C).

However, as described above, the MMTP packet has a variable length, and is capable of being set in various packet sizes. That is, the packet size is not uniform.

For this reason, in a case where the MMTP packet is recorded in the medium, in a row, it is not possible to discriminate the packet delimiter position of the MMTP packet.

However, in a case where the TLV packet is received, and the data reproducing using the TLV packet is performed, it is possible to refer to the recording data of the TLV header of the TLV packet, or the IP header, and it is possible to acquire a TLV packet length or an IP packet length, on the basis of the header recording data.

As a result thereof, it is possible to grasp the whole length of the IP packet or the TLV packet including one MMTP packet, and it is also possible to discriminate the MMTP packet delimiter, and thus, there is no obstacle in the data reproducing.

Figure 10:
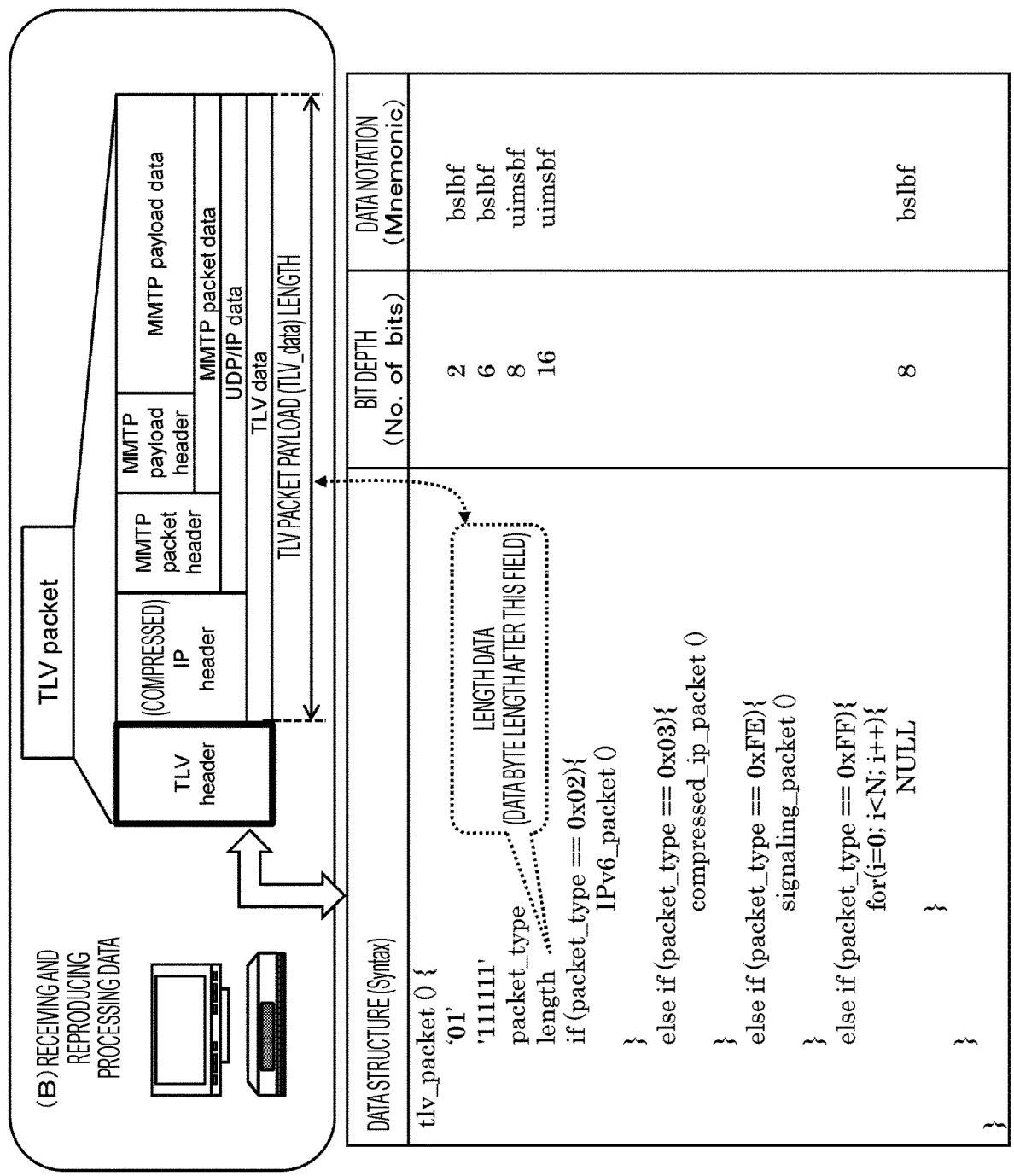
FIG. 10 is a diagram illustrating a data configuration of a TLV header of a TLV packet.

FIG. 10 is a diagram illustrating the data of the TLV header that is set in the TLV packet.

FIG. 10 illustrates a data structure (Syntax), a bit depth (No. of bits), and data notation (Mnemonic) of the TLV header.

Furthermore, "uimsbf" in the data notation, indicates "unsigned integer, most significant bit first" notation.

"bslbf" indicates "bit string, left bit first".

As illustrated in FIG. 10, a packet length data (length) of the TLV packet is recorded in the TLV header set in the TLV packet.

The packet length data (length) of the TLV packet corresponds to a data length of TLV_data (=TLV Payload) excluding the TLV header of the TLV packet. Specifically, a data byte length of TLV_data (=TLV Payload) is recorded.

Figure 11:
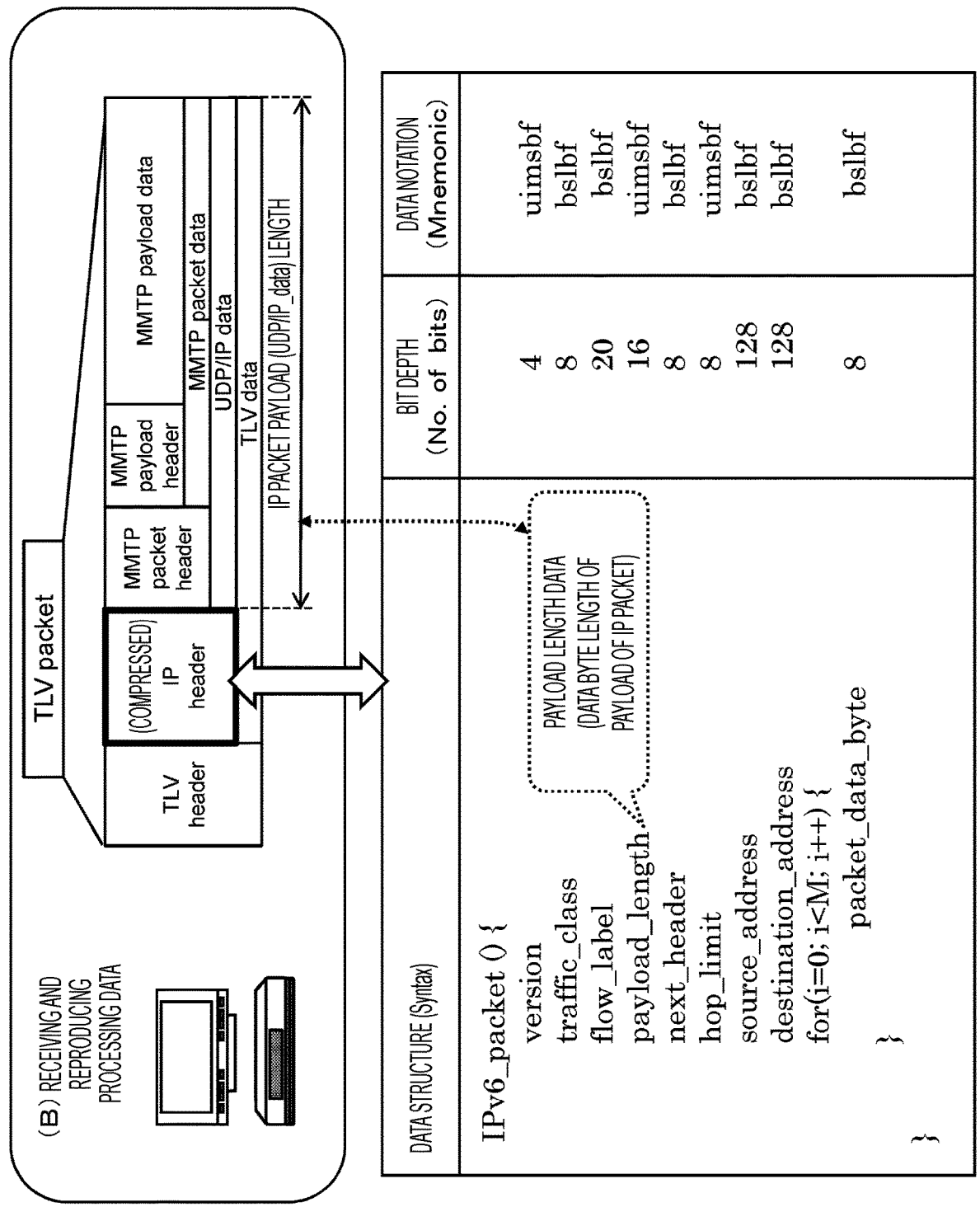
FIG. 11 is a diagram illustrating a data configuration of an IP header of an IP packet.

Further, FIG. 11 is a diagram illustrating data example of the IP header of the IP packet in the TLV packet.

Furthermore, the IP packet stored in the TLV packet, includes two types of IP packets of compressed IP packet including compressed data and an IP (v6) packet including uncompressed data.

The example illustrated in FIG. 11 is a header example of the IP (v6) packet including the uncompressed data.

As illustrated in FIG. 11, payload length data (payload_length) of the IP packet is recorded in the IP header set in the IP packet.

The payload length data (payload_length) of the IP packet corresponds to a data length of IP_data (=IP Payload) excluding the IP header of the IP packet. Specifically, a data byte length of IP_data (=IP Payload) is recorded.

Thus, for example, in a case where a television or the like receives the TLV packet, and performs the data reproducing using the TLV packet, it is possible to refer to the recording data of the TLV header of the TLV packet or the IP header, and it is possible to acquire the TLV packet length or the IP packet length, on the basis of the header recording data.

As a result thereof, it is possible to grasp the whole length of the IP packet or the TLV packet including one MMTP packet, and it is also possible to discriminate the MMTP packet delimiter, and thus, there is no obstacle in the data reproducing.

However, as with the medium recording data illustrated in FIG. 9(C), described above with reference to FIG. 9, in a case where the MMTP packet string from which the TLV header or the IP header is eliminated, is recorded in the medium, it is not possible to refer to the TLV header or the IP header.

Figure 12:
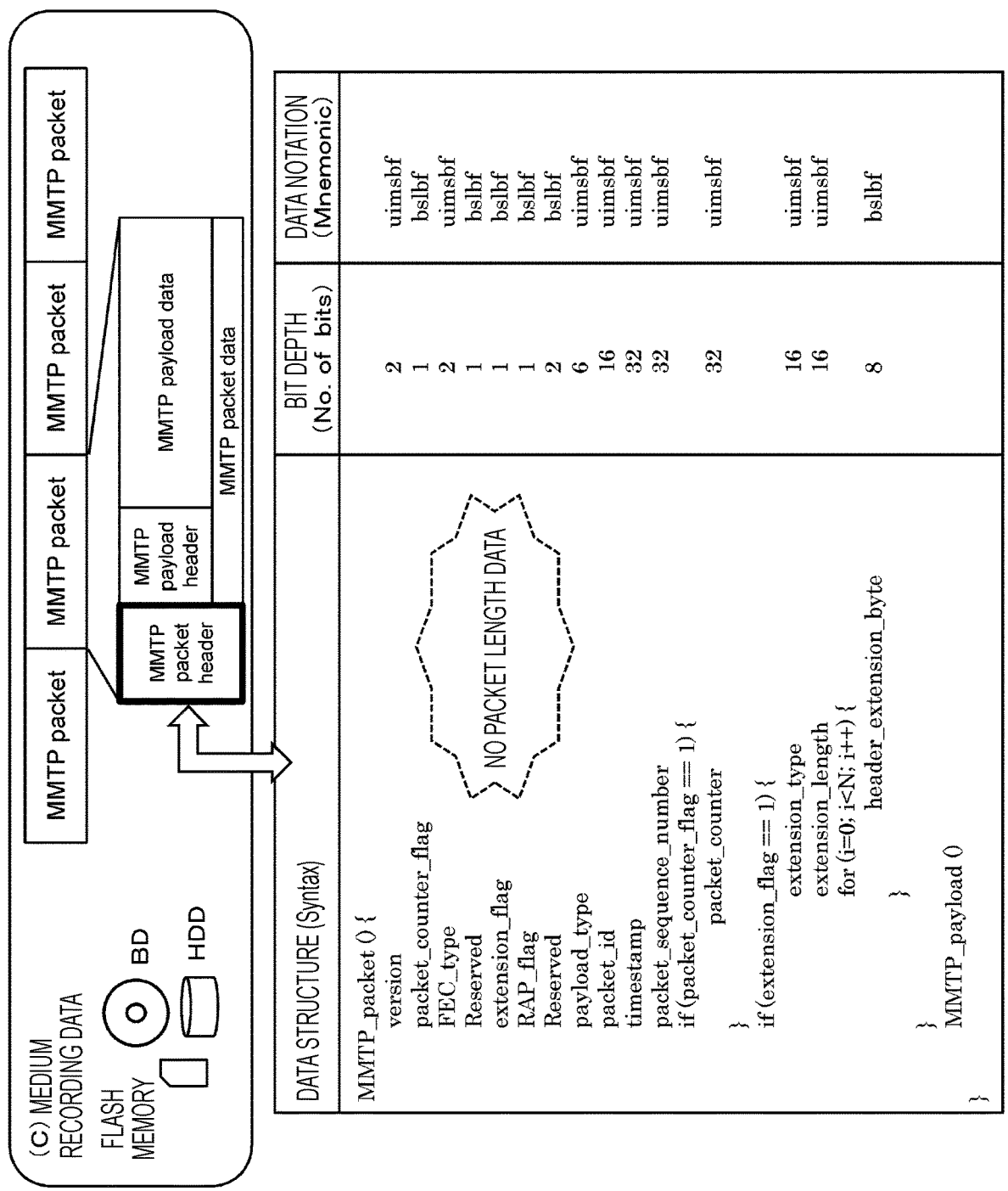
FIG. 12 is a diagram illustrating data configuration of an MMTP header of an MMTP packet.

FIG. 12 illustrates a data example of the MMTP header of the MMTP packet (an MMTP packet header).

In the data of the MMTP header (the MMTP packet header) illustrated in FIG. 12, there is no recording data associated with the packet length of the MMTP packet or a payload data length of the payload (MMTP_packet_data).

As described above, the packet length of the MMTP packet is not uniform, and various data lengths can be set.

Accordingly, insofar as data length information is not capable of being obtained by any method, it is not possible to know the position (the address) of the end of the MMTP packet, that is, a start position of the next MMTP packet.

However, there is the MMTP payload header (MMTP_payload_header) in the MMTP packet data (MMTP_packet_data), as a region in which a data length associated with a part of the MMTP packet is recorded.

As described above, the MMTP packet data (MMTP_packet_data) (=Payload) includes the following elements:

(b1) MMTP Payload Header (MMTP_payload_header); and
(b2) MMTP Payload Data (MMTP_payload_data).

A data configuration of the MMTP payload header (MMTP_payload_header) will be described with reference to FIG. 13.

A payload type (payload_type) indicating the type of MMTP payload data that is the stored data of the MMTP packet, is recorded in the MMTP payload header, and different data is recorded for each data type.

For example, the following types are defined in the payload type:

Payload Type=0x00; and
Payload Type=0x02.

Payload Type=0x00 indicates that the data stored in the MMTP packet is the media presentation unit (MPU). As described above with reference to FIG. 3, the MPU is one data processing unit of the data to be reproduced, such as the image, the sound, and the caption.

On the other hand, Payload Type=0x02 indicates that the data stored in the MMTP packet, is the control message (the signaling information: SI) such as the management information.

The control message (SI) stored in the MMTP packet, is the MMT-SI, and includes various management information items such as the information necessary for reproducing the contents (the program) on the information processing device 30 side, the guide information such as the program guide, the notification information, and the control information.

As described above with reference to FIG. 2, the control message (SI) transmitted from the transmission device 20 such as a broadcast station, includes the TLV-SI that is the control message (SI) stored in the TLV packet generated according to processing in the TLV layer, and the MMT-SI that is the control message (SI) stored in the MMTP packet that is a packet generated according to the MMT protocol (MMTP).

The TLV-SI is a control message mainly associated with receiving control or the like, is not necessary at the time of recording the contents such as the image, the sound, and the caption, in the medium, and is not recorded in the medium.

On the other hand, a control message associated with reproducing control, is included in the MMT-SI, and is also recorded in the medium at the time of recording the contents such as the image, the sound, and the caption, in the medium.

Figure 13:
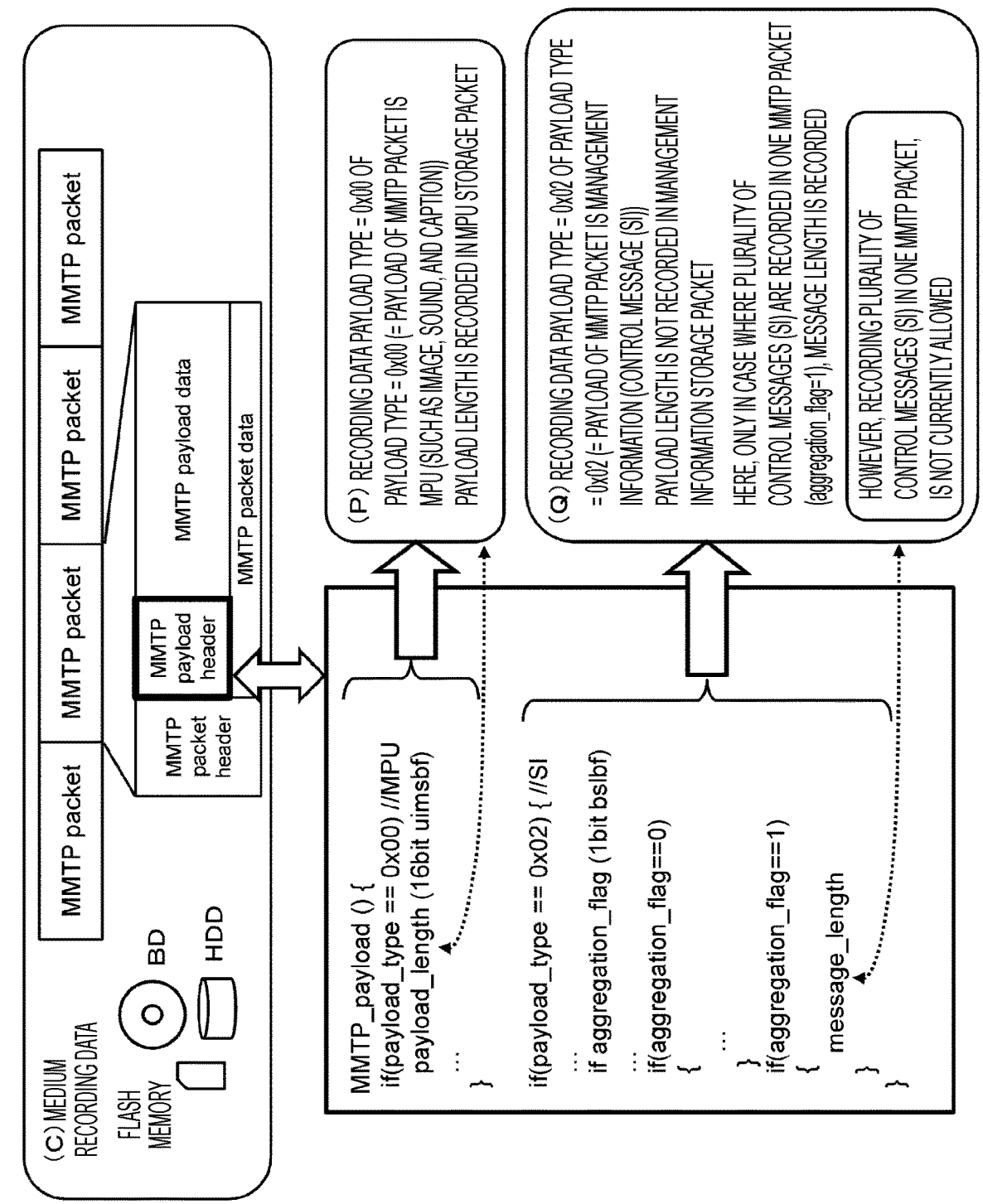
FIG. 13 is a diagram illustrating a data configuration of an MMTP payload header.

FIG. 13 illustrates the data in the MMTP packet to be recorded in the medium, and a payload type 0x02 illustrated in FIG. 13(Q), is the control message (SI) stored in the MMTP packet, that is, the MMT-SI.

As illustrated in FIG. 13(P), in a case where Payload Type=0x00, that is, the payload of the MMTP packet is the MPU (the image, the sound, the caption, and the like), the payload length is recorded in the MMTP payload header.

Accordingly, in a case where Payload Type=0x00, that is, the payload of the MMTP packet is the MPU (the image, the sound, the caption, and the like), the length (the payload length) of the data of the MMTP packet (MMTP_payload_data) can be confirmed from the data of the MMTP payload header (MMTP_payload_header).

However, on the other hand, as illustrated in FIG. 13(Q), in a case where Payload Type=0x02, that is, the payload of the MMTP packet is the control message (SI (=MMT-SI)) such as the management information, the payload length is not recorded in the MMTP payload header.

Furthermore, in setting where one control message (SI) is recorded in one MMTP packet (Aggregation Flag (aggregation_flag)=0), the message length is not recorded, but in setting where a plurality of control messages (SI) are recorded in one MMTP packet (Aggregation Flag (aggregation_flag)=1), a field (the message length) of recording the message length, is set.

The length of one control message (SI) is recorded in a message length recording field (the message length).

The aggregation flag (aggregation_flag) is a flag indicating whether or not a plurality of data elements (the MFU or the SI) are stored one MMTP packet.

The case of Aggregation Flag (aggregation_flag)=0, indicates that only one data element (the MFU or the SI) is stored in one MMTP packet.

The case of Aggregation Flag (aggregation_flag)=1, indicates that the plurality of data elements (the MFU or the SI) are stored in one MMTP packet.

Only in a case where the plurality of control messages (SI) are recorded in one MMTP packet, a field for recording a message length for discriminating a delimiter of the message, is set.

However, in the current definition, recording the plurality of control messages (SI) in one MMTP packet, is not allowed.

Accordingly, as a result thereof, in a case where Payload Type=0x02, that is, the payload of the MMTP packet is the control message (SI) such as the management information, the payload length or the message length is not recorded in the MMTP payload header.

FIG. 14 is a diagram illustrating an example in which the plurality of data elements (the MFU or the SI) are stored in one MMTP packet.

That is, FIG. 14 is a diagram illustrating a data storage example of the MMTP packet in the case of the setting of Aggregation Flag (aggregation_flag)=1.

FIG. 14(A) is an example in which a plurality of media fragment units (MFU) are stored in the MMTP packet.

As described above with reference to FIG. 7, the MPU that is one processing unit of the data to be reproduced, such as the image, the sound, and the caption, includes one or a plurality of media fragment units (MFU), as illustrated in FIG. 7(b).

As illustrated in FIG. 14(A), the setting of storing the plurality of media fragment units (MFU) in the MMTP packet, is allowed.

FIG. 14(B) is an example in which the plurality of control messages (SI) are stored in the MMTP packet.

One unit of the control message (SI) is a message 1 (SI-1) (=Table-1) or a message 2 (SI-2) (=Table-2).

As illustrated in FIG. 14(B), a configuration in which the plurality of control messages (SI-1 (=Table-1) and SI-2 (=Table-2)) are stored in the MMTP packet, is not currently allowed.

In the control message (SI), only a configuration in which the control message in the MMTP packet is stored in each unit, is allowed.

However, a configuration in which one control message (SI) is stored in a plurality of MMTP packets by being divided, is allowed.

Figure 15:
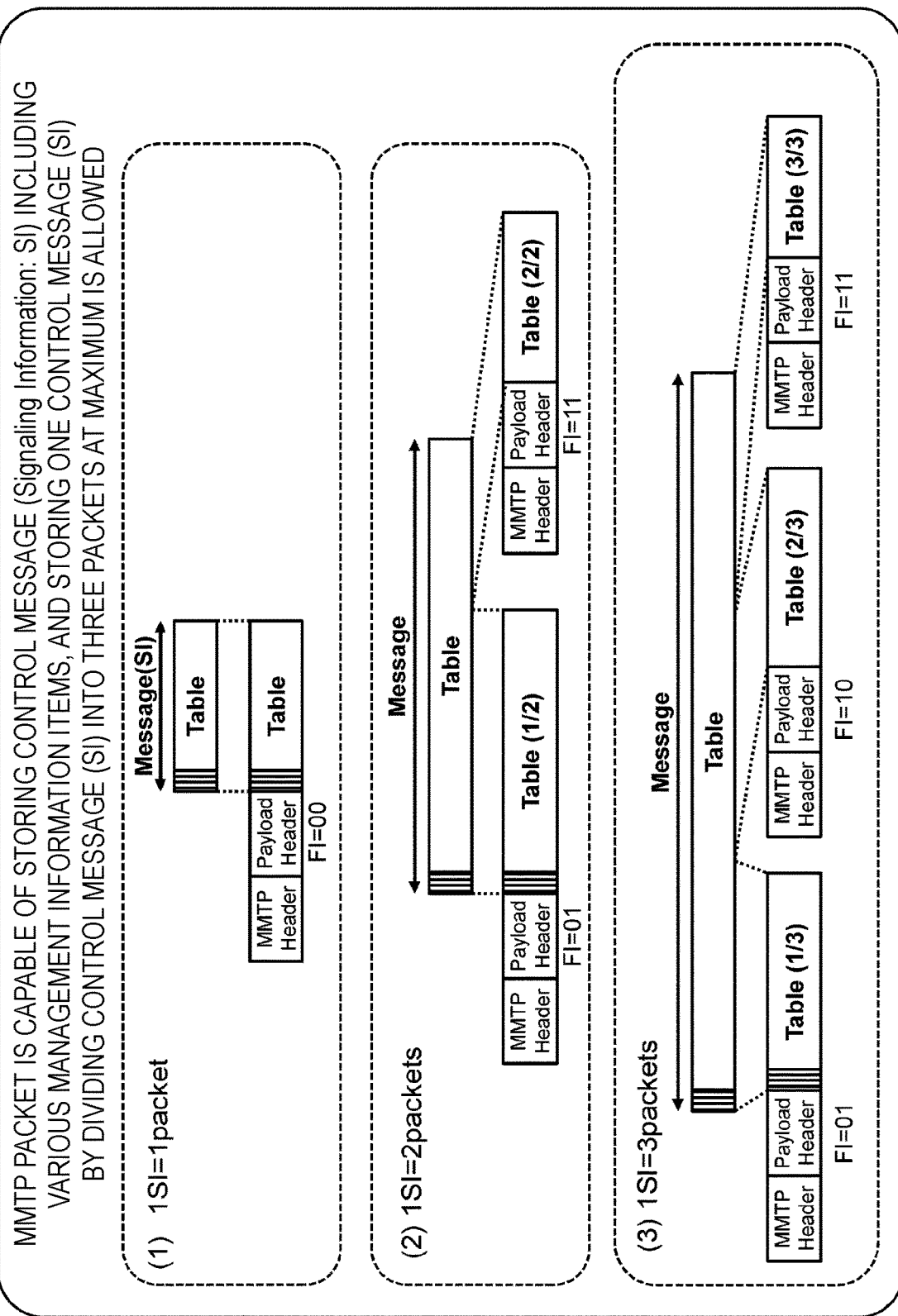
FIG. 15 is a diagram illustrating a division storage example of a control message with respect to the MMTP packet.

FIG. 15 is a diagram illustrating an allowable configuration in the case of storing the control message (SI) in the MMTP packet.

1SI=1 packet of FIG. 15(1) is an example in which one control message is stored in one MMTP packet.

One control message (SI) (=Table) is stored in one MMTP packet.

1SI=2 packets of FIG. 15(2) is an example in which one control message is stored in two MMTP packets by being divided.

One control message (SI) (=Table) is divided into two tables (Table (1/2) and Table (2/2)), and is stored in two MMTP packets by being divided.

1SI=3 packets of FIG. 15(3) is an example in which one control message is stored in three MMTP packets by being divided.

One control message (SI) (=Table) is divided into three tables (Table (1/3), Table (2/3), and Table (3/3)), and is stored in three MMTP packets by being divided.

Thus, the configuration in which one control message (SI) is stored in the plurality of MMTP packets by being divided, is allowed.

Furthermore, a fragment indicator (FI: Fragment_indicator) that is data for identifying whether the control message (SI) stored in each of the MMTP packets, is data that is divided or data that is not divided, and for identifying on which division position the data exists in a case where the control message (SI) is the divided data, is stored in the MMTP payload header (MMTP_payload_header) of the MMTP packet.

FI=00, 01, 11, and 10, illustrated in FIGS. 15(1) to 15(3), indicates the value of the fragment indicator (FI).

Figure 16:
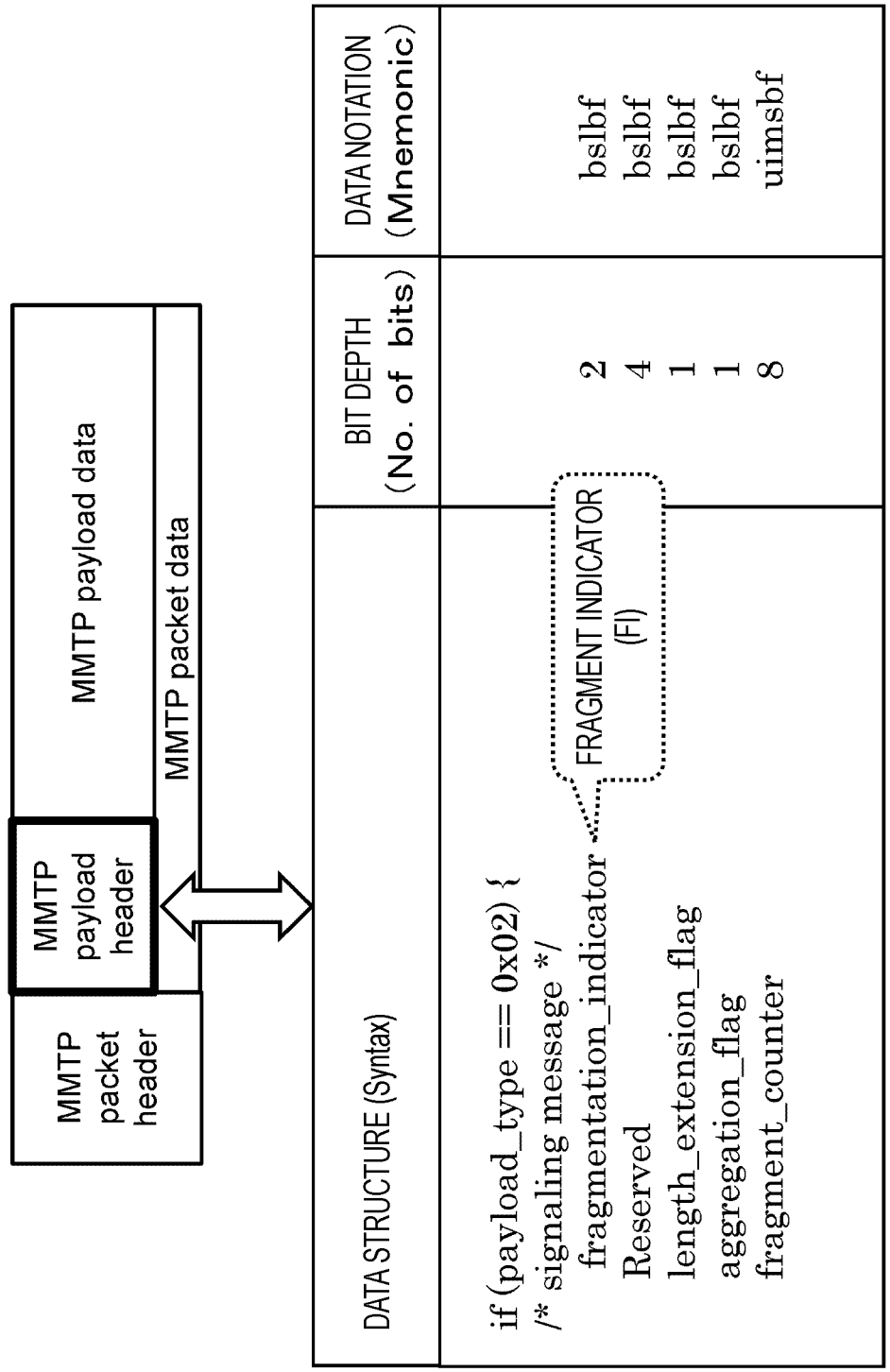
FIG. 16 is a diagram illustrating a fragment indicator stored in the MMTP payload header.

A data configuration of the MMTP payload header (MMTP_payload_header) is illustrated in FIG. 16.

As illustrated in FIG. 16, in a case where the data stored in the MMTP packet, is Data Type=0x02, that is, the control message (SI), the fragment indicator (FI: Fragment_indicator) is recorded in the MMTP payload header (MMTP_payload_header).

A setting value of the fragment indicator (FI: Fragment_indicator) and the meaning thereof, will be described with reference to FIG. 17.

As illustrated in FIG. 17, the fragment indicator (FI) can be set to each value of 00 to 11, and each setting value indicates the following.

FI=00 indicates that one data unit, that is, one entire control message (SI) is stored in the payload of the MMTP packet.

FI=01 indicates that one data unit, that is, the initial divided data of a plurality of divided data items that are set by dividing one control message (SI), is stored in the payload of the MMTP packet.

FI=10 indicates that one data unit, that is, divided data of a plurality of divided data items that a reset by dividing one control message (SI), except for the initial divided data or the final divided data, is stored the payload of the MMTP packet.

FI=11 indicates that one data unit, that is, final divided data of a plurality of divided data items that are set by dividing one control message (SI), is stored in the payload of the MMTP packet.

A reproducing device extracting and analyzing the data from the MMTP packet, is capable of identifying whether the control message (SI) stored in the MMTP packet, is the data that is divided or the data that is not divided, and is capable of identifying on which division position the data exists in a case where the control message (SI) is the divided data, on the basis of the setting value of the fragment indicator (FI).

However, the fragment indicator (FI) merely indicates a division mode of the data stored in the MMTP packet, and does not indicate the data length of the MMTP packet.

Accordingly, in a case where the control message (SI) is stored in the MMTP packet, it is not possible to know the length of the MMTP packet, that is, a packet size or a payload size.

A specific example in which such a problem occurs, will be described with reference to FIG. 18.

Figure 18:
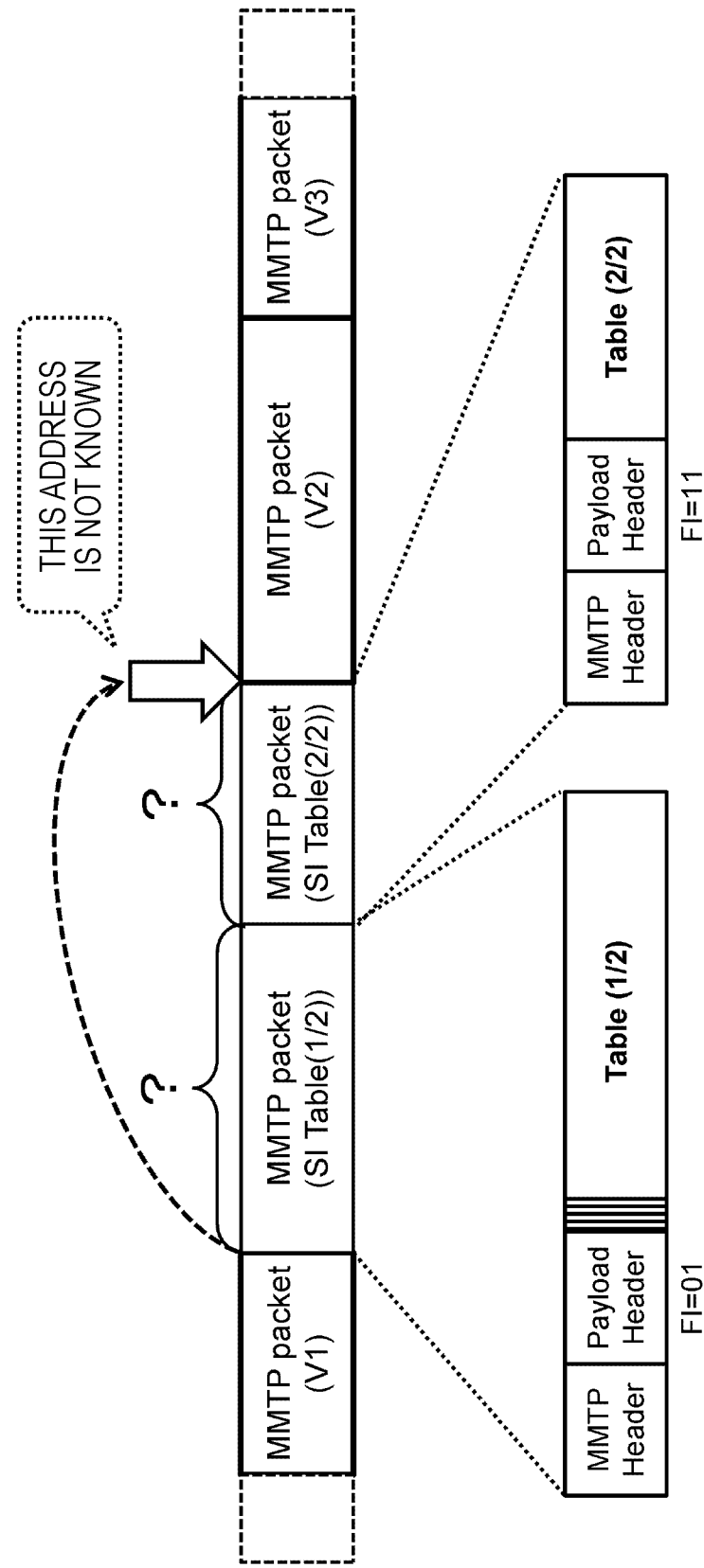
FIG. 18 is a diagram illustrating a problem in discriminating processing of a packet delimiter from the MMTP packet string.

FIG. 18 illustrates the MMTP packet string that is proposed as the configuration of the data for medium recording, as described above with reference to FIG. 9(C).

In the medium, an MMTP packet (V) storing the image, an MMTP packet (SI) storing the control message including various management information items, and a storage packet of other data items (the sound and the caption) are recorded as a packet string in which the packets are mixed.

In the case of performing data reproducing from the medium in which the MMTP packet string is recorded, for example, in order to decode and reproduce the image data, processing of sequentially and selectively acquiring only the MMTP packet (V) storing the image data, from the packet string, of extracting coded image data from the acquired packet, and of decoding and reproducing the extracted data, is necessary.

Furthermore, the type of data (the image, the sound, or the like) stored in the MMTP packet, can be discriminated on the basis of a packet ID (packet_id) that is the recording data of the existing packet header (MMTP packet header) of the MMTP packet.

A case where the data stored in the medium, for example, is the MMTP packet string as illustrated in FIG. 18, is assumed.

MMTP packets (V1), (V2), and (V3) are the MMTP packet storing the image data.

MMTP packets (SI Table (1/2)) and (SI Table (2/2)) are the MMTP packet storing the divided data of the control message (SI).

The packet length of the MMTP packets is not uniform, and the MMTP packets have different lengths (packet sizes), respectively.

As described above with reference to FIG. 13, in a case where the data stored in the MMTP packet is the MPU such as the image, the sound, and the caption, it is possible to confirm a payload length in the case of referring to the MMTP payload header (MMTP_payload_header) of the MMTP packet.

That is, in the MMTP packets (V1), (V2), and (V3) illustrated in FIG. 18, it is possible to know the packet length.

However, in a case where the data stored in the MMTP packet is the control message (SI) that is not the image, the sound, and the caption, it is not possible to confirm the payload length even in the case of referring to the MMTP payload header (MMTP_payload_header) of the MMTP packet.

That is, in the MMTP packets (SI Table(1/2)) and (SI Table(2/2)) illustrated in FIG. 18, it is not possible to know the packet length.

As a result thereof, in order to decode and reproduce the image data, the reproducing device, first, selects the MMTP packet (V1) that is the initial image storage MMTP packet, from the MMTP packet string, and acquires the image data stored as a payload, from the MMTP packet (V1).

Next, it is necessary to select the MMTP packet (V2) that is the next image storage MMTP packet, from the MMTP packet string.

However, the MMTP packet (SI Table(1/2)) and the MMTP packet (SI Table(2/2)) that area control message (SI) storage packet, exist between the MMTP packet (V1) and the MMTP packet (V2).

There is no recording data of the packet length in the control message (SI) storage packet, and thus, it is not possible to discriminate a terminal position of the packet.

That is, it is not possible to acquire a leading position (a leading address) of the MMTP packet (V2) that is the next image storage packet of the MMTP packet (V1) that is an image storage packet, and to select and reproduce the image storage packet.

Similarly, in the sound, the caption, and the like, in a case where it is not possible to confirm the packet length of all of the MMTP packets configuring the MMTP packet string recorded in the medium, it is not possible to sequentially select a packet storing the same type of data, from the MMTP packet string recorded in the medium, to extract the same type of data, and to perform decoding and reproducing according to each data type.

5. Configuration Example of Capable of Confirming Packet Length of MMTP Packet Recorded in Information Recording Medium Next, a configuration example in which the problem described above is solved, and the size (the packet length) of all of the MMTP packets recorded in the information recording medium (media), can be confirmed, will be described.

According to such a configuration, processing of sequentially selecting and reproducing the same type of data, for example, the packet storing the image data, from the MMTP packet string recorded in the medium, can be performed.

Figure 19:
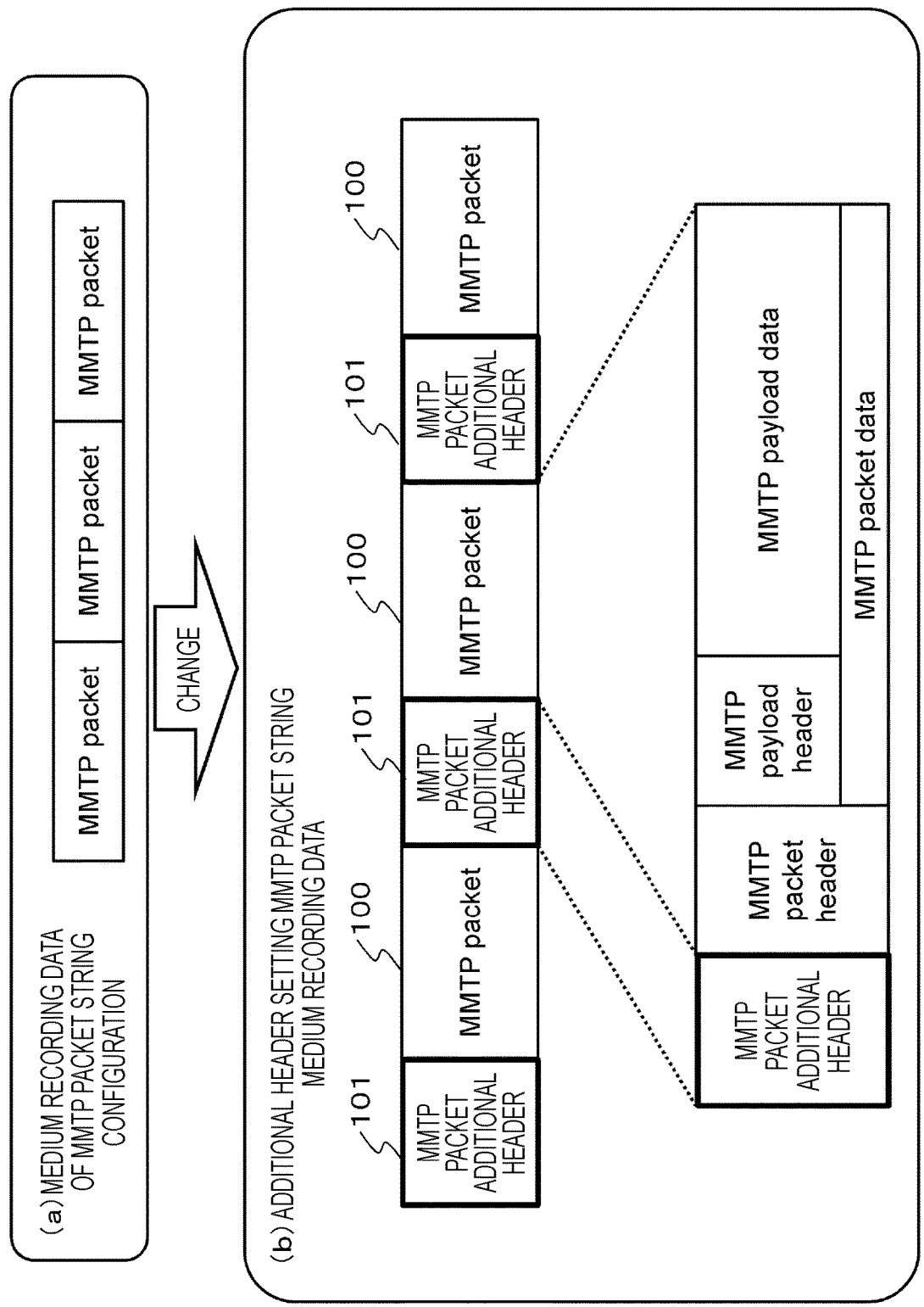
FIG. 19 is a diagram illustrating an example in which an additional header is set in the MMTP packet.

FIG. 19 is a diagram illustrating a configuration in which the size of the MMTP packet can be confirmed.

The packet string illustrated in FIG. 19(*a*), is the MMTP packet string described above with reference to FIG. 9(C), and as described with reference to FIG. 18, is a packet string in which the size of each of the MMTP packets is not known, and the packet delimiter is not known.

In order to solve the problem described above, as illustrated in FIG. 19(*b*), an additional header (an MMTP packet additional header 101) is set before each MMTP packet 100 to be recorded, at the time of recording the MMTP packet in the information recording medium (media).

Information such as the packet length of the subsequent MMTP packet, is recorded in the MMTP packet additional header 101.

A data configuration example of the MMTP packet additional header 101 will be described with reference to FIG. 20.

Figure 20:
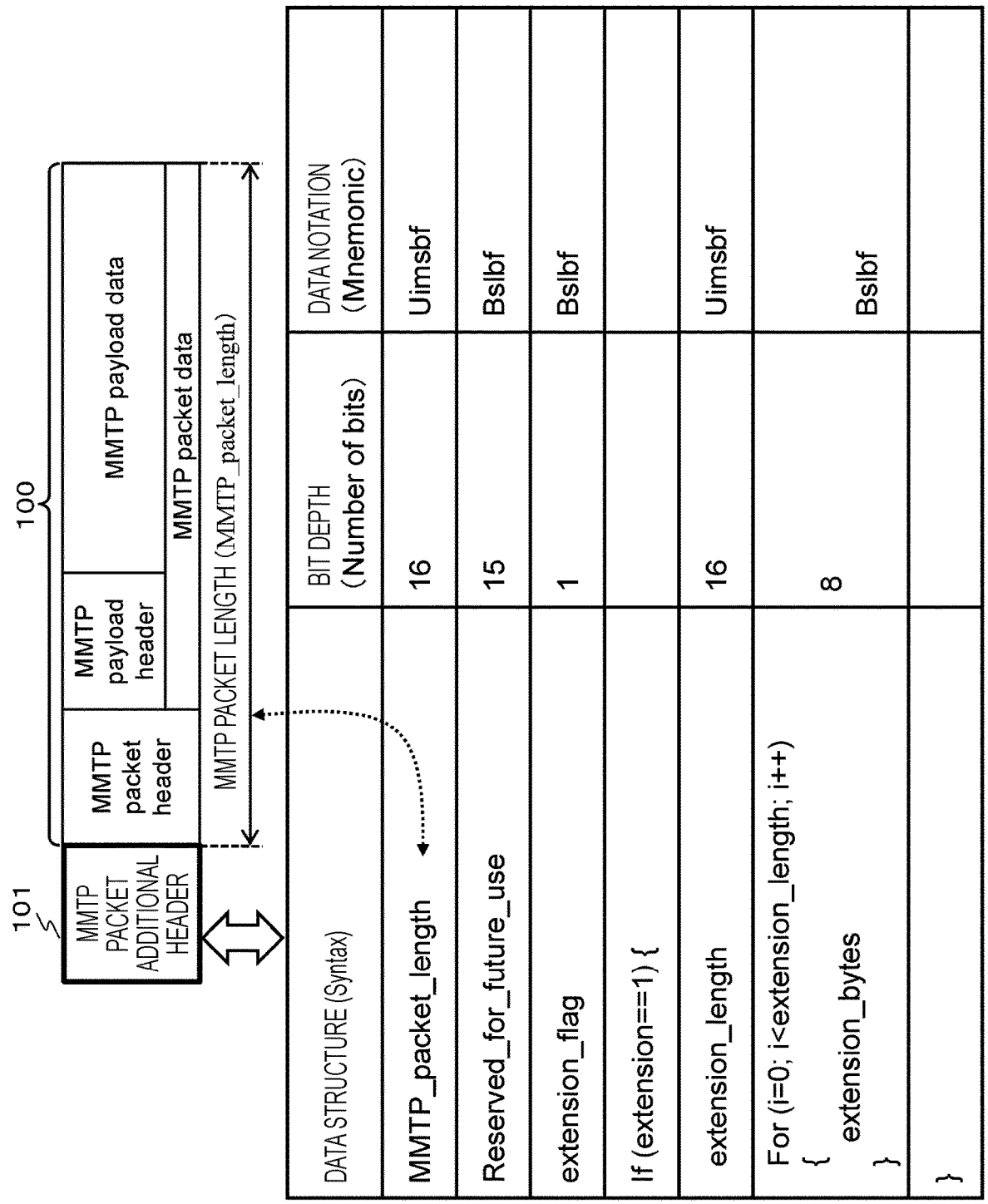
FIG. 20 is a diagram illustrating a data configuration example of the additional header of the MMTP packet.

As illustrated in FIG. 20, the MMTP packet additional header 101 includes the following data recording regions:

(1) MMTP Packet Length (MMTP_packet_length)=16 bits;

(2) Reserved Region (Reserved_for_future_use)=15 bits;

(3) Extension Flag (extension_flag)=1 bit (4) Extension Data Length (extension_length)=16 bits; and (5) Extension Data (extension_bytes)=8 bits.

As illustrated in FIG. 20, the MMTP packet length (MMTP_packet_length) records the packet length of the MMTP packet subsequent to MMTP packet additional header 101. Specifically, for example, the data byte length of the MMTP packet is recorded.

In the extension flag (extension_flag), whether or not the extension data is included in the header, is recorded.

For example, in the case of including the extension data, the flag is set to 1, and in the case of not including the extension data, the flag is set to 0.

In the case of including the extension data (Flag=1), the data length of the extension data is recorded in the next extension data length (extension_length), and the extension data is recorded in the extension data (extension_bytes).

The additional header having such a configuration, is set on a prestage of each of the MMTP packets, and is recorded in the information recording medium (media).

The outline of processing to be executed by the information processing device (the recording device) that executes the data recording with respect to the information recording medium (media), will be described with reference to FIG. 21.

Figure 21:
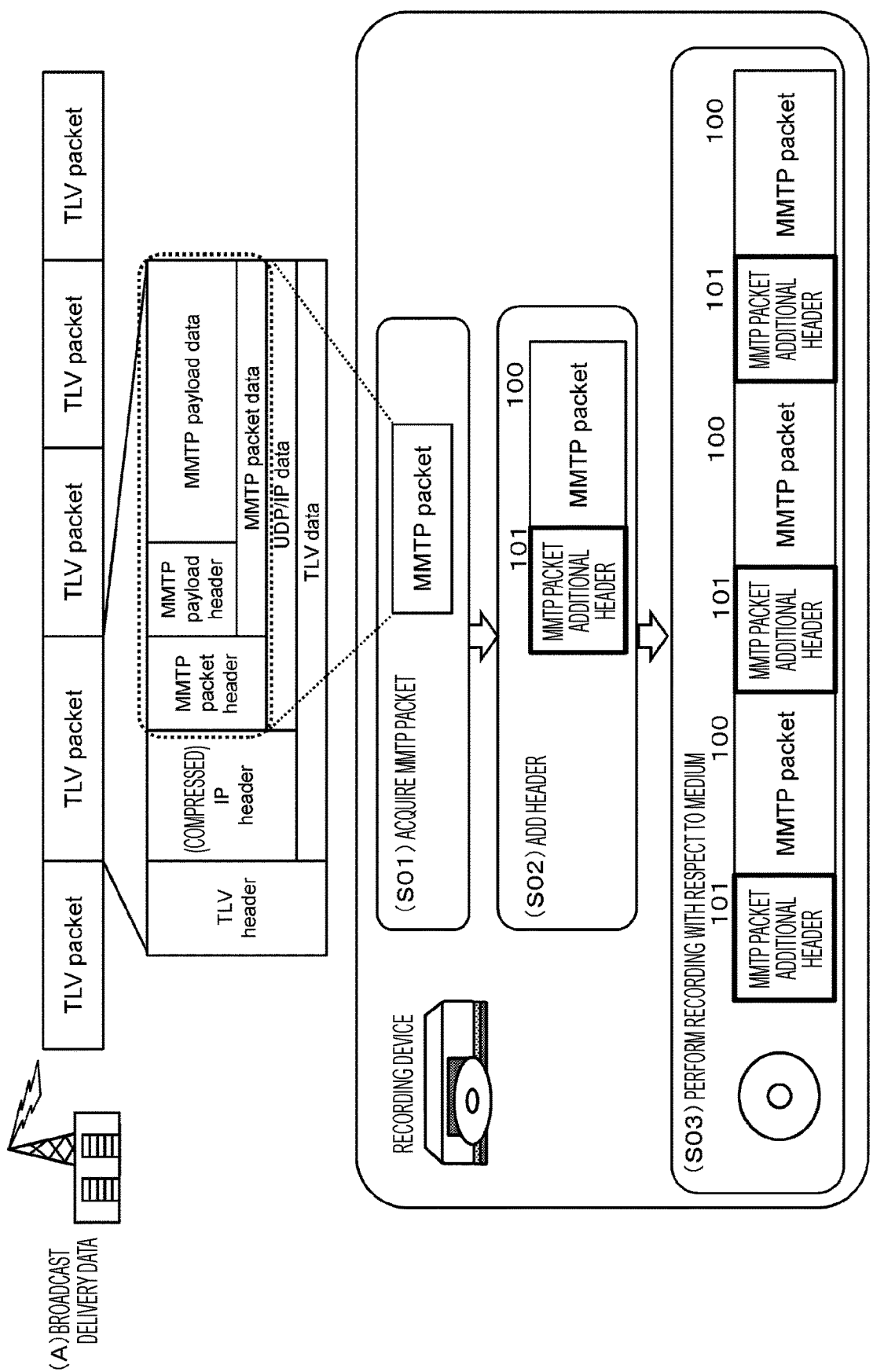
FIG. 21 is a diagram illustrating a set of processing of receiving the TLV packet, and of recording the MMTP packet string in which the additional header is set, in the information recording medium (media).

On the upper portion of FIG. 21, (A) broadcast data transmitted from the transmission device 20 such as a broadcast station, is illustrated.

(A) The broadcast data includes the TLV packet string, and the MMTP packet is included in each of the TLV packets.

The MMTP packet that is the configuration data of the TLV packet, includes the following elements:

(a) MMTP Packet Header (MMTP_packet_header); and (b) MMTP Packet Data (MMTP_packet_data) (=Payload).

In addition, the MMTP packet data (MMTP_packet_data) (=Payload) includes the following elements:

(b1) MMTP Payload Header (MMTP_payload_header); and (b2) MMTP Payload Data (MMTP_payload_data).

The information processing device (the recording device) that executes the data recording with respect to the information recording medium (media), first, acquires the MMTP packet from the TLV packet, in "step S01".

Next, in "step S02", the additional header (the MMTP packet additional header) in which the packet length of the MMTP packet, is recorded on the prestage of the MMTP packet acquired from the TLV packet, is set.

Furthermore, the details of acquiring processing the packet length of the MMTP packet will be described below.

Further, in "step S03", a "combination of the additional header-MMTP packets" having the MMTP packet additional header on the prestage of the MMTP packet, is sequentially recorded in the medium.

As a result thereof, the MMTP packet additional header in which the packet length of the MMTP packet is recorded on the prestage of each of the MMTP packets, is recorded in the medium, along with the MMTP packet.

For example, the reproducing device that executes the contents reproducing processing from the medium, is capable of confirming the packet length of each of the MMTP packets, with reference to the recording data of the MMTP packet additional header, and is capable of discriminating each MMTP packet delimiter position (address).

As a result thereof, processing of sequentially selecting only a specific type of data, for example, the packet in which the image is recorded, from the packet string in which the image, the sound, the caption, and the control message (SI) are mixed, and of decoding and reproducing the selected data.

Furthermore, the type of data (the image, the sound, and the like) stored in the MMTP packet can be discriminated on the basis of the packet ID (packet_id) that is the recording data of the existing packet header (the MMTP packet header) of the MMTP packet.

Next, the details of the acquiring processing of the packet length of the MMTP packet, necessary for setting processing of the additional header (the MMTP packet additional header) in which the packet length of the MMTP packet is recorded, to be executed in "step S02" illustrated in FIG. 21, will be described.

First, the information processing device 30 that receives the TLV packet transmitted from the transmission device 20 such as a broadcast station, performs separating processing (filtering) of the TLV packet according to the payload of the TLV packet, with reference to the header of the TLV packet.

The separating processing (the filtering) of the TLV packet will be described with reference to FIG. 22.

Figure 22:
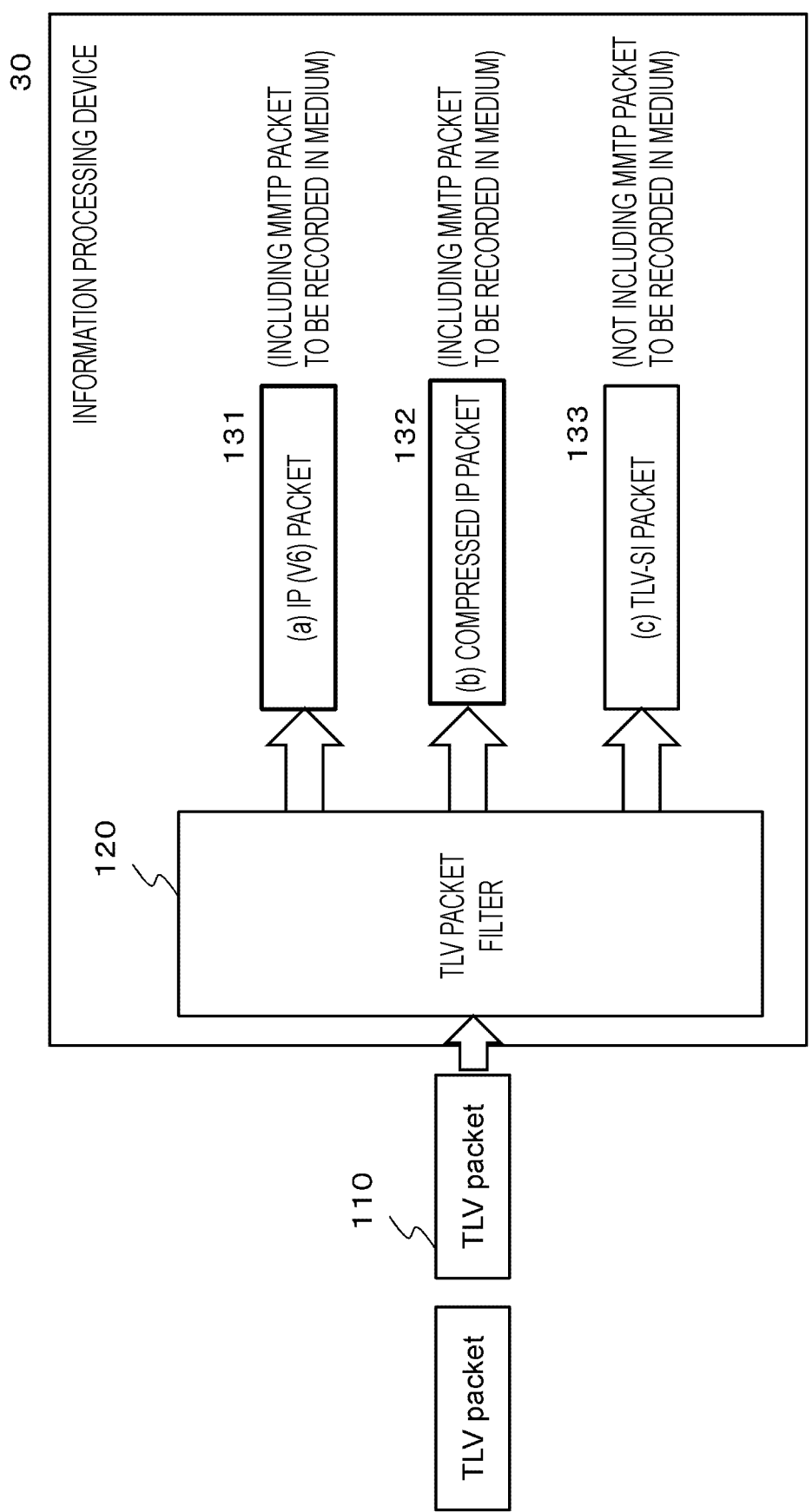
FIG. 22 is a diagram illustrating a filtering processing example of the TLV packet.

FIG. 22 is a diagram illustrating the separating processing (the filtering) of the TLV packet, executed by the information processing device 30 receiving the TLV packet transmitted from the transmission device 20 such as a broadcast station.

The information processing device 30 executes filtering processing of sequentially receiving a TLV packet 110 transmitted from the transmission device 20 such as a broadcast station, and of separating the received TLV packet into the following three TLV packets in a TLV packet filter 120:

(a) IP (V6) Packet 131;

(b) Compressed IP Packet 132; and (c) TLV-SI Packet 133.

Furthermore, the filtering processing is executed with reference to the TLV header set in the TLV packet.

Figure 23:
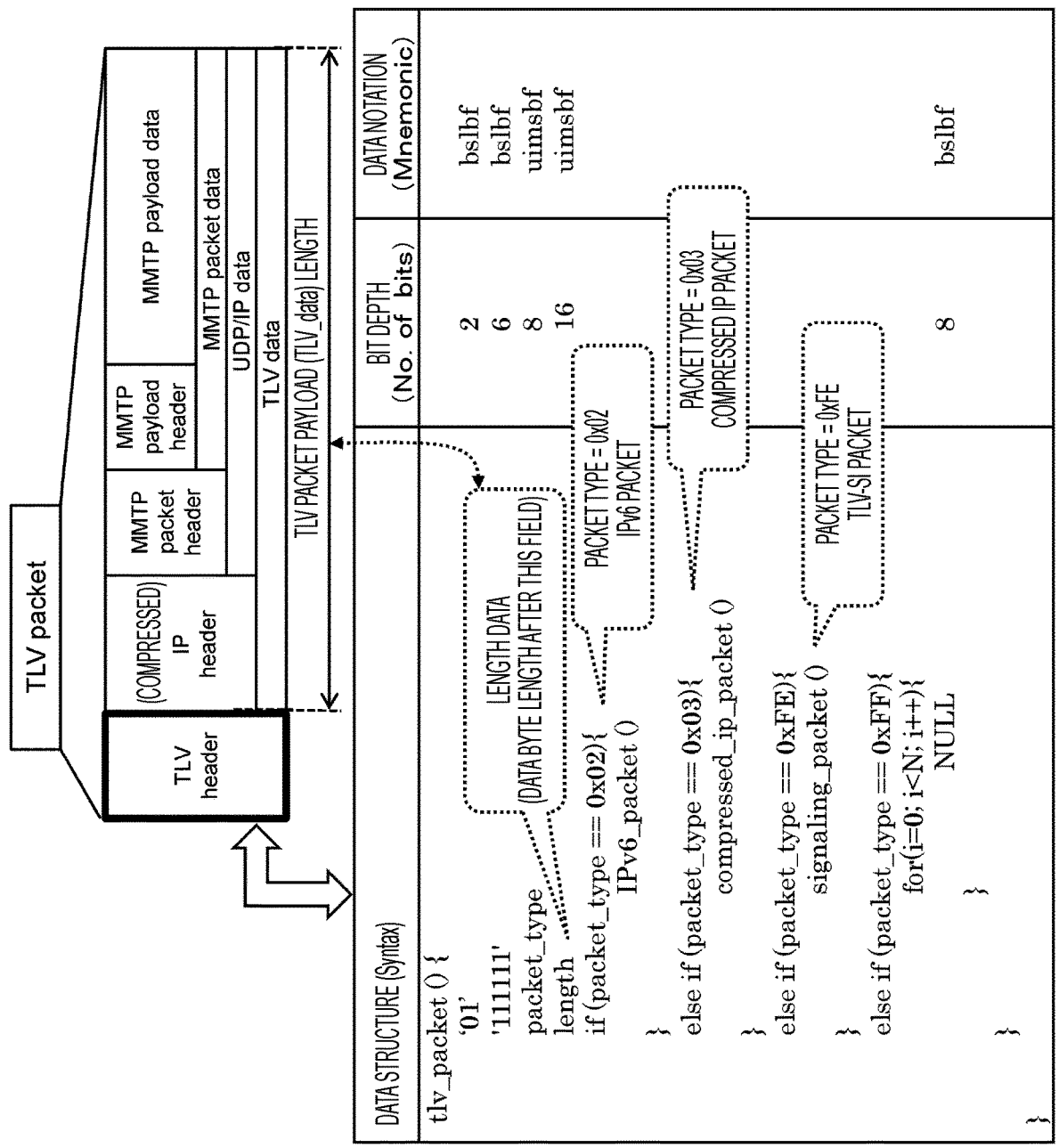
FIG. 23 is a diagram illustrating a packet type recorded in the TLV header of the TLV packet.

A data configuration of the TLV header is illustrated in FIG. 23.

As illustrated in FIG. 23, the packet length data (the length) of the TLV packet is recorded in the TLV header, as described above with reference to FIG. 10.

The packet length data (the length) of the TLV packet corresponds to the data length TLV_data (=TLV Payload) excluding the TLV header of the TLV packet. Specifically, the data byte length of TLV_data (=TLV Payload) is recorded.

Further, a packet type (packet_type) is recorded in the TLV header.

Which of (a) to (c) described above, the TLV packet is, can be identified according to the value of the packet type.

Specifically, the TLV packet is set as follows.

Packet Type (packet_type)=0x02 indicates that the TLV packet is the "IP (V6) packet".

Packet Type (packet_type)=0x03 indicates that the TLV packet is the "compressed IP packet".

Packet Type (packet_type)=0xFE indicates that the TLV packet is the "TLV-SI packet".

Thus, the information processing device 30 executes packet separating processing (filtering) illustrated in FIG. 22, with reference to the packet type (packet_type) of the TLV header set in the TLV packet.

(c) The TLV-SI packet 133 illustrated in FIG. 22, is a TLV packet storing the control message (TLV-SI). The TLV-SI packet 133 does not include the MMTP packet to be recorded in the information recording medium (media), and thus, is not used in medium recording processing.

As described above, the TLV-SI includes the control message mainly necessary for data receiving control, and the control message necessary for reproducing the contents recorded in the medium, is included in the control message (MMT-SI) stored in the MMTP packet.

On the other hand, (a) the IP (V6) packet 131, and (b) the compressed IP packet 132 include the MMTP packet to be recorded in the information recording medium (media).

Such packets include the MPU including the contents such as the image, the sound, and the caption, to be recorded in the information recording medium (media), or the MMTP packet storing the control message (MMT-SI).

The information processing device 30 that executes processing of recording data in the information recording medium (media), acquires the following two types of TLV packets to be obtained as a result of being separated (filtered) by the TLV packet filter 120, that is, (a) the IP (V6) packet 131, and (b) the compressed IP packet 132, and executes the processing of steps S01 to S03, described above with reference to FIG. 21.

The acquiring processing of the packet length of the MMTP packet, necessary for the setting processing of the additional header (the MMTP packet additional header) in which the packet length of the MMTP packet is recorded, to be executed in "step 502" illustrated in FIG. 21, is processing that is different according to two TLV packets of (a) and (b) described above.

Hereinafter, the acquiring processing of the packet length of the MMTP packet according to each of the TLV packets, will be described.

First, the acquiring processing of the packet length of the MMTP packet in a case where the TLV packet is the IP (V6) packet, will be described.

Figure 24:
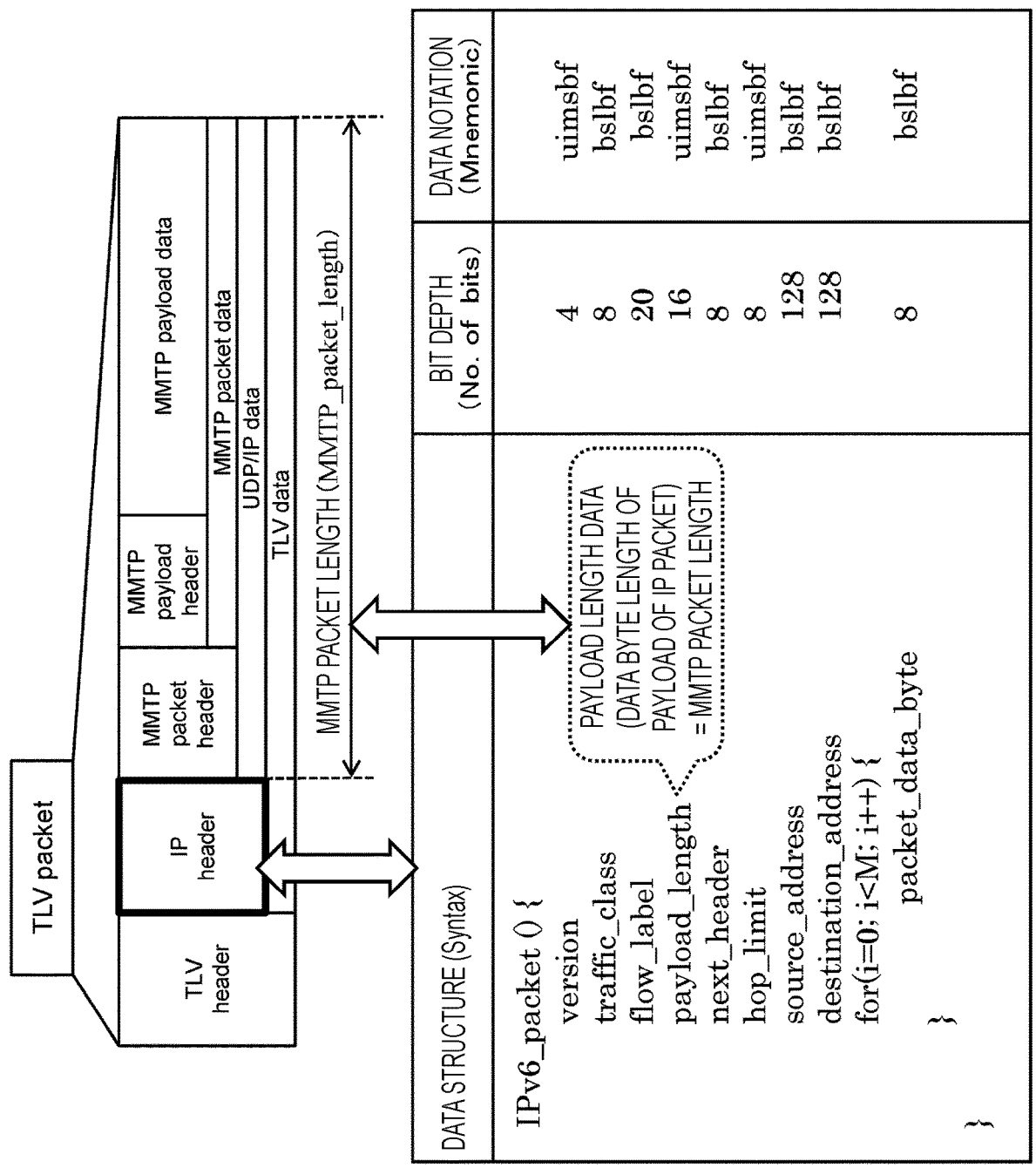
FIG. 24 is a diagram illustrating recording data of an IP header of an IP (v6) packet.

FIG. 24 illustrates a data configuration of the IP header in a case where the TLV packet is the IP (V6) packet.

As illustrated in FIG. 24, the payload length data (payload_length) of the IP packet is recorded in the IP header in a case where the TLV packet is the IP (V6) packet. Specifically, the data byte length of the IP data (=IP Payload) is recorded.

The payload length data (payload_length) recorded in the IP header, is data length IP_data (=IP Payload) excluding the IP header of the IP packet, that is, corresponds to the data length of the MMTP packet.

In a case where the TLV packet including the MMTP packet to be recorded in the medium (media), is the IP (V6) packet, the information processing device that executes the data recording with respect to the information recording medium, acquires the payload length data (payload_length) recorded in the IP header.

In step S02 illustrated in FIG. 21, the acquired data, is recorded as packet length data of the MMTP packet additional header 101, that is, as the MMTP packet length (MMTP_packet_length) illustrated in FIG. 20.

Next, the acquiring processing of the packet length of the MMTP packet in a case where the TLV packet is the compressed IP packet, will be described.

Figure 25:
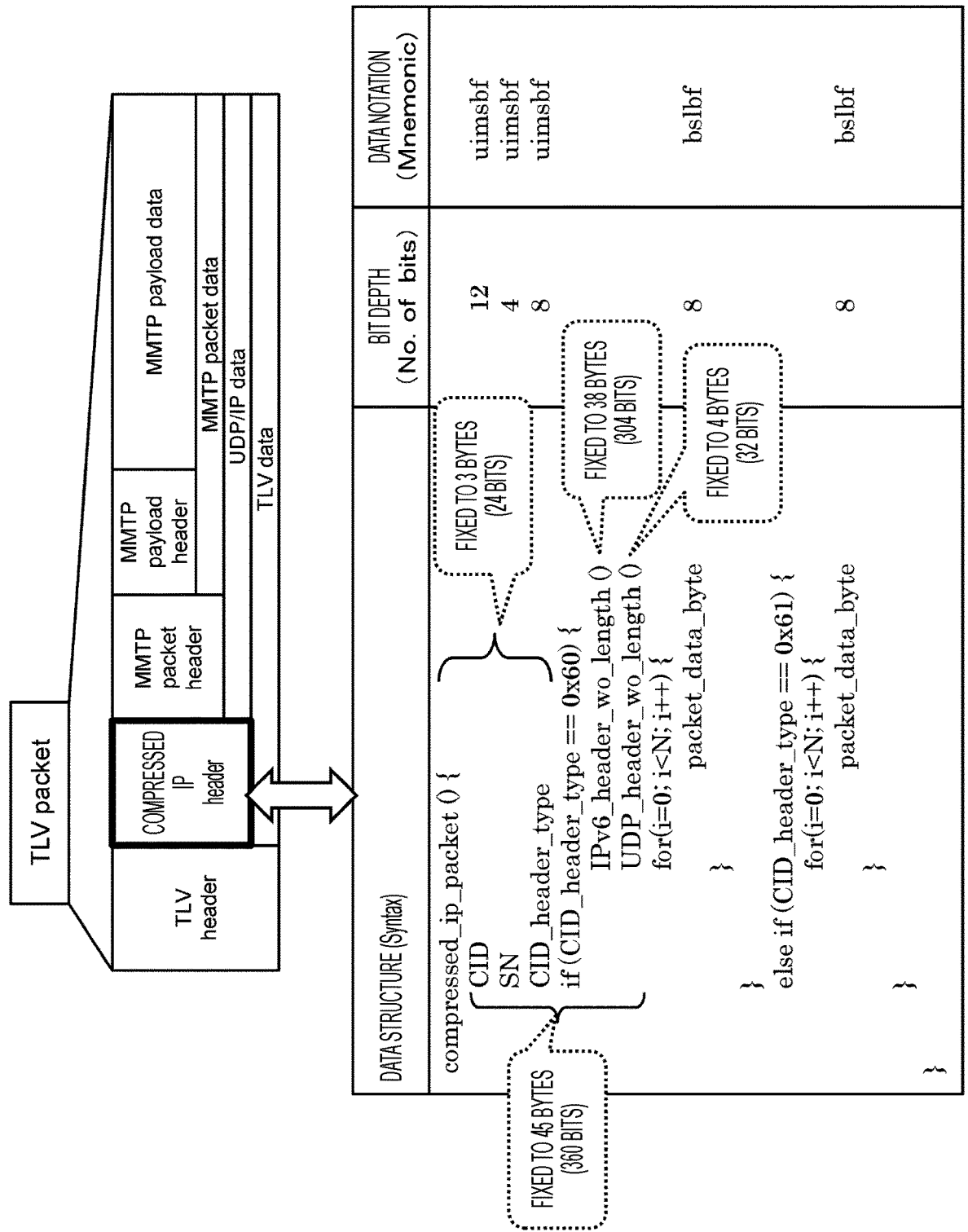
FIG. 25 is a diagram illustrating recording data of an IP header of a compressed IP packet.

FIG. 25 illustrates a data configuration of the IP header (compressed IP header) in a case where the TLV packet is the compressed IP packet.

As illustrated in FIG. 25, in the IP header in a case where the TLV packet is the compressed IP packet, each data item of CID, SN, and a CID header type (CID_header_type), is recorded, and data (packet_data_byte) according to the CID header type (CID_header_type), is further recorded.

In the context identifier (CID), an identifier (a context identifier) of specifying an IP data flow subjected to header compression, is recorded.

In the SN, the order of the IP packet that has the same context identification and is subjected to the header compression, is recorded in the order from 0.

In the CID header type (CID_header_type), a header type of the context identifier is recorded.

In the CID header type (CID_header_type), the following two types are defined:
 CID Header Type (CID_header_type)=0x60; and
 CID Header Type (CID_header_type)=0x61.

"CID Header Type (CID_header_type)=0x60" indicates that the header type of the context identifier has an IPv6/UDP header and is a full header at the time of IP packet compression.

"CID Header Type (CID_header_type)=0x61" indicates that the header type of the context identifier has the IPv6/UDP header and is a compressed header at the time of the IP packet compression.

In the case of performing the data recording with respect to the information recording medium (media), it is necessary to acquire the data length of the MMTP packet subsequent to the IP header.

Here, it is a problem to calculate the data length of the IP header itself.

A data length of a TLV data (the TLV payload) excluding the TLV header of the TLV packet illustrated in FIG. 25, can be acquired from the recording data of the TLV header.

As described above with reference to FIG. 23, the packet length data (the length) of the TLV packet is recorded in the TLV header.

The packet length data (the length) of the TLV packet corresponds to the data length of TLV_data (=TLV Payload) excluding the TLV header of the TLV packet. Specifically, the data byte length of TLV data (=TLV Payload) is recorded.

Accordingly, in a case where the data length of the IP header is known, the data length of the IP header of the compressed IP packet is subtracted from the packet length data (the length) of the TLV packet recorded in the TLV header, and thus, the packet length of the MMTP packet can be calculated.

That is, the MMTP packet length is calculated according to the following calculation expression.

MMTP Packet Length=(TLV Payload Length)−(IP Header Length of Compressed IP Packet)

In order for such calculating processing, it is necessary to obtain the header length of the IP header of the compressed IP packet.

FIG. 25 illustrates the data length (a byte depth/a bit depth) of each of the recording data items of the IP header of the compressed IP packet:
 CID=12 bits;
 SN=4 bits; and
 CID Header Type=8 bits.

The total data length of three data items, is 3 bytes (24 bits).

Further, in the case of CID Header Type=0x60, the following data items are respectively recorded in the IP header:
 IPv6_header wo_length; and
 UDP_header_wo_length.

In such data recording regions, data or the like necessary for the receiving processing of the IP packet, and the like, is recorded.

FIG. 26 illustrates a data configuration of two data recording regions, that is, the data recording regions of IPv6_header wo_length and UDP_header_wo_length, described above.

As understood from the data configuration illustrated in FIG. 26, the bit depth of each of the data items recorded in two data recording regions, is fixed.

As a result thereof, the data length of two data recording regions is fixed.

Specifically, the data length of two data recording regions is fixed to the following data length.

The data length of "IPv6_header wo_length" is 38 bytes (304 bits)

The data length of "UDP_header_wo_length" is 4 bytes (32 bits)

Furthermore, two data recording regions are set in the IP header only in the case of CID Header Type=0x60.

In the case of CID Header Type=0x61, the data recording regions are not set in the IP header.

A specific example of packet length calculating processing of the MMTP packet in a case where the TLV packet is the compressed IP packet, will be described with reference to FIG. 27.

Figure 27:
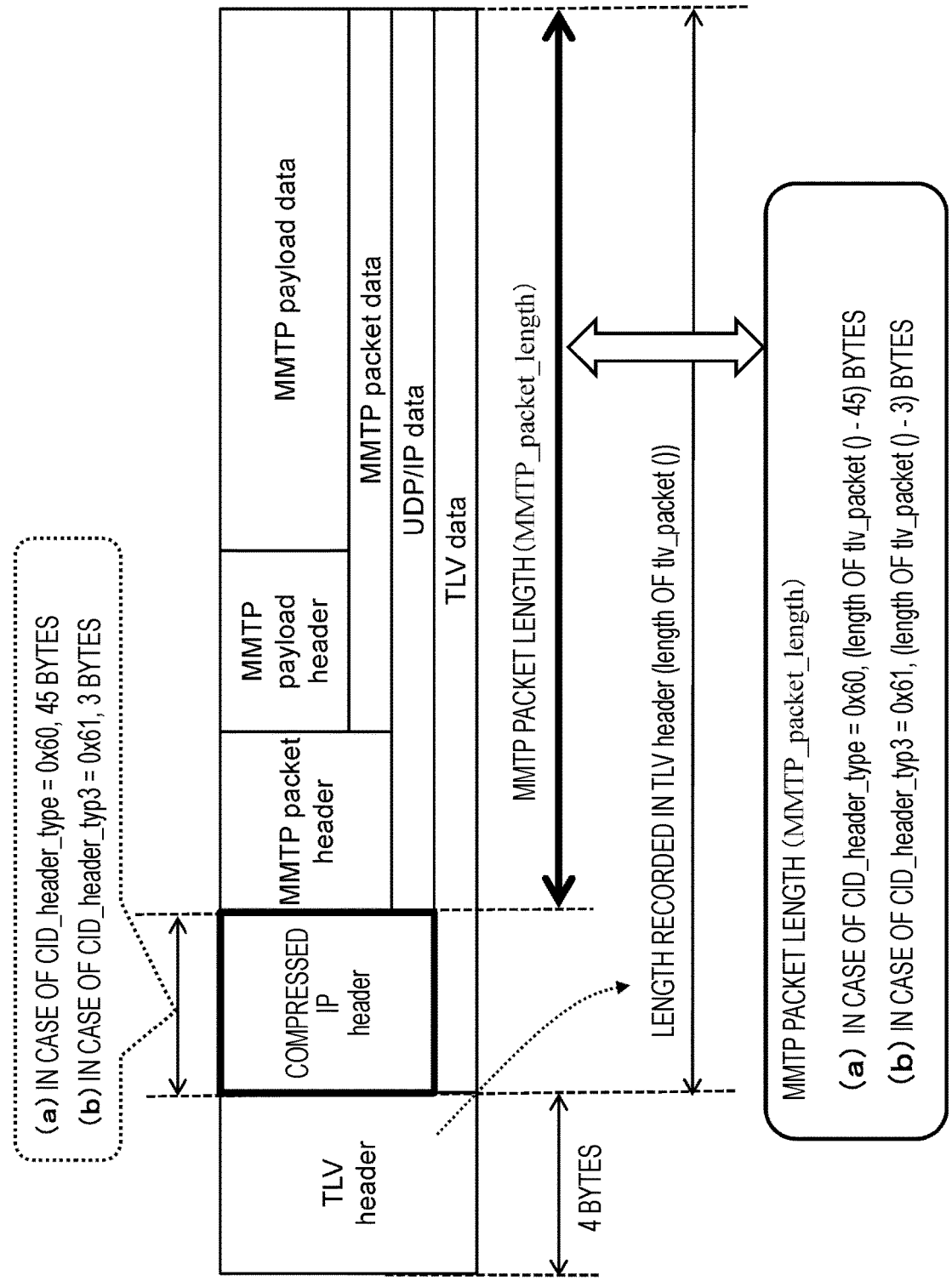
FIG. 27 is a diagram illustrating a packet length calculating processing example of the MMTP packet.

FIG. 27 illustrates the calculating processing of the MMTP packet length according to a CID header type recorded in the IP header of the compressed IP packet.

That is, the calculating processing of the MMTP packet length according to two types of CID Header Type=0x60 and CID Header Type=0x61, is performed.

Furthermore, in any type of CID Header Type=0x60 and CID Header Type=0x61, the data length of the IP header of the compressed IP packet is subtracted from the packet length data (the length) of the TLV packet recorded in the TLV header, and thus, the packet length of the MMTP packet is calculated.

That is, the MMTP packet length is calculated according to the following calculation expression.

MMTP Packet Length=(TLV Payload Length)−(IP Header Length of Compressed IP Packet)

However, the length of the IP header is different according to two types of CID Header Type=0x60 and CID Header Type=0x61, and thus, processing different according to each of the types, is executed.

First, the calculating processing of the MMTP packet length in the case of CID Header Type=0x60, will be described.

In the case of CID Header Type=0x60, the following data items are respectively recorded in the IP header:

CID=12 bits;
SN=4 bits; and
CID Header Type=8 bits.

The total data length of three data items, is 3 bytes (24 bits).

Further, data items of IPv6_header wo_length=38 bytes (304 bits) and UDP_header_wo_length=4 bytes (32 bits), are recorded.

As a result thereof, in the case of CID Header Type=0x60, the data length of the IP header is 3+38+4=45 bytes.

Accordingly, the MMTP packet length (byte) in the case of CID Header Type=0x60, can be calculated according to the following expression.

MMTP Packet Length (Byte)=(TLV Payload Length (Byte))−(45 Bytes)

Next, the calculating processing of the MMTP packet length in the case of CID Header Type=0x61, will be described.

In the case of CID Header Type=0x61, the following data items are respectively recorded in the IP header:

CID=12 bits;
SN=4 bits; and
CID Header Type=8 bits.

The total data length of three data items, is 3 bytes (24 bits).

The data items are recorded.

As a result thereof, in the case of CID Header Type=0x61, the data length of the IP header is 3 bytes.

Accordingly, the MMTP packet length (byte) in the case of CID Header Type=0x61, can be calculated according to the following expression.

MMTP Packet Length (Byte)=(TLV Payload Length (Byte))−(3 Bytes)

In a case where the TLV packet including the MMTP packet to be recorded in the medium, is the compressed IP packet, as described above, the information processing device that executes the data recording with respect to the information recording medium (media), calculates the MMTP packet length, according to arithmetic processing in which the data length of the IP header is calculated according to the CID header type, the calculated data length of the IP header and a TLV payload length recorded in the TLV header, are used, that is, the following arithmetic expression.

MMTP Packet Length=(TLV Payload Length)−(IP Header Length of Compressed IP Packet)

In step S02 illustrated in FIG. 21, the calculated data is recorded as the packet length data of the MMTP packet additional header 101, that is, the MMTP packet length (MMTP_packet_length) illustrated in FIG. 20.

Thus, the information processing device that executes the data recording with respect to the information recording medium (media), executes processing different according to whether the TLV packet including the MMTP packet to be recorded in the medium is the IP (V6) packet or the compressed IP packet, and acquires the MMTP packet length that is recorded in the additional header.

The MMTP packet length acquired as described above, is recorded in the additional header (the MMTP packet additional header) having the data configuration described above with reference to FIG. 20.

In step S02 described with reference to FIG. 21, the information processing device adds the additional header in which the MMTP packet length is recorded, to a leading portion of the MMTP packet having the packet length, and records the additional header in the medium in step S03.

As a result of such processing, the MMTP packet additional header in which the length information of the MMTP packet is recorded, is recorded, on the prestage of each of the MMTP packets recorded in the medium, as illustrated in (S03) of FIG. 21.

The reproducing device that performs the data reproducing from the medium, is capable of confirming the packet length of each of the MMTP packets, and is capable of discriminating each of the MMTP packet delimiter positions (addresses), with reference to the recording data of the MMTP packet additional header.

As a result thereof, processing of sequentially selecting only a specific type of data, for example, the packet in which the image is recorded, from the packet string in which the image, the sound, the caption, and the control message (SI) are mixed, and of decoding and reproducing the selected data.

Furthermore, the type of data (the image, the sound, and the like) stored in the MMTP packet can be discriminated, on the basis of the packet ID (packet_id) that is the recording data of the existing packet header (the MMTP packet header) of the MMTP packet.

6. Configuration and Processing of Information Processing Device Executing Data Recording Processing with Respect to Information Recording Medium Next, the configuration and the processing of the information processing device that executes the data recording processing with respect to the information recording medium, will be described with reference to FIG. 28 and the like.

As described above, the information processing device of the present disclosure, records input data according to the MMT format, in the information recording medium such as a BD, an HD, or a flash memory, as the BDAV format data.

Further, processing of adding the additional header (the MMTP packet additional header) in which the packet length data of the MMTP packet is recorded, is performed, and thus, the additional header is recorded, at the time of such data recording processing.

The packet length data of the MMTP packet, for example, is acquired from the TLV header, the IP header, or the like that is the control information included in the input data according to the MMT format, or is calculated on the basis of the acquired data.

Figure 28:
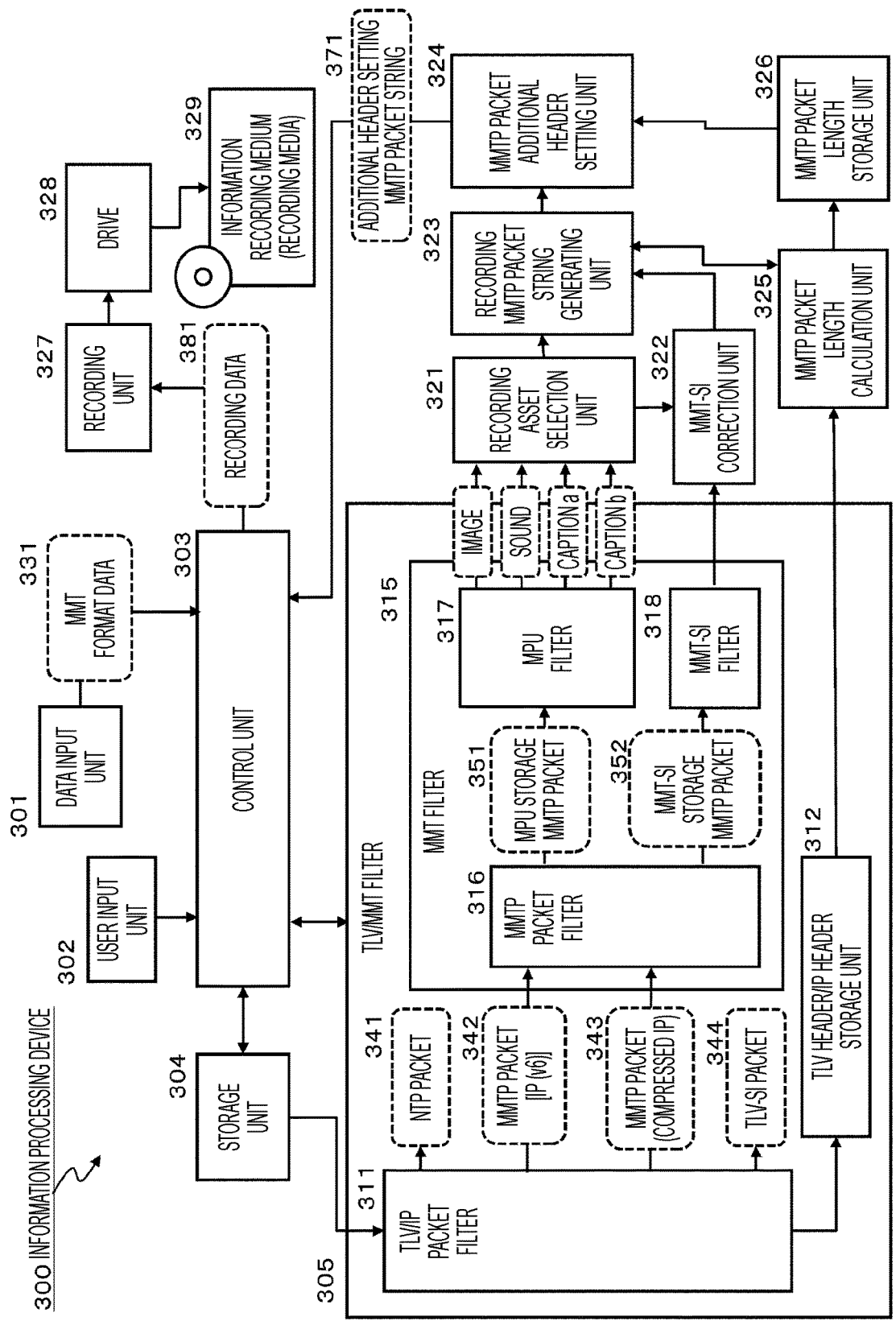
FIG. 28 is a diagram illustrating a configuration example of the information processing device executing data recording processing with respect to the information recording medium (media).

FIG. 28 is a diagram illustrating the configuration of an information processing device 300 that executes the data recording processing with respect to the information recording medium such as a BD.

The information processing device 300 executes data recording processing with respect to an information recording medium (recording media) 329, illustrated in FIG. 28.

A data input unit 301 inputs MMT format data 331 that is recording data with respect to the information recording medium 329, that is, the MMT format data 331 including the image data, the sound data, the caption data, various control messages (SI), or the like.

The data input unit 301 includes a receiving unit receiving transmitted data, for example, from a broadcast station, a contents server, or the like, transmitting the MMT format data 331, a medium reading unit reading data from the medium in which the MMT format data 331 is recorded, or the like.

The MMT format data 331 input from the data input unit 301, is the data according to the data format, described above with reference to FIG. 2, and for example, includes high-definition image data such as an HEVC image.

The MMT format data 331 is stored in a storage unit 304, according to the control of a control unit 303.

A user input unit 302, for example, inputs a start request of the data recording with respect to the information recording medium 329, and the like.

The MMT format data 331 stored in the storage unit 304, first, is input into a TLV/IP packet filter 311 of a TLV/MMT filter 305.

The TLV/IP packet filter 311 executes the filtering processing of separating the TLV packet and the IP packet according to the type of each packet, according to packet identification information of the TLV header of the TLV packet or the IP header of the IP packet, and the like.

As described above with reference to FIG. 2 and FIG. 3, the transmitted data from the broadcast station or the like includes the TLV packet string, and the IP packet is stored in the TLV packet.

Furthermore, the TLV packet filter 120 described above with reference to FIG. 22, corresponds to an execution configuration of a part of the function of the TLV/IP packet filter 311.

As illustrated in FIG. 28, the TLV/IP packet filter 311 executes the filtering processing of separating the received data packet from the broadcast station or the like, into each packet of an NTP packet 341, an MMTP packet (IP (v6)) 342, an MMTP packet (a compressed IP) 343, and a TLV-SI packet 344.

Furthermore, the NTP packet 341 is a packet storing the time information (the network time protocol (NTP)), as described above.

In the data, the data recorded in the information recording medium (media) 329, is stored in the MMTP packet (IP (v6)) 342 and the MMTP packet (the compressed IP) 343, and the MMTP packet (IP (v6)) 342 and the MMTP packet (the compressed IP) 343 are input into an MMT filter 316.

Further, the TLV/IP packet filter 311 is stored in a TLV header/IP header storage unit 312 by separating the TLV header of the TLV packet and the IP header of the IP packet.

The header information is input into an MMTP packet length calculation unit 325, and is used for the acquiring processing or the calculating processing of the MMTP packet length, described above with reference to FIG. 24 to FIG. 27.

Next, the processing of an MMT filter 315 will be described.

The MMTP packet (IP (v6)) 342 and the MMTP packet (compressed IP) 343 separated by the TLV/IP packet filter 311, are input into the MMTP packet filter 316 of the MMT filter 315.

The MMTP packet filter 316 executes processing of discriminating whether the MMTP packet is an MPU storage packet or a control message (MMT-SI) storage packet, with reference to the packet header of the MMTP packet, and of separating the MMTP packet into an MPU storage MMTP packet 351 storing the data to be reproduced, such as the image and the sound, and an MMT-SI storage MMTP packet 352 storing the control message.

The MPU storage MMTP packet 351 storing the data to be reproduced, such as the image and the sound, separated by the MMTP packet filter 316, is input into an MPU filter 317.

On the other hand, the MMT-SI storage MMTP packet 352 storing the control message, is input into an MMT-SI filter 318.

Further, the MPU filter 317 into which MPU storage MMTP packet 351 storing the data to be reproduced, such as the image and the sound, is input, executes the packet separating processing according to the type of payload (the image, the sound, the caption, or the like) of the MMTP packet, on the basis of the header information of the MMTP packet, and outputs the MMTP packet of each data type unit to a recording asset selection unit 321.

Furthermore, in the case of the sound or the caption, the MPU filter 317, for example, performs the separating processing according to the language such as Japanese or English. In the image, for example, in a case where a plurality of images such as a high-definition image and a standard image, or an LR image corresponding to a 3D image, are included, the separating processing for each image type is executed.

On the other hand, the MMT-SI storage MMTP packet 352 storing the control message, is input into the MMT-SI filter 318. The MMT-SI filter 318 performs processing of selecting the control message necessary to be recorded in the information recording medium (media).

The control message (MMT-SI) received from the broadcast station, includes various messages, and the MMT-SI filter 318 acquires the control message necessary to be recorded in the information recording medium (media), from the messages, and outputs the acquired message to an MMT-SI correction unit 322.

The recording asset selection unit 321 inputs the MMTP packet of each data type (the image, the sound, the caption, and the like) unit, and for example, selects data (asset) to be recorded in the information recording medium (media), from the data, according to recording data selection information of the user, and outputs the selected data to a recording MMTP packet string generating unit 323.

Further, the selection information is also output to the MMT-SI correction unit 322.

The MMT-SI correction unit 322 acquires the control message necessary to be recorded in the information recording medium (media), from the MMT-SI filter 318, and inputs the selection information of the data (the asset) to be actually recorded in the information recording medium (media), from the recording asset selection unit 321.

The MMT-SI correction unit 322 performs processing of changing the control message input from the MMT-SI filter 318, into data corresponding to the actual medium recording data, on the basis of the selection information input from the recording asset selection unit 321. For example, processing of excluding the control information associated with the caption data that is not recorded, from the data to be recorded, or the like, is performed.

A correction control message (MMT-SI) generated by the MMT-SI correction unit 322, is output to the recording MMTP packet string generating unit 323.

The recording MMTP packet string generating unit 323 inputs the data (the asset) to be actually recorded in the information recording medium (media), from the recording asset selection unit 321, and inputs the correction control message (MMT-SI) generated by the MMT-SI correction unit 322.

The recording MMTP packet string generating unit 323 generates packet string of the MMTP packet to be actually recorded in the information recording medium (media), on the basis of the input data. The generated MMTP packet string is output to an MMTP packet additional header setting unit 324.

MMTP packet additional header setting unit 324 inputs the MMTP packet string to be actually recorded in the information recording medium (media), from the recording MMTP packet string generating unit 323, and sets the additional header in which the MMTP packet length is recorded, with respect to each of the MMTP packets configuring the MMTP packet string.

The additional header is a header that has the data configuration described above with reference to FIG. 20, and is recorded with the packet length of the MMTP packet.

The calculating processing of the packet length of the MMTP packet, is executed by the MMTP packet length calculation unit 325.

The MMTP packet length calculation unit 325 acquires the header information of each of the TLV header of the TLV packet and the IP header of the IP packet, from the TLV header/IP header storage unit 312, and as described above with reference to FIG. 24 to FIG. 27, acquires or calculates the packet length of the MMTP packet, by using header recording information of the TLV header of the TLV packet and the IP header of the IP packet.

The MMTP packet length calculation unit 325 stores the calculated MMTP packet length in an MMTP packet length storage unit 326.

The MMTP packet additional header setting unit 324 acquires the MMTP packet length from the MMTP packet length storage unit 326, and generates the additional header (the MMTP packet additional header) described above with reference to FIG. 20.

The MMTP packet additional header setting unit 324 adds the generated additional header, on the prestage of the MMTP packet.

As a result of such processing, for example, an additional header setting MMTP packet string having the configuration illustrated in FIG. 19(*b*), is generated. The packet string is output as an additional header setting MMTP packet string 371 illustrated in FIG. 28.

The additional header setting MMTP packet string 371 generated by the MMTP packet additional header setting unit 324, is output to a recording unit 327, as recording data 381, under the control of the control unit 303, and is output to the information recording medium 329 to be recorded, through a drive 328 by the recording unit 327.

Furthermore, even though it is not illustrated, the information processing device 300 executes processing of generating and recording the database file such as the playlist file and the clip information file, defined in the BDAV format, in addition to the processing of generating and recording the additional header setting MMTP packet string 371.

Next, the sequence of the data recording processing with respect to the information recording medium 327, to be executed by the information processing device 300 illustrated in FIG. 28, will be described with reference to flowcharts illustrated in FIG. 29 and FIG. 30.

Figure 29:
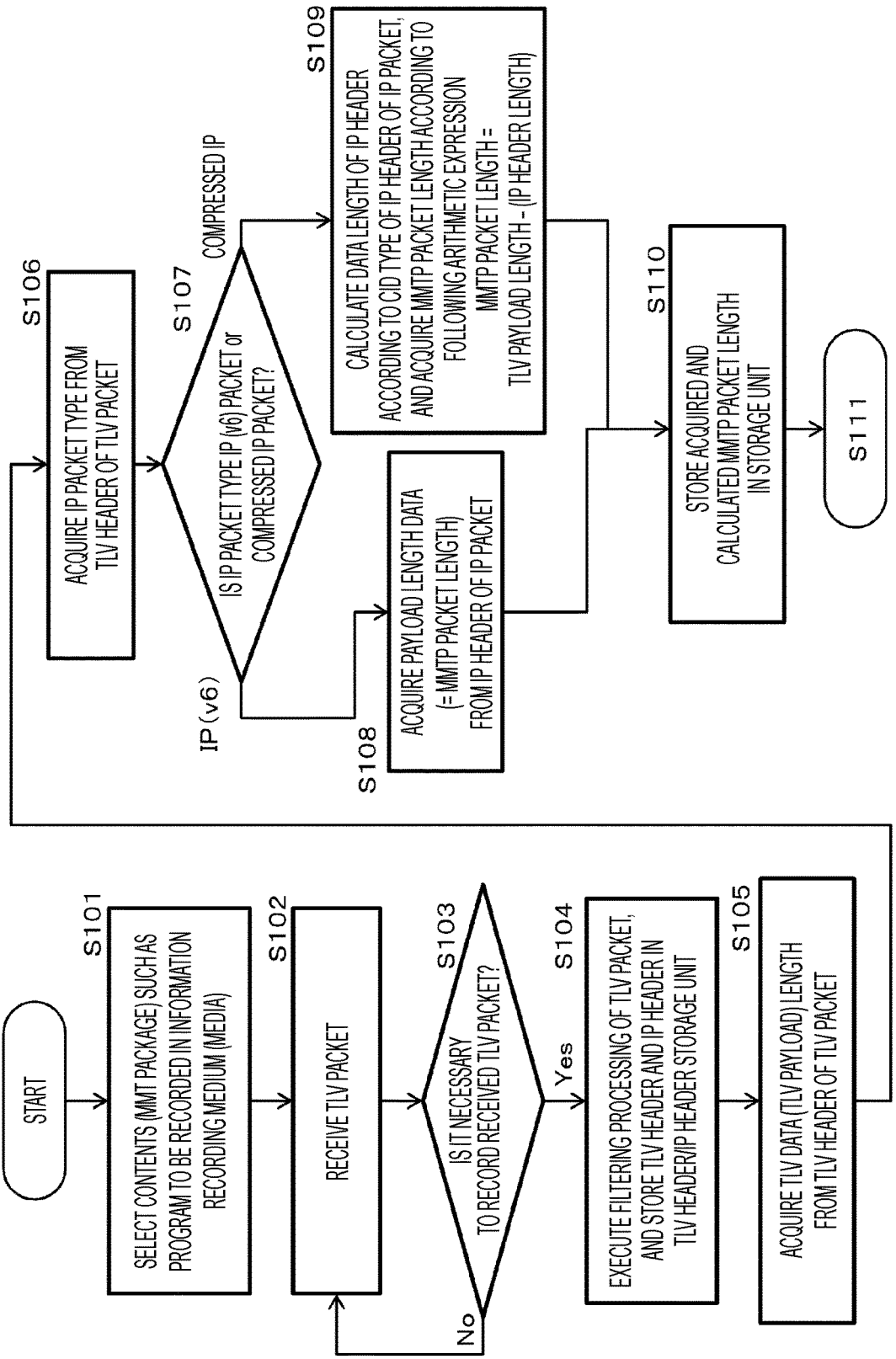
FIG. 29 is a diagram illustrating a flowchart of a processing sequence of the data recording processing with respect to the information recording medium (media).
Figure 30:
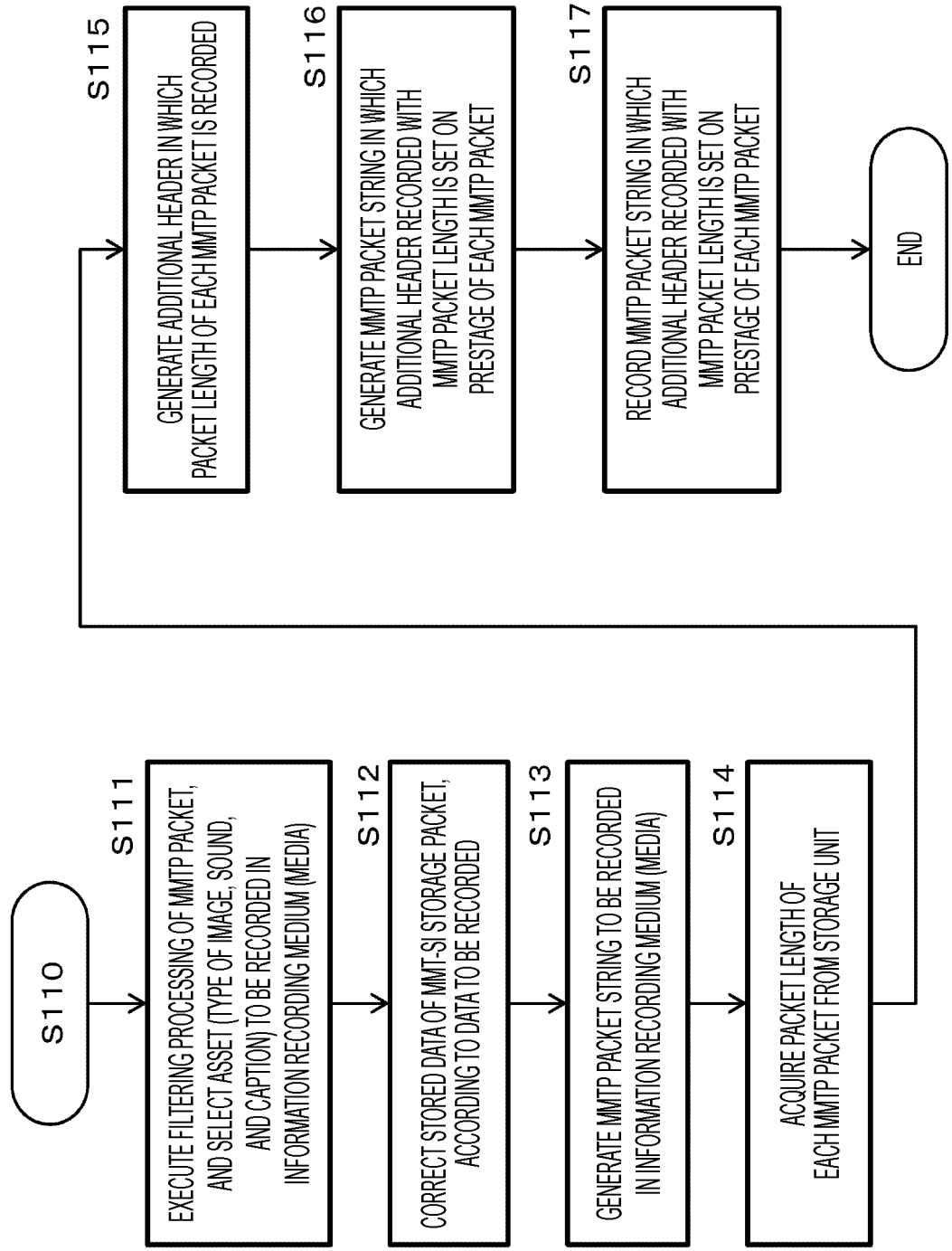
FIG. 30 is a diagram illustrating a flowchart of the processing sequence of the data recording processing with respect to the information recording medium (media).

The processing according to the flow illustrated in FIG. 29 and FIG. 30, for example, can be executed under the control of a data processor (a control unit) provided with a CPU having a program executing function, according to a program stored in the storage unit of the information processing device.

Hereinafter, the processing of each step illustrated in the flow of FIG. 29 and FIG. 30, will be sequentially described.

(Step S101)

First, in step S101, the information processing device 300 selects contents (an MMT package) such as a program to be recorded with respect to the information recording medium (media).

Such selection, for example, is performed according to selecting processing of a recorded program of the user.

(Step S102)

Next, in step S102, the information processing device 300 receives the TLV packet storing the contents such as the image and the sound, or the control information.

(Step S103)

Next, in step S103, the information processing device 300 determines whether or not the TLV packet received in step S102, is a TLV packet storing data to be recorded, that is selected in step S101.

In a case where the received TLV packet is the TLV packet storing the data to be recorded, the process proceeds to step S104.

In a case where the received TLV packet is not the TLV packet storing the data to be recorded, the packet reception in step S102, is continuously performed.

(Step S104)

In a case where the TLV packet received in step S102 is the TLV packet storing the data to be recorded, in step S104, the information processing device 300 executes the filtering processing of the received TLV packet, and stores the TLV header and the IP header in the TLV header/IP header storage unit.

Such processing is the processing to be executed by the TLV/IP packet filter 311, described with reference to FIG. 28.

The TLV/IP packet filter 311 executes the filtering processing of separating the TLV packet and the IP packet according to each packet type, according to the packet identification information of the TLV header of the TLV packet or the IP header of the IP packet.

Specifically, the filtering processing of separating the received packet from the broadcast station or the like, into each packet of the NTP packet, the MMTP packet (IP (v6)), the MMTP packet (the compressed IP), and the TLV-SI packet, is executed.

Further, the TLV/IP packet filter 311 separates the TLV header of the TLV packet and the IP header of the IP packet to be stored in the TLV header/IP header storage unit 312.

(Step S105)

The next processing of steps S105 to S110, is the processing to be executed by the MMTP packet length calculation unit 325 illustrated in FIG. 28.

First, in step S105, the MMTP packet length calculation unit 325 acquires a TLV data (TLV payload) length from the TLV header of the TLV packet.

As described above with reference to FIG. 10 and FIG. 23, the packet length data (the length) of the TLV packet is recorded in the TLV header.

The packet length data (the length) of the TLV packet corresponds to the data length of the TLV_data (=TLV Payload) excluding the TLV header of the TLV packet. Specifically, the data byte length of the TLV_data (=TLV Payload) is recorded.

In step S105, the MMTP packet length calculation unit 325 illustrated in FIG. 28, acquires the TLV data (TLV payload) length from the TLV header of the TLV packet.

(Step S106)

Next, in step S106, the MMTP packet length calculation unit 325 of the information processing device 300 acquires an IP packet type from the TLV header of the TLV packet.

As illustrated in FIG. 23, the following packet types are respectively recorded in the TLV header of the TLV packet.

Packet Type=0x02: IP (v6) Packet
Packet Type=0x03: Compressed IP Packet
Packet Type=0xFE: TLV-SI Packet In step S106, the MMTP packet length calculation unit 325 acquires the IP packet type set in the TLV header of the TLV packet.

(Step S107)

Next, in step S107, the MMTP packet length calculation unit 325 of the information processing device 300 determines whether the IP packet is the IP (v6) packet or the compressed IP packet, and in a case where the IP packet is the IP (v6) packet, the process proceeds to step S108, and in a case where the IP packet is the compressed IP packet, the process proceeds to step S109.

(Step S108)

In step S107, in a case where it is determined that the IP packet is the IP (v6) packet, in step S108, the payload length data (=MMTP Packet Length) is acquired from the IP header of the IP packet.

Such processing corresponds to the processing described above with reference to FIG. 24.

As illustrated in FIG. 24, the payload length data (payload_length) of the IP packet is recorded in the IP header in a case where the TLV packet is the IP (V6) packet. Specifically, the data byte length of IP_data (=IP Payload) is recorded.

In step S108, the payload length data (=MMTP Packet Length) is acquired.

(Step S109)

On the other hand, in step S107, in a case where it is determined that the IP packet is the compressed IP packet, in step S109, the data length of the IP header is calculated according to a CID type of the IP header of the IP packet, and the MMTP packet length is acquired according to the following arithmetic expression.

MMTP Packet Length=TLV Payload Length−(IP Header Length)

Such processing corresponds to the processing described above with reference to FIG. 25 to FIG. 27.

As described above with reference to FIG. 25 to FIG. 27, the length of the IP header is different according to two types of CID Header Type=0x60 and CID Header Type=0x61, and thus, arithmetic processing different according to each type, is executed, and the MMTP packet length is calculated.

(Step S110)

Next, in step S110, the information processing device 300 stores the packet length of the MMTP packet calculated in step S108 or step S109, in the storage unit.

That is, the packet length of the MMTP packet is stored in the MMTP packet length storage unit 326 illustrated in FIG. 28.

Next, the processing of each step of the flow illustrated in FIG. 30 will be sequentially described.

(Step S111)

Next, in step S111, the information processing device 300 executes the filtering processing of separating the MMTP packet according to the type of payload. Further, processing of selecting the asset (the type of image, sound, and caption) to be recorded in the information recording medium (media), is executed.

Such processing is the processing to be executed by the MMT filter 315 and the recording asset selection unit 321, illustrated in FIG. 28.

The MMT filter 315 separates the packet into the MPU storage packet and the MMT-SI storage packet, and performs separating processing according to the data type (the image, the sound, the caption, and the like), with respect to the MPU packet.

A recording asset selection unit 321 selects the packet storing the data to be actually recorded in the medium, from the MPU storage packet separated according to the data type (the image, the sound, the caption, and the like).

For example, determining processing of an asset to be recorded, is performed on the basis of the sound, the caption, and the like of the language selected by the user.

(Step S112)

Next, in step S112, the information processing device 300 corrects the stored data of the MMT-SI storage packet, according to the data to be recorded.

Such processing is the processing to be executed by the MMT-SI correction unit 322 illustrated in FIG. 28.

The MMT-SI correction unit 322 performs processing of correcting the control message input from the MMT-SI filter 318, corresponding to the actual medium recording data, on the basis of the selection information input from the recording asset selection unit 321. For example, processing of excluding control information associated with caption data that is not recorded, from the data to be recorded, or the like, is performed.

(Step S113)

Next, in step S113, the information processing device 300 generates the MMTP packet string to be recorded in the information recording medium (media).

Such processing is the processing to be executed by the recording MMTP packet string generating unit 323 illustrated in FIG. 28.

The recording MMTP packet string generating unit 323 generates the packet string of the MMTP packet to be actually recorded in the information recording medium (media), on the basis of the input data. The generated MMTP packet string is output to the MMTP packet additional header setting unit 324 illustrated in FIG. 28.

(Step S114)

The processing of steps S114 to S116 is the processing to be executed by the MMTP packet additional header setting unit 324 illustrated in FIG. 28. First, in step S114, the MMTP packet additional header setting unit 324 of the information processing device 300 acquires the packet length of each of the MMTP packets from the MMTP packet length storage unit 326.

(Step S115)

Next, in step S115, the MMTP packet additional header setting unit 324 of the information processing device 300 generates the additional header in which the packet length of each of the MMTP packets is recorded.

Specifically, the data configuration described above with reference to FIG. 20, that is, the MMTP packet additional header in which the MMTP packet length is recorded, is generated as a header corresponding to each of the MMTP packets.

(Step S116)

Next, in step S116, the MMTP packet additional header setting unit 324 of the information processing device 300 generates the MMTP packet string in which the additional header recorded with the MMTP packet length, is set on the prestage of each of the MMTP packets.

(Step S117)

Next, in step S117, the information processing device 300 records the MMTP packet string in which the additional header recorded with the MMTP packet length, is set on the prestage of each of the MMTP packets, in the information recording medium (media).

According to such processing, the packet string in which the additional header (the MMTP packet additional header) recorded with the MMTP packet length, is set on the prestage of each of the MMTP packets, is recorded in the information recording medium (media).

The reproducing device that executes the data reproducing from the medium recording data, is capable of acquiring the packet length of each of the MMTP packets, and is capable of discriminating each of the packet delimiters, with reference to the additional header.

Furthermore, even though it is not described in the flow illustrated in FIG. 29 and FIG. 30, the information processing device 300 executes the recording processing of the database file such as the playlist and the clip information file that are the reproducing control information file defined in the BDAV format or the SPAV format, along with the recording processing of the MMTP packet string in which the additional header is set, with respect to the information recording medium (media).

7. Configuration and Processing of Information Processing Device Executing Data Reproducing Processing from Information Recording Medium Next, the configuration and the processing of the information processing device that executes the data reproducing processing from the information recording medium, will be described with reference to FIG. 31 and the like.

The information processing device that executes the reproducing processing, reads the data stored in the information recording medium mounted on the information processing device, and executes the reproducing processing.

Figure 31:
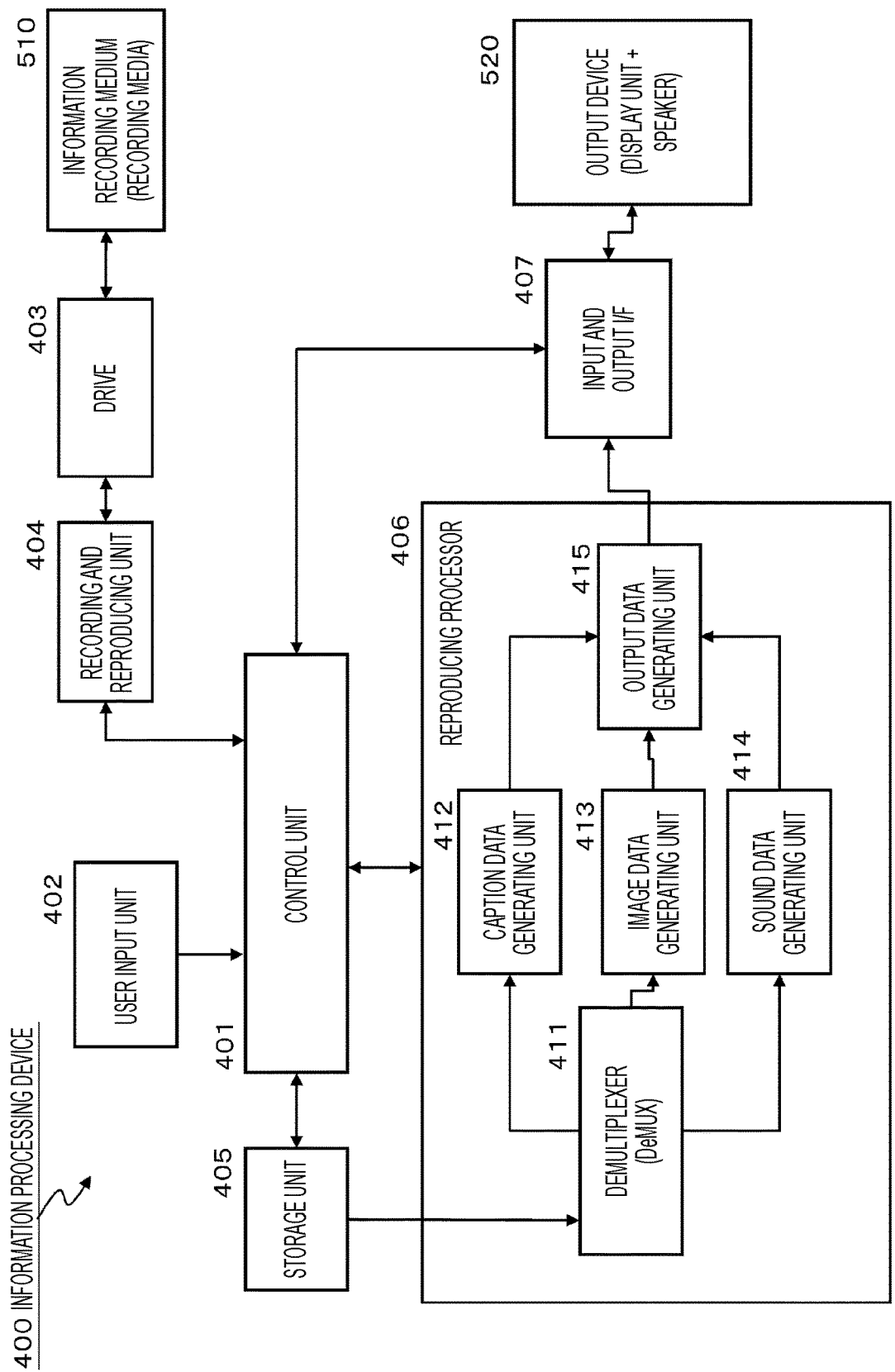
FIG. 31 is a diagram illustrating a configuration example of the information processing device executing data reproducing processing from the information recording medium (media).

FIG. 31 is a diagram illustrating the configuration of an information processing device 400 that executes the reproducing processing of data recorded in an information recording medium 510 such as a BD.

The information processing device 400 reads the data recorded in the information recording medium (recording media) 510 illustrated in FIG. 31, and outputs the read data to an output device (Display Unit+Speaker) 520. Furthermore, the output device 520, for example, is a television or the like, and is a display device provided with a display, a speaker, or the like.

Furthermore, there is also a case where the information processing device 400 is the same device as the information processing device 300 that performs the data recording, described above with reference to FIG. 28. That is, the information processing device 400 may be an information processing device having both functions of data recording and reproducing.

The information recording medium (the recording media) 510 is a recording medium in which the packet string of the MMTP packet having the additional header generated according to the processing described with reference to FIG. 29 to FIG. 30, is recorded, and the database such as the playlist and the clip information file that are the reproducing control information file, is recorded.

Specifically, for example, the BDAV format data described above with reference to FIG. 4, or the SPAV format data described above with reference to FIG. 8, are recorded.

A control unit 401, for example, reads the recording data of the information recording medium 510 through a recording and reproducing unit 404 and a drive 403, on the basis of the input of reproducing instruction information from a user input unit 402, stores the read data in a storage unit 405 as a data buffer, and outputs the stored data to a reproducing processor 406.

The reproducing processor 406 acquires the reproducing data read from the information recording medium 510, that is, each data item from the clip AV stream file storing each of the data items such as the image, the sound, and the caption, and generates the reproducing data, under the control of the control unit 401.

A demultiplexer (DeMUX) 411 acquires a data storage packet storing each data item such as the image, the sound, the caption, and the playlist file and the clip information file, sorts the acquired data storage packet into data type packets, and outputs each of the packets to a caption data generating unit 412, an image data generating unit 413, and a sound data generating unit 414, according to the data type.

The caption data generating unit 412, the image data generating unit 413, and the sound data generating unit 414 execute decoding processing of the data stored in the packet, and the like, and output the decoded data to an output data generating unit 415.

The output data generating unit 415 outputs each of the data items such as the caption, the image, and the sound, to the output device (Display Unit+Speaker) 520 through an input and output interface 407.

Furthermore, the data such as the image, the sound, and the caption, which is the data to be reproduced, stored in the information recording medium 510, or the control message (MMT-SI) is stored in the MMTP packet having the additional header in which the MMTP packet length is recorded.

The information processing device 400 acquires the data stored in the MMTP packet by applying the playlist file and the clip information file that are defined in the BDAV format, and executes decoding and reproducing processing.

The output device (Display Unit+Speaker) 520 outputs each of the data items such as the caption, the image, and the sound, input from the information processing device 400, through the output device (Display Unit+Speaker) 520.

Furthermore, the information recording medium 510 stores the MMT format data as the recording data according to the BDAV format, and the information processing device 400 acquires the recording information of the playlist file and the clip information file that are the database file defined in the BDAV format, and executes reproducing control processing.

Next, the sequence of the data reproducing processing from the information recording medium 510 to be executed by the information processing device 400 illustrated in FIG. 31, will be described with reference to flowcharts illustrated in FIG. 32 and FIG. 33.

Figure 32:
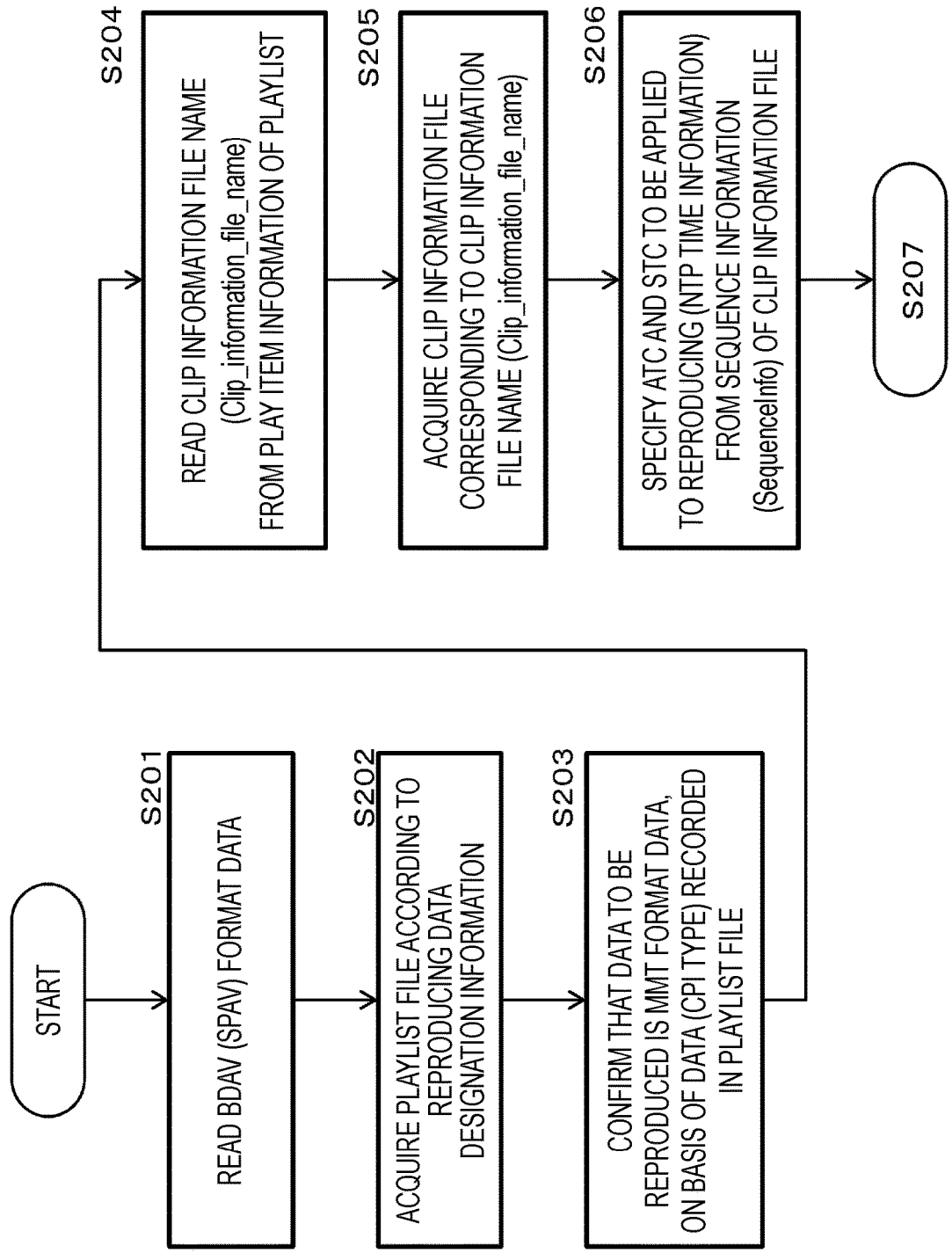
FIG. 32 is a diagram illustrating a flowchart of a processing sequence of the data reproducing processing from the information recording medium (media).

The processing according to the flow illustrated in FIG. 32 and FIG. 33, for example, can be executed under the control of a data processor (a control unit) provided with a CPU having a program executing function, according to a program stored in a storage unit of the information processing device 400.

Furthermore, the information processing device that executes the processing according to the flow illustrated in FIG. 32 and FIG. 33, is the information processing device 400 illustrated in FIG. 31, is mounted with the information recording medium (the recording media) 510, reads the data recorded in the mounted information recording medium 510, and outputs the read data to the output device (Display Unit+Speaker) 520. Furthermore, the output device 520, for example, is a television or the like, and is a display device provided with a display, a speaker, or the like.

The information recording medium (the recording media) 510 is a recording medium in which the MMTP packet string generated according to the processing described with reference to FIG. 29 to FIG. 30, and the database such as the playlist and the clip information file, is recorded.

Hereinafter, the processing of each step illustrated in the flow of FIG. 32 will be sequentially described.

(Step S201)

First, in step S201, the control unit 401 of the information processing device 400 reads BDAV (or SPAV) format data from the information recording medium (media) storing the data to be reproduced.

(Step S202)

Next, in step S202, for example, the control unit 401 of the information processing device 400 reads the playlist file storing the reproducing control information corresponding to the designated reproducing data, from the information recording medium (media), according to reproducing data designation information input by the user.

(Step S203)

Next, in step S203, the control unit 401 of the information processing device 400 confirms that the data to be reproduced is the MMT format data, from the recording data of the playlist file.

Specifically, a PL_CPI type (PL_CPI_type) recorded in the playlist file, is read out.

The PL_CPI type (PL_CPI_type) is information indicating a CPI type in the clip information referred to by the play item (PlayItem) defined in the file playlist file.

Furthermore, characteristic point information (CPI) is the recording data of the clip information file, and for example, is data for acquiring the data address at the reproducing start point.

For example, PL_CPI Type (PL_CPI_type)=1 indicates that the CPI type in the clip information file referred to by the play item (PlayItem) defined in the playlist file, is an EP map corresponding to MPEG-2TS.

In addition, PL_CPI Type (PL_CPI_type)=2 indicates that the CPI type in the clip information file referred to by the play item (PlayItem) defined in the playlist file, is a TU map corresponding to MPEG-2TS.

Further, PL_CPI Type (PL_CPI_type)=3 indicates that the CPI type in the clip information file referred to by the play item (PlayItem) defined in the playlist file, is an EP map corresponding to MMT.

Thus, for example, the PL_CPI type (PL_CPI_type) can be defined by three types of 1 to 3, and three CPI types can be identified.

In step S203, it is confirmed that the PL_CPI type (PL_CPI_type) recorded in the playlist file, is set to "3", that is, the CPI type in the clip information file referred to by the play item (PlayItem) defined in the playlist file, is the EP map corresponding to MMT.

(Step S204)

Next, in step S204, the control unit 401 of the information processing device 400 reads a clip information file name (Clip_information_file_name) from the play item information of the playlist.

(Step S205)

Next, in step S205, the information processing device 400 reads the clip information file having the clip information file name (Clip_information_file_name) that is read from the playlist file in step S204, from the information recording medium (media).

(Step S206)

Next, in step S206, the information processing device 400 specifies ATC and STC that are clock information to be applied to the reproducing, from the sequence information (SequenceInfo) of the clip information file. Furthermore, in a case where the data to be reproduced is the MMT format data, the time information is recorded as NTP time information.

Furthermore, information associated with an arrival time clock (ATC) and a system time clock (STC), is defined in the sequence information (SequenceInfo) of the clip information file.

The arrival time clock (ATC) and the system time clock (STC) are the clock information to be applied to the data reproducing.

(Step S207)

Next, in step S207, the information processing device 400 acquires a reproducing start position (SPN_STC_Start) and a reproducing start time (presentation_start_time), from the sequence information (SequenceInfo) of the clip information file.

In a case where the data to be reproduced is the MMT format data, the reproducing start position information, for example, is a byte depth from the leading of the initial MMTP packet that is stored in the stream file (the clip AV stream file), and the reproducing start time is the NTP time information. The information is recorded as the sequence information (SequenceInfo) of the clip information file.

(Step S208)

Next, in step S208, the information processing device 400 reads the MMT format data stored in the clip AV stream file, according to a recording rate (recording_rate) recorded in the clip information (ClipInfo) of the clip information file.

Recording rate (recording_rate) information is recorded in the clip information (ClipInfo) of the clip information file, and the MMT format data stored in the clip AV stream file that is recorded in the information recording medium (media), is read according to the recording rate information.

Furthermore, in a case where the data to be reproduced is the MMT format having the MMT packet, a bit rate according to the MMT format, is recorded as the recording rate (recording_rate) information.

(Step S209)

Next, in step S209, the information processing device 400 selects and acquires the MMTP packet storing the data to be reproduced while confirming the MMTP packet length, with reference to the additional header (the MMTP packet additional header).

For example, only the MMTP packet storing the image is selectively acquired, and the image data in the MMTP packet is acquired.

Similarly, in the sound, the caption, and the like, only the MMTP packet storing the sound or the caption is selectively acquired, and the sound data or the caption data in the MMTP packet is acquired.

(Step S210)

Next, in step S210, the information processing device 400 executes the decoding processing with respect to each data item such as the image, the sound, and the caption, read out from the information recording medium (media), according to an algorithm corresponding to each of the data items, and then, executes the reproducing processing.

8. Configuration Example of Information Processing Device

Next, a hardware configuration example of an information processing device that can be applied as the information processing device executing the data recording with respect to the information recording medium, and the data reproducing from the information recording medium, will be described with reference to FIG. 34.

A central processing unit (CPU) 601 functions as a data processor that executes various processing according to a program stored in a read only memory (ROM) 602 or a storage unit 608. For example, the processing according to the sequence described in the examples described above, is executed. A program to be executed by the CPU 601, data, or the like, is stored in a random access memory (RAM) 603. The CPU 601, the ROM 602, and the RAM 603 are connected to each other through a bus 604.

The CPU 601 is connected to an input and output interface 605 through the bus 604, and an input unit 606 including various switches, a keyboard, a mouse, a microphone, and the like, and an output unit 607 including a display, a speaker, and the like, are connected to the input and output interface 605. The CPU 601 executes various processing corresponding to a command input from the input unit 606, and outputs a processing result, for example, to the output unit 607.

The storage unit 608 connected to the input and output interface 605, for example, includes a hard disk and the like, and stores the program to be executed by the CPU 601 or various data items. A communication unit 609 functions as a transmitting and receiving unit of data communication through a network such as the Internet or a local area network, and as a transmitting and receiving unit of a broadcast wave, and communicates with the external device.

A drive 610 connected to the input and output interface 605, drives a removable medium 611 such as a magnetic disk, an optical disk, a magnetooptical disk, or a semiconductor memory such as a memory card, and executes data recording or data reading.

9. Conclusion of Configuration of Present Disclosure

As described above, the examples of the present disclosure have been described with reference to specific examples. However, it is apparent that a person skilled in the art is capable of correcting or substituting the examples within a range not departing from the gist of the present disclosure. That is, the present invention has been disclosed as an example, and should not be interpreted restrictively. In order to determine the gist of the present disclosure, the claims should be taken into consideration.

Furthermore, technology disclosed herein, is capable of having the following configurations.

(1) An information processing device, including: a data processor configured to input MPEG media transport (MMT) format data, and to generate recording data with respect to an information recording medium, in which the data processor acquires a packet length of an MMT protocol (MMTP) packet storing the MMT format data, and generates the recording data in which an additional header storing the acquired packet length is set before the MMTP packet.

(2) The information processing device according to (1), in which the data processor generates recording data according to a BDAV format or an SPAV format that is a data recording format with respect to the information recording medium.

(3) The information processing device according to (1) or (2), in which the data processor acquires the packet length of the MMTP packet by applying recording information of a TLV header that is a header of a TLV packet storing the MMTP packet.

(4) The information processing device according to any one of (1) to (3), in which the data processor acquires the packet length of the MMTP packet by applying recording information of an IP header that is a header of an IP packet storing the MMTP packet.

(5) The information processing device according to any one of (1) to (4), in which the data processor discriminates a type of IP packet stored in a TLV packet, from recording information of a TLV header that is a header of a TLV packet storing the MMTP packet, executes processing according to the discriminated type of IP packet, and acquires the packet length of the MMTP packet.

(6) The information processing device according to any one of (1) to (5), in which the data processor executes arithmetic processing of subtracting a data length of an IP header that is a header of an IP packet stored in a TLV packet, from a TLV payload length recorded in a TLV header that is a header of a TLV packet storing the MMTP packet, and acquires the packet length of the MMTP packet.

(7) The information processing device according to (6), in which the data processor calculates an IP header length according to a CID header type recorded in an IP header that is a header of an IP packet storing the MMTP packet, executes arithmetic processing to which the calculated IP header length is applied, and acquires the packet length of the MMTP packet.

(8) The information processing device according to any one of (1) to (7), in which the data processor sets the additional header with respect to each of an MPU storage MMTP packet storing a media presentation unit (MPU) including data to be reproduced, and a control message storage MMTP packet storing a control message (signaling information: SI), to be recorded in the information recording medium.

(9) The information processing device according to (8), in which the control message storage MMTP packet is MMT-SI defined in an MMT format.

(10) An information processing device, including: a data processor configured to execute reproducing processing of recording data of an information recording medium, in which the information recording medium is an information recording medium storing MPEG media transport (MMT) format data, and, and the data processor acquires a packet length of an MMT protocol (MMTP) packet, from an additional header recorded on a prestage of the MMTP packet storing the MMT format data, acquires data from the MMTP packet, and executes data reproducing processing.

(11) The information processing device according to (10), in which in the information recording medium, an MPU storage MMTP packet storing a media presentation unit (MPU) including data to be reproduced, and a control message storage MMTP packet storing a control message (signaling information: SI) are mixedly recorded, and the additional header is set before each of the MMTP packets, and the data processor acquires the packet length of the MMTP packet from the additional header, discriminates a packet delimiter of the MMTP packet, selectively acquires the MPU storage MMTP packet including the data to be reproduced, acquires the data to be reproduced from the selectively acquired MPU storage MMTP packet, and executes the reproducing processing.

(12) The information processing device according to (10) or (11), in which the data processor executes processing of discriminating a type of data stored as an MMTP payload, from an original MMTP packet header of the MMTP packet, and of selecting only a packet storing the same type of data.

(13) The information processing device according to any one of (10) to (12), in which the data processor executes processing of discriminating a data type as to whether the data stored as the MMTP payload, is an image, a sound, a caption, or a control message (signaling information: SI), from an original MMTP packet header of the MMTP packet, and of selecting only a packet storing the same type of data.

(14) The information processing device according to any one of (10) to (13), in which the information recording medium is an information recording medium storing data in which the MMT format data is recorded according to a BDAV format or an SPAV format.

(15) An information recording medium, including: an MMT protocol (MMTP) packet storing MMT format data; and recording information in which an additional header recorded with a packet length of an MMTP packet, is set before the MMT protocol (MMTP) packet, in which a reproducing device reproducing data from the information recording medium, is capable of confirming the packet length of the MMTP packet, on the basis of the recording information of the additional header.

(16) The information recording medium according to (15), in which in the information recording medium, an MPU storage MMTP packet storing a media presentation unit (MPU) including data to be reproduced, and a control message storage MMTP packet storing a control message (signaling information: SI) are mixedly recorded, and the additional header is set before each of the MMTP packets.

(17) An information processing method executed by an information processing device, in which the information processing device includes a data processor configured to input MPEG media transport (MMT) format data, and to generate recording data with respect to an information recording medium, and the data processor acquires a packet length of an MMT protocol (MMTP) packet storing the MMT format data, and generates the recording data in which an additional header storing the acquired packet length is set before the MMTP packet.

(18) An information processing method executed by an information processing device, in which the information processing device includes a data processor configured to execute reproducing processing of recording data of an information recording medium, the information recording medium is an information recording medium storing MPEG media transport (MMT) format data, and the data processor acquires a packet length of an MMT protocol (MMTP) packet, from an additional header recorded on a prestage of the MMTP packet storing the MMT format data, acquires data from the MMTP packet, and executes data reproducing processing.

(19) A program of allowing an information processing device to execute information processing, in which the information processing device includes a data processor configured to input MPEG media transport (MMT) format data, and to generate recording data with respect to an information recording medium, and the program allows the data processor to execute processing of acquiring a packet length of an MMT protocol (MMTP) packet storing the MMT format data, and of generating recording data in which an additional header recorded with the acquired packet length is set before the MMTP packet.

(20) A program of allowing an information processing device to execute information processing, in which the information processing device includes a data processor configured to execute reproducing processing of recording data of an information recording medium, the information recording medium is an information recording medium storing MPEG media transport (MMT) format data, and the program allows the data processor to acquire a packet length of an MMT protocol (MMTP) packet, from an additional header recorded on a prestage of the MMTP packet storing the MMT format data, to acquire data from the MMTP packet, and to execute data reproducing processing.

In addition, a set of processing described herein can be executed by hardware, software, or a composite configuration thereof. In a case where the processing is executed by the software, a program in which a processing sequence is recorded, can be executed by being installed in a memory in a computer built in dedicated hardware, or can be executed by being installed in a general-purpose computer that is capable of executing various processing. For example, the program can be recorded in advance in a recording medium. The program can be received through a network such as a local area network (LAN) and the Internet, and can be installed in a built-in recording medium such as a hard disk, instead of being installed in the computer from the recording medium.

Furthermore, various processing described herein, may be executed not only in chronological order according to the description, but also in parallel or individually according to processing capability of a device executing the processing or the necessity. In addition, herein, the system has a logical set configuration of a plurality of devices, and is not limited to a system in which devices of each configuration are in the same housing.

INDUSTRIAL APPLICABILITY

As described above, according to the configuration of one example of present disclosure, a configuration is realized in which a packet delimiter can be discriminated from an MMTP packet string including MMT format data, and a packet can be selectively acquired and reproduced.

Specifically, the MMT format data is input through a broadcast wave or the like, a packet length of the MMT protocol (MMTP) packet including the MMT format data is acquired, and recording data in which an additional header storing the acquired packet length is set before the MMTP packet, is generated and is recorded in an information recording medium. A reproducing device is capable of discriminating each MMTP packet delimiter according to the packet length of the MMTP packet, read from the additional header, of acquiring reproducing data, for example, image data, from the selected packet, and of decoding and reproducing the acquired data.

According to this configuration, the configuration is realized in which the packet delimiter can be discriminated from the MMTP packet string including the MMT format data, and the packet can be selectively acquired and reproduced.

REFERENCE SIGNS LIST

20 Transmission device
21 Broadcast server
22 Data delivery server
30 Information processing device
31 BD player
32 TV 33 PC
34 Mobile terminal
40 Information recording medium (media)
41 BD
42 HDD
43 Flash memory
100 MMTP packet
101 Additional header (MMTP packet additional header)
300 Information processing device
301 Data input unit
302 User input unit
303 Control unit
304 Storage unit
305 TLV/MMT filter
311 TLV/IP packet filter
312 TLV header/IP header storage unit
315 MMT filter
316 MMTP packet filter
317 MPU filter
318 MMT-SI filter
321 Recording asset selection unit
322 MMT-SI correction unit
323 Recording MMTP packet string generating unit
324 MMTP packet additional header setting unit
325 MMTP packet length calculation unit
326 MMTP packet length storage unit
327 Recording unit
328 Drive
329 Information recording medium
400 Information processing device
401 Control unit
402 User input unit
403 Drive
404 Recording and reproducing unit
405 Storage unit
406 Reproducing processor
407 Input and output I/F
411 Demultiplexer
412 Caption data generating unit
413 Image data generating unit
414 Sound data generating unit
415 Output data generating unit
510 Information recording medium
520 Output device (display unit+speaker)
601 CPU
602 ROM
603 RAM
604 Bus
605 Input and output interface
606 Input unit
607 Output unit
608 Storage unit
609 Communication unit
610 Drive
611 Removable medium

The invention claimed is:

1. An information processing device, comprising:
a data processor configured to input MPEG media transport (MMT) format data, and to generate recording data with respect to an information recording medium,
wherein the data processor acquires a packet length of an MMT protocol (MMTP) packet storing the MMT format data, and generates the recording data in which an additional header storing the acquired packet length is set before the MMTP packet.

2. The information processing device according to claim 1,
wherein the data processor generates recording data according to a BDAV format or an SPAV format that is a data recording format with respect to the information recording medium.

3. The information processing device according to claim 1,
wherein the data processor acquires the packet length of the MMTP packet by applying recording information of a TLV header that is a header of a TLV packet storing the MMTP packet.

4. The information processing device according to claim 1,
wherein the data processor acquires the packet length of the MMTP packet by applying recording information of an IP header that is a header of an IP packet storing the MMTP packet.

5. The information processing device according to claim 1,
wherein the data processor discriminates a type of IP packet stored in a TLV packet, from recording information of a TLV header that is a header of a TLV packet storing the MMTP packet, executes processing according to the discriminated type of IP packet, and acquires the packet length of the MMTP packet.

6. The information processing device according to claim 1,
wherein the data processor executes arithmetic processing of subtracting a data length of an IP header that is a header of an IP packet stored in a TLV packet, from a TLV payload length recorded in a TLV header that is a header of a TLV packet storing the MMTP packet, and acquires the packet length of the MMTP packet.

7. The information processing device according to claim 6,
wherein the data processor calculates an IP header length according to a CID header type recorded in an IP header that is a header of an IP packet storing the MMTP packet, executes arithmetic processing to which the calculated IP header length is applied, and acquires the packet length of the MMTP packet.

8. The information processing device according to claim 1,
wherein the data processor sets the additional header with respect to each of an MPU storage MMTP packet storing a media presentation unit (MPU) including data to be reproduced, and a control message storage MMTP packet storing a control message (signaling information: SI), to be recorded in the information recording medium.

9. The information processing device according to claim 8,
wherein the control message storage MMTP packet is MMT-SI defined in an MMT format.

10. An information processing device, comprising:
a data processor configured to execute reproducing processing of recording data of an information recording medium,
wherein the information recording medium is an information recording medium storing MPEG media transport (MMT) format data, and
the data processor acquires a packet length of an MMT protocol (MMTP) packet, from an additional header recorded on a prestage of the MMTP packet storing the MMT format data, acquires data from the MMTP packet, and executes data reproducing processing.

11. The information processing device according to claim 10,
  wherein in the information recording medium, an MPU storage MMTP packet storing a media presentation unit (MPU) including data to be reproduced, and a control message storage MMTP packet storing a control message (signaling information: SI) are mixedly recorded, and the additional header is set before each of the MMTP packets, and
  the data processor acquires the packet length of the MMTP packet from the additional header, discriminates a packet delimiter of the MMTP packet, selectively acquires the MPU storage MMTP packet including the data to be reproduced, acquires the data to be reproduced from the selectively acquired MPU storage MMTP packet, and executes the reproducing processing.

12. The information processing device according to claim 10,
  wherein the data processor executes processing of discriminating a type of data stored as an MMTP payload, from an original MMTP packet header of the MMTP packet, and of selecting only a packet storing the same type of data.

13. The information processing device according to claim 10,
  wherein the data processor executes processing of discriminating a data type as to whether the data stored as the MMTP payload, is an image, a sound, a caption, or a control message (signaling information: SI), from an original MMTP packet header of the MMTP packet, and of selecting only a packet storing the same type of data.

14. The information processing device according to claim 10,
  wherein the information recording medium is an information recording medium storing data in which the MMT format data is recorded according to a BDAV format or an SPAV format.

15. A non-transitory computer-readable information recording medium, comprising:
  an MMT protocol (MMTP) packet storing MMT format data; and
  recording information in which an additional header recorded with a packet length of an MMTP packet, is set before the MMT protocol (MMTP) packet,
  wherein a reproducing device reproducing data from the information recording medium, is capable of confirming the packet length of the MMTP packet, on the basis of the recording information of the additional header.

16. The non-transitory computer-readable information recording medium according to claim 15,
  wherein in the information recording medium, an MPU storage MMTP packet storing a media presentation unit (MPU) including data to be reproduced, and a control message storage MMTP packet storing a control message (signaling information: SI) are mixedly recorded, and the additional header is set before each of the MMTP packets.

17. An information processing method executed by an information processing device,
  wherein the information processing device includes a data processor configured to input MPEG media transport (MMT) format data, and to generate recording data with respect to an information recording medium, and
  the data processor acquires a packet length of an MMT protocol (MMTP) packet storing the MMT format data, and generates the recording data in which an additional header recorded with the acquired packet length is set before the MMTP packet.

18. An information processing method executed by an information processing device,
  wherein the information processing device includes a data processor configured to execute reproducing processing of recording data of an information recording medium,
  the information recording medium is an information recording medium storing MPEG media transport (MMT) format data, and
  the data processor acquires a packet length of an MMT protocol (MMTP) packet, from an additional header recorded on a prestage of the MMTP packet storing the MMT format data, acquires data from the MMTP packet, and executes data reproducing processing.

19. A non-transitory computer-readable medium having embodied thereon a program, which when executed by a data processor of an information processing device causes the information processing device to execute an information processing method, wherein the data processor of the information processing device is configured to input MPEG media transport (MMT) format data, and to generate recording data with respect to an information recording medium, and wherein the information processing method comprises:
  executing, by the data processor, a processing of acquiring a packet length of an MMT protocol (MMTP) packet storing the MMT format data; and
  generating recording data in which an additional header recorded with the acquired packet length is set before the MMTP packet.

20. A non-transitory computer-readable medium having embodied thereon a program, which when executed by a data processor of an information processing device causes the information processing device to execute an information processing method, wherein the data processor of the information processing device is configured to execute reproducing processing of recording data of an information recording medium, the information recording medium is an information recording medium storing MPEG media transport (MMT) format data, and wherein the information processing method comprises:
  executing, by the data processor, an acquisition of a packet length of an MMT protocol (MMTP) packet, from an additional header recorded on a prestage of the MMTP packet storing the MMT format data, to acquire data from the MMTP packet; and
  executing, by the data processor, the data reproducing processing.

* * * * *